(12) United States Patent
Sato et al.

(10) Patent No.: US 9,417,480 B2
(45) Date of Patent: *Aug. 16, 2016

(54) LIQUID CRYSTAL DISPLAY DEVICE

(71) Applicant: FUJIFILM Corporation, Tokyo (JP)

(72) Inventors: Hiroshi Sato, Kanagawa (JP); Yujiro Yanai, Kanagawa (JP); Megumi Sekiguchi, Kanagawa (JP); Akira Yamamoto, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 94 days.

This patent is subject to a terminal disclaimer.

(21) Appl. No.: 14/445,780

(22) Filed: Jul. 29, 2014

(65) Prior Publication Data

US 2014/0333872 A1 Nov. 13, 2014

Related U.S. Application Data

(63) Continuation of application No. PCT/JP2013/052096, filed on Jan. 30, 2013.

(30) Foreign Application Priority Data

Jan. 30, 2012 (JP) .................................. 2012-017347
Jul. 24, 2012 (JP) .................................. 2012-164232

(51) Int. Cl.
*G02F 1/1335* (2006.01)
*G02F 1/13363* (2006.01)
*G02B 5/30* (2006.01)

(52) U.S. Cl.
CPC ........ *G02F 1/133636* (2013.01); *G02B 5/3083* (2013.01); *G02F 1/13363* (2013.01); *G02F 1/133528* (2013.01)

(58) Field of Classification Search
CPC ............ G02F 1/33636; G02F 1/13363; G02F 1/133528; G02B 5/3083
USPC .................................................. 349/117, 119
See application file for complete search history.

(56) References Cited

U.S. PATENT DOCUMENTS

2008/0180603 A1 7/2008 Ohsawa et al.
2009/0052032 A1* 2/2009 Ito .......................... B29C 55/04
359/489.2

FOREIGN PATENT DOCUMENTS

EP 2 397 872 A1 12/2011
JP 2587398 B2 3/1997

(Continued)

OTHER PUBLICATIONS

International Search Report issued in PCT/JP2013/052096 on Mar. 5, 2013.

(Continued)

*Primary Examiner* — Nathanael R Briggs
(74) *Attorney, Agent, or Firm* — Jean C. Edwards, Esq.; Edwards Neils LLC

(57) ABSTRACT

A liquid crystal display device has at least: a first and a second polarizing layers arranged so that respective absorption axes thereof are orthogonal to each other; a first and a second substrates arranged opposite to each other between the first and second polarizing layers, at least either one of which has a transparent electrode; a twisted alignment mode liquid crystal cell arranged between the first and the second substrates; a first optical compensation film arranged between the first polarizing layer and the liquid crystal cell, including a first transparent support and a layer formed by curing a composition containing a first liquid crystal compound; and a second optical compensation film arranged between the second polarizing layer and the liquid crystal cell, including a second transparent support and a layer formed by curing a composition containing a second liquid crystal compound, as defined herein.

21 Claims, 1 Drawing Sheet

(56) References Cited

FOREIGN PATENT DOCUMENTS

| | | |
|---|---|---|
| JP | H09-061630 A | 3/1997 |
| JP | 2008-304895 A | 12/2008 |
| JP | 2009-093166 A | 4/2009 |
| JP | 2010-054782 A | 3/2010 |
| JP | 2010-250295 A | 11/2010 |
| JP | 2011-090238 A | 5/2011 |
| JP | 4687507 B2 | 5/2011 |

OTHER PUBLICATIONS

Written Opinion issued in PCT/JP2013/052096 on Mar. 5, 2013.

* cited by examiner

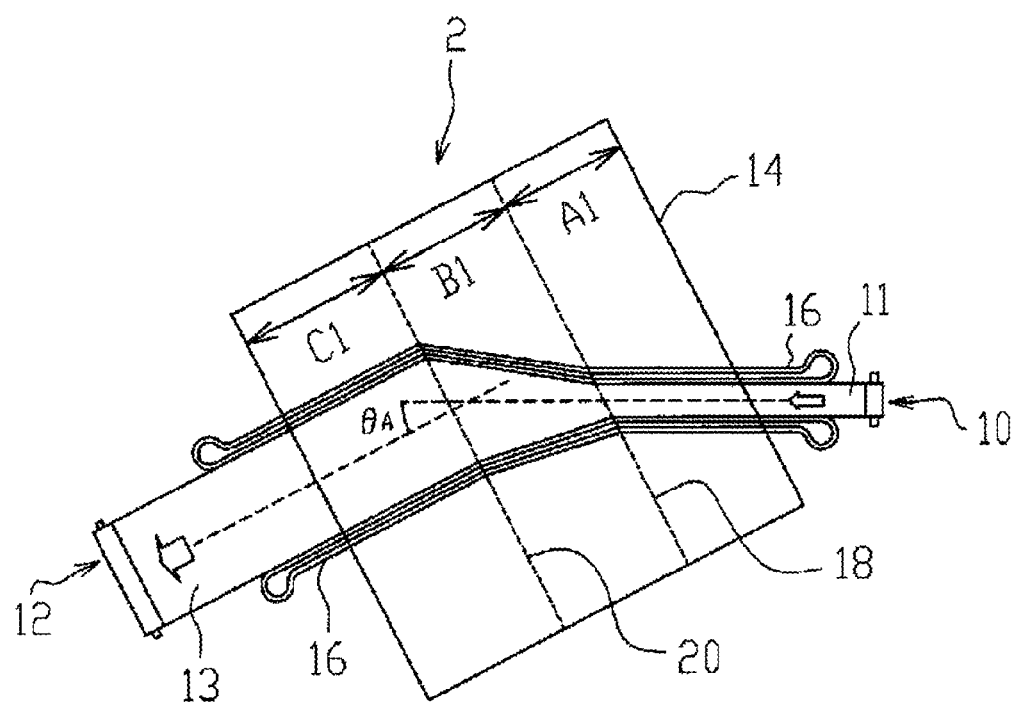

LIQUID CRYSTAL DISPLAY DEVICE

CROSS REFERENCE TO RELATED APPLICATION

This is a continuation of International Application No. PCT/JP2013/052096 filed on Jan. 30, 2013, which was published under PCT Article 21(2) in Japanese, and claims priority from Japanese Patent Application No. 2012-017347 filed on Jan. 30, 2012 and Japanese Patent Application No. 2012-164232 filed on Jul. 24, 2012, the entire disclosures of all of which are incorporated herein by reference.

The present invention relates to a liquid crystal display device having a wide viewing angle characteristic.

BACKGROUND ART

Heretofore, an optical film exhibiting various optical characteristics has been utilized for optical compensation in the liquid crystal display device depending on the mode thereof. For instance, as an optical compensation film of a TN mode liquid crystal display device, an optical compensation film having an optically anisotropic layer made from a liquid crystal composition on a transparent support composed of a polymer film is proposed (Patent Document 1).

A problem of the TN mode liquid crystal display device is that when obliquely observed at an angle of 45 degrees (ordinarily downward azimuth) to a director direction of liquid crystals, blocked up shadows or gradation inversion (inversion of light and shadow in gradation) occurs in every gradation to seriously impair the display quality in some cases. As means for solving the problem, a proposal is made in that an absorption axis of polarizing plate is arranged neither in parallel nor orthogonal to the director direction of liquid crystals (Patent Documents 2 and 3).

PRIOR ART DOCUMENT

Patent Document

Patent Document 1: Japanese Patent No. 2587398
Patent Document 2: JP-A-9-61630
Patent Document 3: Japanese Patent No. 4687507

DISCLOSURE OF THE INVENTION

Problems that the Invention is to Solve

However, since an optically anisotropic layer is arranged at an angle of 45 degrees to the absorption axis of polarizing plate according to the constitution above, there is a problem in that front white brightness is deteriorated due to the front retardation. Also, when obliquely observed in a certain azimuth, impression of actual image display is bad to be likely to impair the display quality. The terms "impression of actual image display" as used herein means reproducibility of the actual image and indicates differences in gradation reproducibility and tint between the front image and the oblique direction image.

In recent years, due to appearance of tablet type personal computer or smart phone, observation direction of the display variously changes depending on the contents so that the importance of improvement in viewing angle display performance in all azimuths increases. Also, since the tablet type personal computer and smart phone are excellent in portability, the opportunity of using them under light environment, for example, outdoors increases so that a display having low power consumption and bright indication is desired.

An object of the invention is to provide a liquid crystal display device, in particular, a TN mode liquid crystal display device, which is prevented from deterioration in the front white brightness and has a good viewing angle display performance.

According to the invention, a liquid crystal display device is provided which maintains the low power consumption (prevention of deterioration in the front white brightness) of TN mode liquid crystal display device, in which the gradation inversion in the downward direction which is the biggest problem of TN mode liquid crystal display device is improved and the viewing angle characteristic in all directions is improved, and which is bright and excellent in the viewing angle display performance.

Means for Solving the Problems

The means for solving the problems described above are as follows.

(1) A liquid crystal display device having at least:
a first and a second polarizing layers arranged so that respective absorption axes thereof are orthogonal to each other;
a first and a second substrates arranged opposite to each other between the first and second polarizing layers, at least either one of which has a transparent electrode;
a twisted alignment mode liquid crystal cell arranged between the first and the second substrates; a first optical compensation film arranged between the first polarizing layer and the liquid crystal cell, including a first transparent support and a layer formed by curing a composition containing a first liquid crystal compound; and
a second optical compensation film arranged between the second polarizing layer and the liquid crystal cell, including a second transparent support and a layer formed by curing a composition containing a second liquid crystal compound; wherein,
an absorption axis of a first polarizing plate is arranged at an angle of 45° to a director direction of liquid crystals on a surface of substrate in the liquid crystal cell adjacent to the first polarizing plate,
the first transparent support has retardation and its in-plane slow axis is arranged in parallel or orthogonal to the director direction of liquid crystals on a surface of substrate in the liquid crystal cell adjacent thereto,
a slow axis of the layer formed by curing a composition containing a first liquid crystal compound is arranged orthogonal to the director direction of liquid crystals on the surface of substrate in the liquid crystal cell adjacent thereto,
the second transparent support has retardation and its in-plane slow axis is arranged in parallel or orthogonal to the director direction of liquid crystals on a liquid crystal cell substrate surface,
a slow axis of the layer formed by curing a composition containing a second liquid crystal compound is arranged orthogonal to the director direction of liquid crystals on a liquid crystal cell substrate surface adjacent thereto,
each of the first and the second transparent supports has in-plane retardation Re (550) of 0 to 200 nm and retardation in a thickness direction Rth (550) of −100 to 200 nm at a wavelength of 550 nm,
each of the compositions containing the first and the second liquid crystal compounds has in-plane retardation Re (550) of 10 to 100 nm at a wavelength of 550 nm, and
in which a ratio between retardation R [+40°] measured in a direction inclined 40° to a normal direction and retardation R

[−40°] measured in a direction inversely inclined 40° to the normal direction in a plane orthogonal to the in-plane slow axis satisfies formula (I) or (II) shown below:

when R [+40°]>R [−40°], $$1.1 \leq R[+40°]/R[-40°] \leq 40 \quad (I)$$

when R [+40°]<R [−40°], $$1.1 \leq R[-40°]/R[+40°] \leq 40 \quad (II)$$

(2) The liquid crystal display device as described in (1), wherein when retardation in the slow axis direction of the layer formed by curing a composition containing a first liquid crystal compound is taken as a positive number, a sum of the retardation of the first transparent support and the retardation of the layer formed by curing a composition containing a first liquid crystal compound Re1_sum satisfies −150 nm≤Re1_sum≤60 nm, and when retardation in the slow axis direction of the layer formed by curing a composition containing a second liquid crystal compound is taken as a positive number, a sum of the retardation of the second transparent support and the retardation of the layer formed by curing a composition containing a second liquid crystal compound Re2_sum satisfies −150 nm≤Re2_sum≤60 nm.

(3) The liquid crystal display device as described in (1) or (2), wherein the liquid crystal compound is a polymerizable liquid crystal compound.

(4) The liquid crystal display device as described in any one of (1) to (3), wherein the liquid crystal compound is a discotic compound.

(5) The liquid crystal display device as described in any one of (1) to (4), wherein a difference of in-plane retardation Re (550) at a wavelength of 550 nm between the first transparent support and the second transparent support and a difference of retardation in a thickness direction Rth (550) at a wavelength of 550 nm between the first transparent support and the second transparent support are less than 10 nm, respectively.

(6) The liquid crystal display device as described in any one of (1) to (8), wherein at least one of a difference of in-plane retardation Re (550) at a wavelength of 550 nm between the first transparent support and the second transparent support and a difference of retardation in a thickness direction Rth (550) at a wavelength of 550 nm between the first transparent support and the second transparent support is 10 nm or more.

(7) The liquid crystal display device as described in any one of (1) to (6), wherein the first polarizing layer, the first transparent support, the layer formed by curing a composition containing a first liquid crystal compound, the twisted alignment mode liquid crystal cell arranged between the first and the second substrates, the layer formed by curing a composition containing a second liquid crystal compound, the second transparent support and the second polarizing layer are stacked in this order.

(8) The liquid crystal display device as described in any one of (1) to (7), wherein the first polarizing layer, the layer formed by curing a composition containing a first liquid crystal compound, the first transparent support, the twisted alignment mode liquid crystal cell arranged between the first and the second substrates, the second transparent support, the layer formed by curing a composition containing a second liquid crystal compound and the second polarizing layer are stacked in this order.

(9) A liquid crystal display device having at least:
a first and a second polarizing layers arranged so that respective absorption axes thereof are orthogonal to each other;
a first and a second substrates arranged opposite to each other between the first and second polarizing layers, at least either one of which has a transparent electrode;
a twisted alignment mode liquid crystal cell arranged between the first and the second substrates; a first optical compensation film arranged between the first polarizing layer and the liquid crystal cell, including a first transparent support, a composition containing a first liquid crystal compound and an optically anisotropic layer A; and
a second optical compensation film arranged between the second polarizing layer and the liquid crystal cell, including a second transparent support, a composition containing a second liquid crystal compound and an optically anisotropic layer B; wherein,
an absorption axis of a first polarizing plate is arranged at an angle of 45° to a director direction of liquid crystals on a surface of substrate in the liquid crystal cell adjacent to the first polarizing plate,
a slow axis of the composition containing a first liquid crystal compound is arranged orthogonal to the director direction of liquid crystals on the surface of substrate in the liquid crystal cell adjacent thereto,
an in-plane slow axis of the optically anisotropic layer A is arranged in parallel to the director direction of liquid crystals on the surface of substrate in the liquid crystal cell adjacent thereto,
a slow axis of the composition containing a second liquid crystal compound is arranged orthogonal to the director direction of liquid crystals on the liquid crystal cell substrate surface adjacent thereto,
an in-plane slow axis of the optically anisotropic layer B is arranged in parallel to the director direction of liquid crystals on the surface of substrate in the liquid crystal cell adjacent thereto,
each of the first and the second transparent supports has in-plane retardation Re (550) of 0 to 200 nm and retardation in a thickness direction Rth (550) of −100 to 200 nm at a wavelength of 550 nm,
each of the compositions containing the first and the second liquid crystal compounds has in-plane retardation Re (550) of 10 to 100 nm at a wavelength of 550 nm, and
in which a ratio between retardation R [+40°] measured in a direction inclined 40° to a normal direction and retardation R [−40°] measured in a direction inversely inclined 40° to the normal direction in a plane orthogonal to the in-plane slow axis satisfies formula (I) or (II) shown below:
when R [+40°]>R [−40°], $$1.1 \leq R[+40°]/R[-40°] \leq 40 \quad (I)$$

when R [+40°]<R [−40°], $$1.1 \leq R[-40°]/R[+40°] \leq 40 \quad (II)$$

(10) A liquid crystal display device having at least:
a first and a second polarizing layers arranged so that respective absorption axes thereof are orthogonal to each other;
a first and a second substrates arranged opposite to each other between the first and second polarizing layers, at least either one of which has a transparent electrode;
a twisted alignment mode liquid crystal cell arranged between the first and the second substrates;
a first optical compensation film arranged between the first polarizing layer and the liquid crystal cell, including a first transparent support, a composition containing a first liquid crystal compound and an optically anisotropic layer A; and
a second optical compensation film arranged between the second polarizing layer and the liquid crystal cell, including a second transparent support, a composition containing a second liquid crystal compound and an optically anisotropic layer B; wherein, an absorption axis of a first polarizing plate is arranged at an angle of 45° to a director direction of liquid crystals on a surface of substrate in the liquid crystal cell adjacent to the first polarizing plate,
the first transparent support has retardation and its in-plane slow axis is arranged in parallel or orthogonal to the absorption axis of the first polarizing plate,
a slow axis of the composition containing a first liquid crystal compound is arranged orthogonal to the director direction of liquid crystals on the surface of substrate in the liquid crystal cell adjacent thereto,
an in-plane slow axis of the optically anisotropic layer A is arranged in parallel to the director direction of liquid crystals on the surface of substrate in the liquid crystal cell adjacent thereto, the second transparent support has retardation and its in-plane slow axis is arranged in parallel or orthogonal to an absorption axis of a second polarizing plate,
a slow axis of the composition containing a second liquid crystal compound is arranged orthogonal to the director direction of liquid crystals on a liquid crystal cell substrate surface adjacent thereto,
an in-plane slow axis of the optically anisotropic layer B is arranged in parallel to the director direction of liquid crystals on the surface of substrate in the liquid crystal cell adjacent thereto, each of the first and the second transparent supports has in-plane retardation Re (550) of 0 to 200 nm and retardation in a thickness direction Rth (550) of −100 to 200 nm at a wavelength of 550 nm,
each of the compositions containing the first and the second liquid crystal compounds has in-plane retardation Re (550) of 10 to 100 nm at a wavelength of 550 nm, and
in which a ratio between retardation R [+40°] measured in a direction inclined 40° to a normal direction and retardation R [−40°] measured in a direction inversely inclined 40° to the normal direction in a plane orthogonal to the in-plane slow axis satisfies formula (I) or (II) shown below:
when R [+40°]>R [−40°], $$1.1 \leq R[+40°]/R[-40°] \leq 40 \quad (I)$$

when R [+40°]<R [−40°], $$1.1 \leq R[-40°]/R[+40°] \leq 40 \quad (II)$$

(11) The liquid crystal display device as described in (9) or (10), wherein when retardation in the slow axis direction of the layer formed by curing a composition containing a first liquid crystal compound is taken as a positive number, a sum of the retardation of the optically anisotropic layer A and the retardation of the layer formed by curing a composition containing a first liquid crystal compound Re1A_sum satisfies −150 nm≤Re1A_sum≤60 nm, and when retardation in the slow axis direction of the layer formed by curing a composition containing a second liquid crystal compound is taken as a positive number, a sum of the retardation of the optically anisotropic layer B and the retardation of the layer formed by curing a composition containing a second liquid crystal compound Re2B_sum satisfies −150 nm≤Re2B_sum≤60 nm.
(12) The liquid crystal display device as described in any one of (9) to (11), wherein the optically anisotropic layer A and the optically anisotropic layer B are cured layers of a composition containing a liquid crystal compound.
(13) The liquid crystal display device as described in (12), wherein the liquid crystal compound is a polymerizable liquid crystal compound.
(14) The liquid crystal display device as described in (12) or (13), wherein the liquid crystal compound is a discotic compound.
(15) The liquid crystal display device as described in (12) or (13), wherein the liquid crystal compound is a rod-like liquid crystal compound.
(16) The liquid crystal display device as described in any one of (9) to (15), wherein each of the optically anisotropic layer A and the optically anisotropic layer B has in-plane retardation Re (550) of 5 nm at a wavelength of 550 nm, and in which a ratio between retardation R [+40°] measured in a direction inclined 40° to a normal direction and retardation R [−40°] measured in a direction inversely inclined 40° to the normal direction in a plane orthogonal to the in-plane slow axis satisfies formula (I) or (II) shown below:
when R [+40°]>R [−40°], $$1 \leq R[+40°]/R[-40°] \quad (III)$$

when R [+40°]<R [−40°], $$1 \leq R[-40°]/R[+40°] \quad (IV)$$

(17) The liquid crystal display device as described in any one of (9) to (15), wherein each of the optically anisotropic layer A and the optically anisotropic layer B has in-plane retardation Re (550) of 5 nm or more at a wavelength of 550 nm, and in which a ratio between retardation R [+40°] measured in a direction inclined 40° to a normal direction and retardation R [−40°] measured in a direction inversely inclined 40° to the normal direction in a plane parallel to the in-plane slow axis satisfies formula (I) or (II) shown below:
when R [+40°]>R [−40°], $$1 \leq R[+40°]/R[-40°] \quad (III)$$

when R [+40°]<R [−40°], $$1 \leq R[-40°]/R[+40°] \quad (IV)$$

(18) The liquid crystal display device as described in any one of (1) to (17), which has a light diffusion layer arranged on a viewing side thereof.
(19) The liquid crystal display device as described in (18), wherein the light diffusion layer is a layer containing a light-transmitting resin and a light-transmitting fine particle having a refractive index different from a refractive index of the light-transmitting resin and haze of the light diffusion layer is 10% or more.
(20) The liquid crystal display device as described in (18) or (19), wherein the light diffusion layer has an anisotropic scattering layer which varies a light-transmitting state depending on an incidence angle of incident light.
(21) The liquid crystal display device as described in any one of (1) to (20), which is provided with a light diffusion layer arranged on a viewing side thereof and a backlight unit arranged on an opposite side to the viewing side thereof and a brightness half-width angle of light emitted from the backlight unit is 80° or less.

Advantage of the Invention

According to the invention, a liquid crystal display device, in particular, a TN mode liquid crystal display device, which has a viewing angle characteristic of small asymmetry property and a small gradation inversion can be provided.

BRIEF DESCRIPTION OF THE DRAWING

FIG. 1 is a view showing a stretching method of a stretching machine used in the formation of the film according to the invention.

MODE FOR CARRYING OUT THE INVENTION

The invention will be described in detail below. The numerical range represented by using "to" in the specification means a range including the numerical values described before and after "to" as the lower limit value and the upper limit value.

In the specification, Re(λ) and Rth(λ) represent in-plane retardation and retardation in a thickness direction at a wavelength λ, respectively. The Re(λ) is measured by making light having a wavelength λ nm incident in a normal direction of the film using KOBRA 21ADH or WR (produced by Oji Scientific Instruments). In the selection of the measurement wavelength λ, nm, the measurement may be conducted according to manual exchange of a wavelength selective filter or according to conversion of a measurement value by a program or the like. In the case where the film to be measured is expressed by a uniaxial or biaxial refractive index ellipsoid, the Rth(λ) is calculated in the manner described below. The measurement method is partly utilized in the measurement of an average tilt angle on an orientated film side of discotic liquid crystal molecule in an optically anisotropic layer as described hereinafter and an average tilt angle on the opposite side thereof.

Six Re(λ) values are measured such that light having a wavelength λ, nm is made incident to the film from six directions inclined to 50° on one side at intervals of 10° to the film normal direction using an in-plane slow axis (decided by KOBRA 21ADH or WR) as an inclination axis (rotation axis) (in the case where the film has no slow axis, an arbitrary in-plane direction of film is used as the rotation axis), and the Rth(λ) is calculated by KOBRA 21ADH or WR based on the six Re(λ) values measured, a hypothetical value of the average refractive index and a thickness value of the film inputted. In the above, in the case of film having a direction in which the retardation value measured using the in-plane slow axis as the rotation axis is zero at a certain inclination angle the normal direction, the sign of a retardation value at the inclination angle larger than the inclination angle to give a zero retardation is changed to a negative sign, and then the negative retardation value is used in the calculation by KOBRA 21ADH or WR. The Rth value can also calculated according to formula (A) and formula (III) shown below based on two retardation values measured in arbitrary two inclined directions using the slow axis as the inclination axis (rotation axis) (in the case where the film has no slow axis, an arbitrary in-plane direction is used as the rotation axis), a hypothetical value of the average refractive index, and a thickness value of the film inputted.

Formula (A)

$$Re(\theta) = \left[nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}}\right] \times \frac{d}{\cos\left(\sin^{-1}\left(\frac{\sin(-\theta)}{nx}\right)\right)}$$

Formula (A)

In the formulae above, Re(θ) represents a retardation value in the direction inclined at an angle θ to a normal direction, nx represents a refractive index in a slow axis direction in the plane, ny represents a refractive index in a direction orthogonal to nx in the plane, nz represents a refractive index in the direction orthogonal to nx and ny.

$$Rth = \{(nx+ny)/2 - nz\} \times d$$

Formula (III)

In the case where the film to be measured cannot be expressed by a uniaxial or biaxial index ellipsoid, specifically, in the case where the film to be measured has no so-called optical axis (optic axis), Rth(λ) is calculated in the manner described below. Eleven Re(λ) values are measured such that light having a wavelength λ nm is made incident to the film from eleven directions inclined from −50° to +50° at intervals of 10° to the film normal direction using an in-plane slow axis (decided by KOBRA 21ADH or WR), as an inclination axis (rotation axis), and the Rth(λ) is calculated by KOBRA 21ADH or WR based on the eleven Re(λ) values measured, a hypothetical value of the average refractive index and a thickness value of the film inputted. In the measurement described above, as the hypothetical value of the average refractive index, values described in *Polymer Handbook* (JOHN WILEY & SONS, INC.) and catalogs of various optical films can be used. In the case where a value of average refractive index is unknown, the value can be measured by an Abbe refractometer. The average refractive indexes of major optical films are shown below:

cellulose acylate (1.48), cycloolefin polymer (1.52), polycarbonate (1.59), polymethyl methacrylate (1.49), and polystyrene (1.59).

By inputting the hypothetical value of the average refractive index and the film thickness, nx, ny and nz are calculated by KOBRA 21ADH or KOBRA WR. On the basis of the nx, ny and nz thus-calculated, Nz=(nx−nz)/(nx−ny) is further calculated.

In the specification, the term "slow axis" means a direction in which the refractive index is maximum, and the measurement value of refractive index is a value measured in a visible light range (λ=550 nm), unless otherwise described specifically.

In the specification, the numerical value, numerical range and qualitative expression (expression, for example, "equivalent" or "equal") indicating the optical characteristic of member, for example, an optical film or a liquid crystal layer should be so interpreted as to indicate the numerical value, numerical range and qualitative expression which include the error ordinarily acceptable for the liquid crystal display device and the members used therein.

Also, in the specification, when the terms "parallel", "orthogonal", "0°", "90°", "45°" and the like are only used without indication of the range for the description of the arrangement between the axes or directions or the angle of crossing angle, they mean "approximately parallel", "approximately orthogonal", "approximately 0°", "approximately 90°", "approximately 45°" and the like, respectively and are not strict. Some deviation is acceptable within the range of achieving the purpose. For example, the term "parallel" or "0°" means that a crossing angle is approximately 0°, and is from −15° to 15°, preferably from −5° to 5°, and more preferably from −3° to 3°. The term "orthogonal" or "90°" means that a crossing angle is approximately 90°, and is from 75° to 105°, preferably from 85° to 95°, and more preferably from 87° to 93°. The term "45°" means that a crossing angle is approximately 45°, and is from 30° to 60°, preferably from 40° to 50°, and more preferably from 42° to 48°.

The liquid crystal display device has at least a first and a second polarizing layers arranged so that respective absorption axes thereof are orthogonal to each other, a first and a second substrates arranged opposite to each other between the first and second polarizing layers, at least either one of which has a transparent electrode, a twisted alignment mode liquid crystal cell arranged between the first and the second substrates, a first optical compensation film arranged between the first polarizing layer and the liquid crystal cell, and a second optical compensation film arranged between the second polarizing layer and the liquid crystal cell.

The liquid crystal cell is a TN mode liquid crystal cell, and electrode layers are formed on the opposite surfaces of the first and the second substrates. According to one example, a plurality of TFTs respectively corresponding to a plurality of pixel electrodes, a plurality of gate wirings for supplying a gate signal to the TFT of each line and a plurality of data wirings for supplying a data signal to the TFT of each row are provided and the plurality of pixel electrodes are connected to the TFTs corresponding to the pixel electrodes, respectively. Further, horizontal alignment films subjected to alignment treatment in directions substantially orthogonal to each other are formed on a pair of opposite substrates and the opposite surfaces thereof so as to cover the electrode layers. The liquid crystal layer is a layer formed by filling a nematic liquid crystal material having a positive dielectric anisotropy, and liquid crystal molecules thereof are defined on the alignment direction in the vicinity of the first and the second substrates by the horizontal alignment films, and when an electric field is not applied between the electrode layers, the liquid crystal molecules are twist-aligned at a twist angle of substantially 90° between the substrates. On the other hand, when a voltage for displaying black is applied between the electrodes, the liquid crystal molecules become to stand up vertically to the surfaces of the substrates and are aligned at a prescribed average tilt angle θ (approximately from 60° to 90°). In that state, the polarization state of light which propagates in the liquid crystal layer is different due to the alignment of the liquid crystal molecules between the case where light comes into the liquid crystal layer along the normal direction and the case where light comes into the liquid crystal layer in an oblique direction. As a result, the contrast is decreased, or gradation inversion or color shift is generated depending on the viewing angle. In the liquid crystal display device according to the invention, the viewing angle dependency of display characteristic, for example, contrast is reduced by the retardation layer, thereby improving the viewing angle characteristic.

$\Delta n \cdot d$ which is the product of a thickness d and a birefringence $\Delta n$ of the liquid crystal layer is ordinarily approximately from 300 to 600 nm in the case of TN mode. In the invention, it is preferred that the $\Delta n \cdot d$ of the liquid crystal layer satisfies the formula shown below because the effect for enlarging a viewing angle is obtained in the TN mode.

$$200 \text{ nm} \leq \Delta n \cdot d \leq 600 \text{ nm}$$

In the case of TN mode, the $\Delta n \cdot d$ is more preferably from 380 to 480 nm.

The liquid crystal layer may be a multi-gap liquid crystal layer a thickness of which is different from each other among sub pixel regions of RGB. For example, the multi-gap liquid crystal layer can be formed in such a manner that a thickness of color filter is not uniform, but a thickness of each of an R sub pixel, a G sub pixel and a B sub pixel is made different from each other. One example is a constitution where $\Delta n \cdot d(R)$ of a liquid crystal layer corresponding to the R sub pixel, $\Delta n \cdot d(G)$ of a liquid crystal layer corresponding to the G sub pixel and $\Delta n \cdot d(B)$ of a liquid crystal corresponding to the B sub pixel satisfy the relation of $\Delta n \cdot d(B) < \Delta n \cdot d(G) < \Delta n \cdot d(R)$. According to the example, a color image having high contrast and color reproducibility can be displayed over a wide viewing angle.

On the other hand, by utilizing, as the liquid crystal material, a liquid crystal material in which $\Delta n$ has wavelength dependency and $\Delta n(R)$ to R light, $\Delta n(G)$ to G light and $\Delta n(B)$ to B light satisfy the relation of $\Delta n(B) < \Delta n(G) < \Delta n(R)$, the same effects are obtained, even when the thickness of color filter is uniform.

As the pixel of the liquid crystal cell, a color filter composed of red (R) pixel, green (G) pixel, blue (B) pixel and white (W) pixel may be used. By using the color filter constituted from RGBW pixel, a feature in that brightness in the display surface normal direction (front direction) can be increased in comparison with a RGB pixel constitution. In response to the display gradation, a voltage different form G pixel may be applied to at least one of R pixel, B pixel and W pixel. By controlling the voltages applied to respective R, G, B and W pixels in response to the display gradation, gradation reproducibility in oblique viewing, color reproducibility of color image and the like can be improved. Also, the multi-gap liquid crystal layer and the RGBW pixel may be used in combination.

The liquid crystal display device is of a normally white mode, and the pair of the polarizing layers are arranged so that the respective absorption axes are substantially orthogonal to each other.

[Optical Compensation Film]

An example of the optical compensation film which can be used in the invention has a transparent support and an optically anisotropic layer formed from a composition containing a liquid crystal compound on the transparent support. Although the optical compensation film is a part of the liquid crystal panel unit in the invention, in an embodiment wherein the optical compensation film has the optically anisotropic layer and the transparent support, the transparent support may double as a transparent layer which is a part of the polarizing plate, and in such a case the optically anisotropic layer is considered as a part of the liquid crystal panel unit and the transparent support is considered as a part of the polarizing plate.

Hereinafter, the constituent materials of the optical compensation film utilizable in the invention will be described.

<<Support>>

The optical compensation film may have a support. The support is preferably a transparent polymer film. The support preferably has light transmittance of 80% or more. Examples of polymer constituting the polymer film include a cellulose ester (for example, cellulose mono- to tri-acylate), a norbornene polymer and a polymethyl methacrylate. Also a commercially available polymer (for example, ARTON or ZEONEX (trade names) in the norbornene polymer) may be used. Further, as to a known polymer easily exhibiting birefringence, for example, polycarbonate or polysulfone, a polymer in which the exhibition of birefringence has been restrained by a molecular modification as described in WO 00/26705 is preferably used.

Also, the support may be used as a protective film of a polarizing film, on the outermost surface of viewing side or backlight side of the liquid display device. In the case of using on the outermost surface of viewing side or backlight side of the liquid display device, the support is preferably imparted with a function, for example, a UV absorbing property, an antireflection property, an antiglare property, an antiscratching property, a light diffusion property, an antifouling property or increase in brightness, or is preferably used in combination with a layer having such a function, depending on the intended use.

Of the polymers, a cellulose ester is preferred, and a lower fatty acid eater of cellulose is more preferred. As the cellulose ester specifically preferred, those described in paragraphs [0183] to [0189] of JP-A-2007-286324 can be used.

In order to adjust the retardation of polymer film, a method of applying an external force, for example, stretching is ordinarily used. Alternatively, a retardation raising agent for adjusting the optical anisotropy is added, if desired. For example, compounds described, for example, in EP-A-911, 696, JP-A-2000-111914 and JP-A-2000-275434 are exemplified.

The additives described above and additives (for example, an ultraviolet inhibitor, a releasing agent, an antistatic agent, anti-degradation agent (for example, an antioxidant, a peroxide-decomposing agent, a radical inhibitor, a metal-inactivating agent, an acid scavenger or an amine) or an infrared absorbing agent) added according to various purposes, which are added to the polymer film may be solids or oily materials. In the case where the film is formed by multiple layers, the kinds and addition amounts of the additives in the respective layers may be different. As to details thereof, materials described in detail in Kogi-No. 2001-1754, pages 16 to 22 are preferably used. The amount of the additive used is not particularly limited as long as its function can be exhibited, and it is preferred to use in a range from 0.001 to 25% by weight based on the total composition of the polymer film.

In the invention, it is also preferred to incorporate a plasticizer having a number average molecular weight of 200 to 10,000, or to incorporate a plasticizer having a negative intrinsic birefringence. As specific examples of the plasticizer, for example, those described in paragraphs [0036] to [0108] of Japanese Patent Application No. 2009-85568 can be used. The number average molecular weight can be measured by a known method.

<<Production Method of Polymer Film (Support)>>

The polymer film is preferably produced by a solvent casting method. In the solvent casting method, the film is produced by using a solution (dope) prepared by dissolving a polymer material in an organic solvent. The dope is cast on a drum or a band, and the solvent is evaporated to form a film. The dope before casting is preferably adjusted so that the solid content thereof becomes 18 to 35%. The surface of the drum or band is preferably finished in a mirror state.

The dope is preferably cast on a drum or band having a surface temperature of 10° C. or less. It is preferred to dry by blowing air for 2 seconds or more after the casting. The film thus-obtained is released from the drum or band and may be dried with high temperature air successively changing the temperature from 100 to 160° C. to evaporate the residual solvent. The method is described in JP-B-5-17844. The method makes it possible to shorten the time between casting and releasing. In order to perform the method, the dope is required to be gelled at the surface temperature of the drum or band at the casting.

In the casting process, one kind of cellulose acylate solution may be cast as a single layer, or two or more kinds of cellulose acylate solutions may be co-cast simultaneously or successively.

The production process of the solvent casting method is described in detail in JP-A-2001-1745, pages 22 to 30 and is classified into dissolution, casting (including co-casting), metal support, drying, releasing, stretching and the like.

The thickness of the film (support) according to the invention is preferably from 15 to 120 μm, and more preferably from 20 to 80 μm.

Further, the polymer film according to the invention is subjected to various kinds of stretching, heat treatment and the like to achieve the desired optical characteristic. Specifically, methods described in paragraphs [0134] to [0165] of Japanese Patent Application No. 2009-85568 can be used.

Further, according to an embodiment of the invention, it is preferred that the polymer film is stretched in an oblique direction which is neither parallel nor orthogonal to the longitudinal direction of the film to exhibit a slow axis of the polymer film in the oblique direction which is neither parallel nor orthogonal to the longitudinal direction of the film from the standpoint that sticking of the film to a polarizer can be performed in a roll-to-roll manner. The slow axis direction of the polymer film is preferably a direction of ±45° to longitudinal direction of the film. As to the production method, a long film (unstretched film or stretched film) is stretched and while transporting the stretched film with gripping the both ends thereof by grippers of a tenter for oblique stretching (oblique stretching apparatus) the film is passed through an oven having a pre-heating zone, a stretching zone and a cooling zone, thereby producing the stretched film exhibiting the slow axis in an oblique direction. Examples of polymer constituting the polymer film include a cellulose ester (for example, cellulose mono- to tri-acylate), a norbornene polymer and a polymethyl methacrylate. Also a commercially available polymer (for example, ARTON or ZEONEX (trade names) in the norbornene polymer) may be used. Further, as to a known polymer easily exhibiting birefringence, for example, polycarbonate or polysulfone, a polymer in which the exhibition of birefringence has been restrained by a molecular modification as described in WO 00/26705 is preferably used.

<<Surface Treatment of Polymer Film (Support)>>

The polymer film is preferably subjected to a surface treatment. The surface treatment includes a corona discharge treatment, a glow discharge treatment, a flame treatment, an acid treatment, an alkali treatment and an ultraviolet ray irradiation treatment. These treatments are described in detail in Kogi-No. 2001-1745, pages 30 to 32. Of these treatments, an alkali saponification treatment is particularly preferred and is extremely effective as a surface treatment for a cellulose acylate film. Specifically, for example, descriptions in JP-A-2002-82226 and WO 02/46809 are exemplified.

<<Optical Characteristic of Transparent Support>>

As to the optical characteristic of the first and the second transparent supports for use in the invention, it is preferred that at a wavelength of 550 nm, in-plane retardation Re (550) is from 0 to 200 nm and retardation in a thickness direction Rth (550) is from −100 to 200 nm, more preferred that the Re (550) is from 20 to 100 nm and the Rth (550) is from −50 to 180 nm, most preferred that the Re (550) is from 30 to 60 nm and the Rth (550) is from −30 to 150 nm.

In the case where two optically anisotropic layers are formed on the first and the second transparent supports, respectively, it is preferred that the Re (550) is from 0 to 100 nm and the retardation in a thickness direction Rth (550) is from −50 to 150 nm.

The optical characteristic in the range described above is preferred from the standpoint of reproducibility of the actual image in an oblique direction Also, each of the difference of Re (550) and the difference of Rth (550) between the first transparent support and the second transparent support is preferably less than 10 nm, more preferably less than 8 nm, and most preferably less than 5 nm. By setting the difference of Re (550) and the difference of Rth (550) to the value described above, symmetry improvement in the reproducibility of the actual image in an oblique horizontal direction can be achieved.

It is also preferred that at least one of the difference of Re (550) and the difference of Rth (550) is 10 nm or more. It is more preferably 20 nm or more, and most preferably 30 nm or more. By setting the difference of Re (550) or the difference of Rth (550) to the value described above, improvement in the reproducibility of actual image in a specific oblique direction can be achieved.

<<Optically Anisotropic Layer>>

Next, a preferred embodiment of the optically anisotropic layer utilized in the invention will be described in detail. The optically anisotropic layer is preferably designed so as to compensate the liquid crystal compound in a liquid crystal cell of a liquid crystal display device in black display. The alignment state of the liquid crystal compound in the liquid crystal cell in black display differs depending on the mode of the liquid crystal display device. With respect to the alignment state of the liquid crystal compound in the liquid crystal cell, descriptions are given in *IDW '00, FMC*7-2, pages 411 to 414. The optically anisotropic layer preferably contains a liquid crystalline compound which is alignment-controlled by the alignment axis, for example, a rubbing axis and fixed in the alignment state.

Examples of the liquid crystalline compound for use in the formation of the optically anisotropic layer include a rod-like liquid crystalline compound which has a rod-like molecule structure and a discotic liquid crystalline compound which has a discotic molecule structure. The rod-like liquid crystalline compound and the discotic liquid crystalline compound may be a polymer liquid crystal or a low molecular liquid crystal and further include that which is formed by crosslinking of low molecular liquid crystal and does not show the liquid crystallinity any more. In the case where a rod-like liquid crystalline compound is used for producing the optically anisotropic layer, the rod-like liquid crystalline molecules are preferably in a state wherein an average direction of major axes of the molecules projected on the support surface is parallel to the alignment axis. Also, in the case where a discotic liquid crystalline compound is used for producing the optically anisotropic layer, the discotic liquid crystalline molecules are preferably in a state wherein an average direction of minor axes of the molecules projected on the support surface is parallel to the alignment axis. Also, a hybrid alignment described hereinafter is preferred wherein an angle (tilt angle) between the discotic plane and the layer plane changes in the depth direction.

<<First and Second Optically Anisotropic Layers>>

In the first and the second optically anisotropic layers formed on the transparent support according to the invention, a discotic liquid crystalline compound which has a discotic molecule structure is used. The discotic liquid crystalline compound may be a polymer liquid crystal or a low molecular liquid crystal and further includes that which is formed by crosslinking of low molecular liquid crystal and does not show the liquid crystallinity any more.

In the case of using a discotic liquid crystalline compound, the discotic liquid crystalline molecules are preferably in a state wherein an average direction of minor axes of the molecules projected on the support surface is parallel to the alignment axis. Also, a hybrid alignment described hereinafter is preferred wherein an angle (tilt angle) between the discotic plane and the layer plane changes in the depth direction.

<<Optically Anisotropic Layer A and Optically Anisotropic Layer B>>

In addition to the first and the second optically anisotropic layers, Optically anisotropic layer A and Optically anisotropic layer B are also preferably provided between the transparent support and the first and the second optically anisotropic layers.

In Optically anisotropic layer A and Optically anisotropic layer B, a rod-like liquid crystalline compound which has a rod-like molecule structure or a discotic liquid crystalline compound which has a discotic molecule structure is contained. The rod-like liquid crystalline compound and the discotic liquid crystalline compound may be a polymer liquid crystal or a low molecular liquid crystal and further include that which is formed by crosslinking of low molecular liquid crystal and does not show the liquid crystallinity any more. In the case where a rod-like liquid crystalline compound is used in the production of the optically anisotropic layer, the rod-like liquid crystalline molecules are preferably in a state wherein an average direction of major axes of the molecules projected on the support surface is parallel to the alignment axis. Also, in the case where a discotic liquid crystalline compound is used in the production of the optically anisotropic layer, the discotic liquid crystalline molecules are preferably in a state wherein an average direction of minor axes of the molecules projected on the support surface is parallel to the alignment axis. Further, a state wherein the major axes of the rod-like liquid crystalline molecules are horizontally aligned may be formed or a state wherein the minor axes of the discotic liquid crystalline molecules are horizontally aligned may be formed.

Moreover, a state of hybrid alignment wherein an angle (tilt angle) between the major axis of the rod-like liquid crystalline molecule or the discotic plane of the discotic liquid crystalline molecule and the layer plane changes in the depth direction is also possible to be formed.

By forming Optically anisotropic layer A and Optically anisotropic layer B in addition to the first and the second optically anisotropic layers, the optical characteristics of Optically anisotropic layer A and Optically anisotropic layer B contribute to the optical compensation and as a result, the gradation inversion performance and oblique actual image characteristic are improved while maintaining a high transmittance as the liquid crystal display device.

Also, in the case of using a retardation film which is not a layer containing a liquid crystal compound as Optically anisotropic layer A or Optically anisotropic layer B, the similar results can be achieved by adjusting the optical anisotropy of the retardation film or the arrangement of the retardation film.

<<Rod-Like Liquid Crystalline Compound>>

As the rod-like liquid crystalline compound, an azometine, an azoxy, a cyanobiphenyl, a cyanophenyl ester, a benzoate, a phenyl cyclohexanecarboxylate, a cyanophenylcyclohexane, a cyano-substituted phenylpyrimidine, an alkoxy-substituted phenylpyrimidine, a phenyldioxane, a tolan and an alkenyl-cyclohexylbenzonitrile are preferably used.

The rod-like liquid crystalline compound also includes a metal complex. Further, a liquid crystal polymer containing a rod-like liquid crystalline molecule in a repeating unit can be used as the rod-like liquid crystalline compounds. In other words, the rod-like liquid crystalline compound may be connected to a (liquid crystal) polymer.

With respect to the rod-like liquid crystalline compound, descriptions are given in *Quarterly Kagaku Sosetsu*, Vol. 22, Ekisho no Kagaku (1994), edited by The Chemical Society of Japan, Chapters 4, 7 and 11, and *Ekisho Device Handbook*, edited by 142 Committee of Japan Society for the Promotion of Science, 142th Iinkai, Chapter 3. The birefringence index of the rod-like liquid crystalline molecule is preferably in a range from 0.001 to 0.7.

In order to fix the alignment state, the rod-like liquid crystalline molecule preferably has a polymerizable group. The polymerizable group is preferably a radical-polymerizable unsaturated group or a cation-polymerizable group. Specifically, for example, polymerizable groups and polymerizable liquid crystal compounds described in paragraphs [0064] to [0086] of JP-A-2002-62427 are exemplified.

<<Discotic Liquid Crystalline Compound>>

Examples of the discotic liquid crystalline compound include benzene derivatives described in the research report of C. Destrade et al., *Mol. Cryst.*, Vol. 71, page 111 (1981), truxene derivatives described in the research report of C. Destrade et al., *Mol. Cryst.*, Vol. 122, page 141 (1985) and *Physics Lett. A*, Vol. 78, page 82 (1990), cyclohexane derivatives described in *Angew. Chem.*, Vol. 96, page 70 (1984), and azacrown series or phenylacetylene series macrocyclic compounds described in the research report of J. M. Lehn et al., *J. Chem. Commun.*, page 1794 (1985) and the research report of J. Zhang et al., *J. Am. Chem. Soc.*, Vol. 116, page 2655 (1994).

The discotic liquid crystalline compound includes a compound exhibiting a liquid crystallinity having a structure wherein a mother nucleus located at the molecular center is radially substituted with a straight-chain alkyl group, an alkoxy group or a substituted benzoyloxy group as a side chain. The compound is preferred a molecule or an aggregate of molecules of which has rotational symmetry and which can provide a definite alignment. In the optically anisotropic layer formed from a composition containing the discotic liquid crystalline compound, the compound finally contained in the optically anisotropic layer is not necessary to have the liquid crystallinity and, for example, a compound is also included which is originally a low molecular weight discotic liquid crystalline molecule having a group reactive with heat or light and undergoes polymerization or crosslinking with heat or light to become a high molecular weight compound and to lose the liquid crystallinity. Preferred examples of the discotic liquid crystalline molecule are described in JP-A-8-50206. Also, polymerization of the discotic liquid crystalline molecule is described in JP-A-8-27284.

In order to fix the discotic liquid crystalline molecule by polymerization, it is necessary to connect a polymerizable group as a substituent to the discotic core of the discotic liquid crystalline molecule. A compound wherein a discotic core and a polymerizable group are connected to each other through a linking group is preferred. Such a compound can maintain the alignment state even in the polymerization reaction. For example, compounds described in paragraphs [0151] to [0168] of JP-A-2000-155216 are exemplified.

In hybrid alignment, an angle between a discotic plane of the discotic liquid crystalline molecule and a plane of the optically anisotropic layer increases or decreases as the distance from the surface of support (or oriented film) in the depth direction of the optically anisotropic layer increases. The angle preferably increases as the distance increases. Further, as to change in the angle, continuous increase, continuous decrease, intermittent increase, intermittent decrease, a change including continuous increase and continuous decrease and intermittent change including increase and decrease are possible. The intermittent change contains a region where the tilt angle does not change in the middle of the depth direction. It suffices for the angle to change increasingly or decreasingly as a whole even when there is a region where the angle does not change. Further, it is preferred for the angle to change continuously.

The average direction of the major axis of the discotic liquid crystalline molecule on the support (or oriented film) side can be ordinarily adjusted by selecting the discotic liquid crystalline molecule or a material of the oriented film or by selecting a rubbing treatment method. The direction of the discotic plane of the discotic liquid crystalline molecule on the surface side (air side) can be ordinarily adjusted by selecting the discotic liquid crystalline molecule or both the discotic liquid crystalline molecule and the kind of an additive together. Examples of the additive used together with the discotic liquid crystalline compound include a plasticizer, a surfactant, a polymerizable monomer and a polymer. The degree of change in alignment direction of the major axis can also be adjusted by selecting the liquid crystalline compound and the additive in the same manner as described above.

<<Other Additives in Optically Anisotropic Layer>>

A plasticizer, a surfactant, a polymerizable monomer or the like can be used together with the liquid crystalline compound to improve uniformity of a coated film, strength of a film, an alignment property of the liquid crystalline molecule and the like. As the additives, those which have compatibility with the liquid crystalline molecule and can cause change in the tilt angle of the liquid crystalline molecule or do not inhibit the alignment are preferred. Specifically, compounds described in JP-A-2002-296423, JP-A-2001-330725 and JP-A-2000-155216 are preferred.

<<Formation of Optically Anisotropic Layer>>

The optically anisotropic layer can be formed by preparing a composition containing at least one kind of liquid crystalline compound and, if desired, a polymerization initiator or an any desired component described hereinafter, for example, as a coating solution and coating the coating solution on a surface (for example, a rubbing treatment surface) of an oriented film.

As a solvent used for preparing the coating solution, an organic solvent is preferably used. Examples of the organic solvent include an amide (for example, N,N-dimethylformamide), a sulfoxide (for example, dimethylsulfoxide), a heterocyclic compound (for example, pyridine), a hydrocarbon (for example, benzene or hexane), an alkyl halide (for example, chloroform, dichloromethane or tetrachloroethane), an ester (for example, methyl acetate or butyl acetate), a ketone (for example, acetone or methyl ethyl ketone) and an ether (for example, tetrahydrofuran or 1,2-dimethoxyethane). An alkyl halide and a ketone are preferred. Two or more kinds of the organic solvents may be used in combination.

Coating of the coating solution can be performed by a known method (for example, a wire bar coating method, an extrusion coating method, a direct gravure coating method, a reverse gravure coating method or a die coating method).

The thickness of the optically anisotropic layer is preferably from 0.1 to 20 μm, more preferably from 0.5 to 15 μm, and most preferably from 1 to 10 μM.

<<Fixation of Alignment State of Liquid Crystalline Molecule>>

The liquid crystalline molecule aligned on a surface, for example, of an oriented film is preferably fixed while maintaining the alignment state thereof. The fixation is preferably performed by a polymerization reaction. The polymerization reaction includes a heat polymerization reaction using a heat polymerization initiator and a photopolymerization reaction using a photopolymerization initiator. For the fixation, the photopolymerization reaction is preferably used.

The amount of the photopolymerization initiator used is preferably in a range from 0.01 to 20% by weight, more preferably in a range from 0.5 to 5% by weight, based on the composition (solid content in the case of the coating solution).

Light irradiation for the polymerization of liquid crystalline molecule is preferably conducted using an ultraviolet ray. The irradiation energy is preferably in a range from 20 to 50 J/cm$^2$, more preferably in a range from 20 to 5,000 mJ/cm$^2$, and still more preferably in a range from 100 to 800 mJ/cm$^2$. In order to accelerate the photopolymerization reaction, the light irradiation may be performed under heat condition.

A protective layer may be provided on the optically anisotropic layer

Each of the first and the second optically anisotropic layers utilized in the invention is preferably a layer formed by fixed a liquid crystalline composition containing a discotic liquid crystalline compound in a hybrid alignment state. According to the embodiment, the alignment control direction of the optically anisotropic layer is determined, for example, by a rubbing axis of rubbing treatment subjected to a surface of oriented film utilized for the formation of optically anisotropic layer and commonly coincides with the direction of rubbing axis.

In the case where the optically anisotropic layer is hybrid-aligned, a ratio between retardation R [+40°] measured in a direction inclined 40° to a normal direction and retardation R [−40°] measured in a direction inversely inclined 40° to the normal direction in a plane orthogonal to the in-plane slow axis satisfies formula (I) or (II) shown below:

when R [+40°]>R [−40°], $$1.1 \leq R[+40°]/R[-40°] \leq 40 \quad (I)$$

when R [+40°]<R [−40°], $$1.1 \leq R[-40°]/R[+40°] \leq 40 \quad (II)$$

<<Optical Characteristic of Optically Anisotropic Layer>>

As to the optical characteristic of the first and the second optically anisotropic layers used in the invention, in-plane retardation Re (550) at a wavelength of 550 nm is preferably from 10 to 100 nm, more preferably from 10 to 80 nm, and most preferably from 20 to 70 nm.

As the optical characteristic of the optically anisotropic layer A and the optically anisotropic layer B, in-plane retardation Re (550) at a wavelength of 550 nm is preferably from 5 to 150 nm, and more preferably from 10 to 100 nm.

In the range of the optical characteristic described above, the high transmittance as the liquid crystal display device can be maintained.

<<Oriented Film>>

In the invention, it is preferred that the liquid crystalline compound in the optically anisotropic layer is alignment-controlled by an alignment axis and is fixed in the state. As the alignment axis which functions to alignment-control the liquid crystalline compound, a rubbing axis of an oriented film formed between the optically anisotropic layer and the polymer film (support) is exemplified. In the invention, however, the alignment axis is not limited to the rubbing axis and may be any one that can alignment-control the liquid crystalline compound similar to the rubbing axis.

The oriented film has a function of determining the alignment direction of the liquid crystalline molecule. Therefore, the oriented film is necessary for realizing a preferred embodiment of the invention. However, once the liquid crystalline compound is fixed in the alignment state after the alignment, the oriented film has completed its function, and hence it is not always necessary as the constituent element of the invention. That is, it is possible to transfer only an optically anisotropic layer having a fixed alignment state on an oriented film to a polarizer or other transparent film to produce the polarizing plate or the optical compensation film according to the invention.

The oriented film can be provided by such a means as a rubbing treatment of an organic compound (preferably a polymer), inclined vapor deposition of an inorganic compound, formation of a layer having micro-grooves and accumulation of an organic compound (for example, w-tricosanoic acid, dioctadecylmethylammonium chloride or methyl stearate) by Langmuir-Blodgett method (LB membrane). Further, an oriented film which generates an alignment function upon application of an electric field, application of a magnetic field or irradiation with light is also known.

The oriented film is preferably formed by a rubbing treatment of a polymer. The polymer used in the oriented film has in principle a molecular structure having a function capable of aligning liquid crystalline molecules. In the invention, it is preferred to connect a side chain having a crosslinkable functional group (for example, a double bond) in addition to the function of capable of aligning liquid crystalline molecules to the main chain or to introduce a crosslinkable functional group having the function of capable of aligning liquid crystalline molecules into a side chain. As the polymer used in the oriented film, any of a polymer which itself can cause crosslinking and a polymer which can be crosslinked with a crosslinking agent may be used, and plural combinations thereof may also be used. Examples of the polymer include a methacrylate copolymer described in paragraph [0022] of JP-A-8-338913, a styrene copolymer, a polyolefin, polyvinyl alcohol and a modified polyvinyl alcohol, poly(N-methylolacrylamide), a polyester, a polyimide, a vinyl acetate copolymer, carboxymethyl cellulose and a polycarbonate. A silane coupling agent may be used as the polymer. A water-soluble polymer (for example, poly(N-methylolacrylamide), carboxymethyl cellulose, gelatin, polyvinyl alcohol or a modified polyvinyl alcohol) is preferred, gelatin, polyvinyl alcohol and a modified polyvinyl alcohol are more preferred, and polyvinyl alcohol and a modified polyvinyl alcohol are most preferred. It is particularly preferred to use in combination two or more kinds of polyvinyl alcohols or modified polyvinyl alcohols different in a polymerization degree. Specific examples of the modified polyvinyl alcohol include those described, for example, in paragraphs [0022] to [0145] of JP-A-2000-155216 and paragraphs [0018] to [0022] of JP-A-2002-62426.

The saponification degree of polyvinyl alcohol is preferably from 70 to 100%, and more preferably from 80 to 100%. The polymerization degree of polyvinyl alcohol is preferably from 100 to 5,000.

By connecting a side chain having a crosslinkable functional group to a main chain of a polymer of oriented film or introducing a crosslinkable functional group into a side chain having the function of capable of aligning liquid crystalline molecules, the polymer of oriented film and a multifunctional monomer contained in the optically anisotropic layer can be copolymerized. As a result, a strong connection by a covalent bond is formed not only between the multifunctional monomer and the multifunctional monomer, but also between the polymer of oriented film and the polymer of oriented film and between the multifunctional monomer and the polymer of oriented film. Therefore, the strength of optical compensation sheet can be remarkably improved by introducing a crosslinkable functional group into the polymer of oriented film.

The crosslinkable functional group of the polymer of oriented film preferably contains a polymerizable group similarly to the multifunctional monomer. Specifically, these described, for example, in paragraphs [0080] to [0100] of JP-A-2000-155216 are exemplified.

The polymer of oriented film may also be crosslinked by using a crosslinking agent instead of introducing the crosslinkable functional group. Examples of the crosslinking agent include an aldehyde, an N-methylol compound, a dioxane derivative, a compound functioning by activating a carboxyl group, an active vinyl compound, an active halogen compound, an isoxazole and a dialdehyde starch. Two or more kinds of the crosslinking agents may be used in combination. Specifically, compounds described, for example, in paragraphs [0023] to [0024] of JP-A-2002-62426 are exemplified. An aldehyde having a highly reactivity, particularly, glutaraldehyde is preferred.

The addition amount of the crosslinking agent is preferably from 0.1 to 20% by weight, more preferably from 0.5 to 15% by weight, based on the polymer. The amount of unreacted crosslinking agent remaining in the oriented film is preferably 1.0% by weight or less, and more preferably 0.5% by weight or less. A sufficient durability of the oriented film can be obtained without the generation of reticulation even when the oriented film is used for a long period of time in a liquid crystal display device or even when the oriented film is allowed to stand for a long period of time under an atmosphere of high temperature and high humidity, by adjusting the amounts as described above.

The oriented film can be basically formed by coating a coating solution containing the polymer which is a material for forming the oriented film and a crosslinking agent on a transparent support, drying with heating (to cause crosslinking), and subjecting the coated film to a rubbing treatment. The crosslinking reaction can be conducted at any appropriate stage after coating on the transparent support as described above. In the case of using a water-soluble polymer, for example, polyvinyl alcohol as the material for forming the oriented film, the coating solution preferably contains a mixed solvent of an organic solvent (for example, methanol) having a defoaming function and water. The ratio of water:methanol by weight is preferably from 0:100 to 99:1, more preferably from 0:100 to 91:9. Thus, the generation of foam can be suppressed, and defects of the oriented film and further, defects of the layer surface of optically anisotropic layer can be remarkably reduced.

As a coating method utilized in the formation of the oriented film, a spin coating method, a dip coating method, a curtain coating method, an extrusion coating method, a rod coating method or a roll coating method is preferred. Particularly, a rod coating method is preferred. The thickness of the oriented film after drying is preferably from 0.1 to 10 μm. The drying with heating can be conducted at a temperature from 20 to 110° C. In order to perform sufficient crosslinking, the temperature is preferably from 60 to 100° C., and particularly preferably from 80 to 100° C. The drying time may be from 1 minute to 36 hours, and is preferably from 1 to 30 minutes. The pH is preferably set to a level optimal for the crosslinking agent used. In the case of using glutaraldehyde, the pH is from 4.5 to 5.5, and particularly preferably 5.

The oriented film is provided on a transparent support or an undercoat layer. The oriented film can be obtained by crosslinking the polymer layer as described above and then subjecting the surface of layer to a rubbing treatment.

Then, the liquid crystalline molecules of the optically anisotropic layer provided on the oriented film are aligned by utilizing the function of the oriented film. Thereafter, if desired, the polymer of oriented film is reacted with the multifunctional monomer contained in the optically anisotropic layer or the polymer of the oriented film is crosslinked with a crosslinking agent.

The thickness of the oriented film is preferably in a range from 0.1 to 10 μm.

Also, the optical compensation film may be produced by stretching a film.

<<Ellipsoidal Polarizing Plate>>

In the invention, an elliptically polarizing plate wherein the optically anisotropic layer is unified with a linear polarizing film may be used. The elliptically polarizing plate is preferably molded in approximately the same form as a pair of substrates constituting a liquid crystal cell so as to be incorporated as it is in a liquid crystal display device. (For example, when the liquid crystal cell is in a rectangular form, the elliptical polarizing plate is preferably formed in the same rectangular form.) In the invention, the alignment axis of the substrate of the liquid crystal cell is adjusted to make a specific angle with the absorption axis of the linear polarizing film and/or the alignment axis of the optically anisotropic layer.

The elliptical polarizing plate can be prepared by stacking the optical compensation film and a linear polarizing film (hereinafter, the term "polarizing film" when simply referred to means a "linear polarizing film"). The optical compensation film may double as a protective film of the linear polarizing film.

The linear polarizing film is preferably a coating type polarizing film as represented by Optiva, Inc. or a polarizing film comprising a binder and iodine or a dichroic dye. The iodine and dichroic dye in the linear polarizing film develop a polarizing performance by alignment in the binder. It is preferred for the iodine and dichroic dye to align along the binder molecules, or for the dichroic dye to align in one direction due to self-organization as in a crystal. A currently commercially available polarizer is commonly produced by dipping a stretched polymer in a solution of iodine or a dichroic dye contained in a bath to impregnate the iodine or dichroic dye into the binder.

<<Liquid Crystal Display Device>>

Various liquid crystal display devices are able to apply to the twisted alignment mode liquid crystal display device according to the invention. In particular, in the case of using a liquid crystal display device of low light directivity, even when the liquid crystal display device is obliquely viewed under light environment, for example, outdoors, the bright image can be observed.

In the case of using the liquid crystal display device of low light directivity as the liquid crystal display device according to the invention, when the front brightness is defined as Y and the brightness viewed from an angle of 45 degrees is defined as Y (Φ, 45) (wherein, Φ represents an azimuth angle and 45 represents a polar angle), the liquid crystal panel in which an average value of brightness ratio in all azimuth angles Y (Φ, 45)/Y is in a range from 0.15 to 1 is preferred because the bright image can be observed. The average value of brightness ratio is more preferably from 0.3 to 1.

Also, it is preferred that Y (Φ, 45) which is an average value of brightness at a polar angle of 45 degrees is from 45 to 500 cd/m$^2$ because the bright image can be observed. The value of brightness is more preferably from 85 to 500 cd/m$^2$.

In liquid crystal display devices currently commonly used in which a twisted alignment mode liquid crystal cell is employed, an absorption axis of a first polarizing plate is arranged at an angle of 0° to a director direction of liquid crystals on the surface of substrate in a liquid crystal cell adjacent to the first polarizing plate, and the absorption axis of the first polarizing plate and an absorption axis of a second polarizing plate are orthogonally crossed with each other.

However, in the liquid crystal display device according to the invention, an absorption axis of a first polarizing plate is arranged approximately at an angle of 45° to a director direction of liquid crystals on the surface of substrate in a liquid crystal cell adjacent to the first polarizing plate and the absorption axis of the first polarizing plate and an absorption axis of a second polarizing plate are orthogonally crossed with each other.

It is preferred from the standpoint of CR viewing angle symmetry in the vertical and horizontal directions in the case where the absorption axis of the polarizing plate on the viewer side is 0° (horizontal direction) that the director of liquid crystals on the surface of substrate in the liquid crystal cell is set in an azimuth rotated clockwise the rubbing direction of the surface of substrate in both the front side substrate and the rear side substrate.

Also, it is preferred from the standpoint of CR viewing angle symmetry in the vertical and horizontal directions in the case where the absorption axis of the polarizing plate on the viewer side is 90° (vertical direction) that the director of liquid crystals on the surface of substrate in the liquid crystal cell is set in an azimuth rotated anticlockwise the rubbing direction of the surface of substrate in both the front side substrate and the rear side substrate.

Also, in the constitution described above, it is preferred that when retardation in the slow axis direction of the first optically anisotropic layer is taken as a positive number and retardation in a direction orthogonal to the slow axis direction is taken as a negative number, a sum of the retardation of the first transparent support and the retardation of the first optically anisotropic layer Re1_sum satisfies −150 nm≤Re1_sum≤60 nm, and when retardation in the slow axis direction of the second optically anisotropic layer is taken as a positive number and retardation in a direction orthogonal to the slow axis direction is taken as a negative number, a sum of the retardation of the second transparent support and the retardation of the second optically anisotropic layer Re2_sum satisfies −150 nm≤Re2_sum≤60 nm, more preferred that the Re1_sum and the Re2_sum satisfy −100 nm≤Re1_sum, Re2_sum≤45 nm, most preferred that the Re1_sum and the Re2_sum satisfy −50 nm≤Re1_sum, Re2_sum≤30 nm. The optical characteristic in the range described above can inhibit the degradation of front white brightness.

Further, the liquid crystal display device according to the invention preferably comprises the first polarizing layer, the first transparent support, the layer formed by curing a composition containing a first liquid crystal compound, the twisted alignment mode liquid crystal cell arranged between the first and the second substrates, the layer formed by curing a composition containing a second liquid crystal compound, the second transparent support and the second polarizing layer stacked in this order. The constitution is preferred from the standpoint of improvement in the reproducibility of actual image in an oblique direction.

Also, the liquid crystal display device according to the invention preferably comprises the first polarizing layer, the layer formed by curing a composition containing a first liquid crystal compound, the first transparent support, the twisted alignment mode liquid crystal cell arranged between the first and the second substrates, the second transparent support, the layer formed by curing a composition containing a second liquid crystal compound and the second polarizing layer stacked in this order. The constitution is preferred from the standpoint of improvement in the contrast in an oblique direction.

Also, in the constitution described above, it is preferred that when retardation in the slow axis direction of the layer formed by curing a composition containing a first liquid crystal compound is taken as a positive number and retardation in a direction orthogonal to the slow axis direction is taken as a negative number, a sum of the retardation of the optically anisotropic layer A and the retardation of the layer formed by curing a composition containing a first liquid crystal compound Re1A_sum satisfies $-150$ nm$\leq$Re1A_sum$\leq$60 nm, and when retardation in the slow axis direction of the layer formed by curing a composition containing a second liquid crystal compound is taken as a positive number and retardation in a direction orthogonal to the slow axis direction is taken as a negative number, a sum of the retardation of the optically anisotropic layer B and the retardation of the layer formed by curing a composition containing a second liquid crystal compound Re2B_sum satisfies $-150$ nm$\leq$Re2B_sum$\leq$60 nm, more preferred that the Re1A_sum satisfies $-100$ nm$\leq$Re1A_sum$\leq$45 nm and the Re2B_sum satisfies $-100$ nm$\leq$Re2B_sum$\leq$45 nm, most preferred that the Re1A_sum satisfies $-50$ nm$\leq$Re1A_sum$\leq$30 nm and the Re2B_sum satisfies $-50$ nm$\leq$Re2B_sum$\leq$30 nm. The optical characteristic in the range described above can inhibit the degradation of front white brightness.

Further, the liquid crystal display device according to the invention may contain other members. For example, a color filter may be arranged between the liquid crystal cell and the polarizing film. Also, in the case of using as a transmission type liquid crystal display device, a backlight using a light source, for example, a cold cathode or hot cathode fluorescent tube, a light emitting diode, a field emission device or an electroluminescent device can be arranged on the back side. Also, the liquid crystal display device according to the invention may be a reflection type. In that case, one sheet of the polarizing plate is arranged only on the observation side, and a reflection film is arranged either on the back surface of the liquid crystal cell or on the internal surface of the lower side substrate of the liquid crystal cell. As a matter of course, a frontlight using the light source may be provided on the observation side of the liquid crystal cell. Moreover, the liquid crystal display device according to the invention may be a semi-transmission type in which a reflection part and a transmission part are provided in one pixel of the display device in order to establish both the transmission mode and the reflection mode.

<<Surface Film>>

Also, the liquid crystal display device according to the invention may be provided with a surface film, for example, a light diffusion layer on the outermost surface of the viewing side thereof.

As to the light diffusion layer as the surface film, although those heretofore known can be used, the light diffusion layer is preferably a layer containing a light-transmitting resin and a light-transmitting fine particle having a refractive index different from a refractive index of the light-transmitting resin and haze of the light diffusion layer is 10% or more. The haze value can be adjusted according to the difference in the refractive indexes between the light-transmitting fine particle and the light-transmitting resin, a particle size of the light-transmitting fine particle and an amount of the light-transmitting fine particle contained. As the light-transmitting fine particles, light-transmitting fine particles having the same particle size and the same material may be used alone or various kinds of light-transmitting fine particles different in the particle size and/or the material may be used. The latter is preferred because the haze value can be regulated. Further, it is also preferable to use an anisotropic which varies a light-transmitting state depending on an incidence angle of incident light. Specifically, those described in JP-A-10-96917 and a diffraction type visual angle improved film (for example, LUMISTY produced by Sumitomo Chemical Co., Ltd.) may be used.

The surface film of the anisotropic light diffusion layer is preferably an optical film (hereinafter, referred to as optical film T) comprising a first domain of a polymer composition and a second domain disposed inside the first domain, wherein the second domain is a bubble having a morphology anisotropy, and the average alignment direction of the main chain of the polymer molecule in the first domain differs from the average direction of the major axis of the second domain.

The average alignment direction of the main chain of the polymer molecule as referred to herein indicates the direction in which the polymer molecules are aligned in the film in-plane direction, and the thermal expansion coefficient and the humidity expansion coefficient in the direction are smaller than those in the direction orthogonal thereto. Thus, for instance, the morphology change of the bubbles caused by the dimensional change due to the external heat, for example, a backlight and the morphology change of the bubbles caused by the dimensional change due to the change of humidity environment can be inhibited so that when the film is incorporated into a liquid crystal display, the brightness unevenness can be inhibited. The average alignment direction of the main chain of the polymer molecule can be determined, for example, according to X-ray diffraction measurement described below and also as a simple manner, it can be considered as the direction in which the in-plane elasticity modulus of the film is highest.

<X-Ray Diffraction Measurement>

The X-ray diffraction measurement of the optical film T is conducted by humidity conditioning of the film at 25° C. and relative humidity of 60% for 24 hours and then obtaining a diffraction picture of the beam transmitted through the film (Cu-Kα ray, 50 kV, 200 mA, 10 minutes) using an automatic X-ray diffraction apparatus (RINT 2000, produced by Rigaku Corp.) and a multi-purpose imaging plate reader (R-AXIS DS3C/3CL).

The second domain is a bubble arranged inside the first domain and having a morphology anisotropy. The average direction of the major axis of the second domain is different from the average alignment direction of the main chain of the polymer molecule in the first domain.

Ordinarily, the average direction of the major axis of the second domain is approximately in parallel to the stretching direction, that is, the direction of the polymer main chain, but in the film T according to the invention it is quite different from the direction of the polymer main chain.

Not adhering to any theory, it is believed that this is caused by tearing of the crystalline region and the non-crystalline region formed in the polymer during the film formation process by stretching in a predetermined temperature range. Specifically, it is supposed that when the film is stretched at an appropriate temperature, only the non-crystalline region is torn and when the stretching ratio exceeds a predetermined level, crack-like voids are formed between the polymers, whereby the major axis of the second domain is aligned in the direction different from the stretching direction.

In the optical film T, the second domain is arranged inside the first domain, but the arrangement of other bubbles is not particularly limited as far as it is not contrary to the spirit of the invention and, for example, bubbles existing near the film surface may have a pore-like shape in which the bubbles open on the film surface. Also, the second domain may partly contain any other ingredient than vapor as far as it is not contrary to the spirit of the invention. For example, the second domain may contain a polymer having a composition different from that of the polymer used in the first domain, or may be filled with water, an organic solvent or the like. Preferably, the bubble of the second domain is filled with a vapor from the standpoint of controlling the refractive index of the film to fall within a preferred range of the invention, more preferably filled with air. In particular, the case where the second domain contains a solid component includes an embodiment where a minute amount of a substance evaporated during film formation or any other powder or the like adhered to the second domain.

The morphology anisotropy as referred to in the invention means that the outward configuration has an anisotropy. The bubble of such an anisotropy has a long direction as its outward configuration, like an oval or a rod, and the length in that direction is referred to as the major axis of the second domain in the invention. The outward configuration may have some irregularities.

In the specification, the major axis of the second domain is not particularly limited in view of the average direction thereof and preferably, the average direction of the major axis of the second domain is in the parallel direction to the film plane.

The major axis average direction and the major axis average length of the second domain can be determined by observing a cross section of the film cut in any desired direction, for example, by an electron microscope. In the case where the major axis of the second domain exists in the direction parallel to the film plane, the major axis average direction and the major axis average length of the second domain can be determined according to the method described below. The average direction of the main chain of the polymer molecule of the film determined in the measurement described above is taken as 0°, and the film is cut vertically to the film plane at intervals of 5° from the 0° direction to the 180° direction in the film plane. For example, in the case where a film having a rectangular shape is observed, when the 0° direction indicating the average direction of the main chain of the polymer molecule is in the longitudinal direction of the film, the 90° direction is the cross direction of the film and the 180° direction is again the longitudinal direction of the film which is the same as the average direction of the main chain of the polymer molecule. All the cross sections (37 cross sections of the film in the invention) are observed, for example, by an electron microscope, 100 second domains are selected at random in every cross section, the lengths of the major axes of all these 100 second domains are measured, and the average values thereof are obtained. Of those 37 cross sections of the film, one in which the average length of the major axes of 100 second domains (width of the second domain in the cross section) is the largest is selected, and the angle at which the film is cut to give the cross section is taken as the average direction of the major axis of the second domain in the specification. The average length of the major axes of those 100 second domains at that angle is taken as the major axis average length of the second domain in the specification. Hereinafter, in the specification, the major axis average length of the second domain is also referred to as "average length (a) of the major axis of the second domain".

Next, the minor axis average length in the film in-plane direction of the second domain can be determined according to the method described below. Of the angles at which the film is cut to give the 37 cross sections described above, the angle at which the major axis average direction is determined is shifted by 90°, in the film cross section at that shifted angle, 100 second domains are selected at random, and the lengths of the axes parallel to the film in-plane direction of those 100 second domains in the cross section (width of the second domain in the cross section) are measured, and the average value thereof is obtained. The value obtained is taken as the minor axis average length in the film in-plane direction of the second domain. Hereinafter, in the specification, the minor axis average length in the film in-plane direction of the second domain is referred to as "minor axis average length (b) in the film in-plane direction of the second domain".

On the other hand, the minor axis average length in the film thickness direction of the second domain can be determined according to the method described below. In the cross section of the film cut at the angle at which the average direction of the major axis of the second domain is determined, 100 second domains are selected at random, and the lengths of the axes parallel to the film-thickness direction in the cross section of those 100 second domains (length in the longitudinal direction of the second domain in the cross section) are measured, and the average value thereof is obtained. The value obtained is taken as the minor axis average length in the film thickness direction of the second domain. Hereinafter, in the specification, the minor axis average length in the film thickness direction of the second domain is also referred to as "minor axis average length (c) in the film thickness direction of the second domain".

As the average direction of the major axis of the second domain differs from the average alignment direction of the main chain of the polymer molecule in the first domain, the optical film can be inhibited from the change of form by heat or the like.

A ratio of the major axis average length of the second domain to the minor axis average length in the film in-plane direction of the second domain, that is, (average length (a) of the major axis of the second domain)/(minor axis average length (b) in the film in-plane direction of the second domain) is preferably from 1.1 to 30 from the standpoint of more effectively dispersing the pressure to the change of form by heat or the like. The ratio of the major axis average length of the second domain to the minor axis average length in the film in-plane direction of the second domain is more preferably from 2 to 20, and particularly preferably from 3 to 10.

A ratio of the major axis average length of the second domain to the minor axis average length in the film thickness direction of the second domain, that is, (average length (a) of the major axis of the second domain)/(minor axis average length (c) in the film thickness direction of the second domain) is preferably from 30 to 300 from the standpoint of the possibility that the film may have a high haze and an increased whole light transmittance as the curved surface is made gentle relative to the light traveling direction. The ratio of the major axis average length of the second domain to the minor axis average length in the film thickness direction of the second domain is more preferably from 50 to 250, and particularly preferably from 100 to 200.

The refractive index n1 of the first domain is larger by from 0.01 to 1.00 than the refractive index n2 of the second domain, more preferably by from 0.2 to 0.8, and still more preferably by from 0.4 to 0.6. As the refractive index difference is larger, the oblique outgoing light can be more refracted in the front direction. On the other hand, when the refractive index difference (n1−n2) is 1.00 or lee, it is preferred in that the oblique outgoing light is not refracted too much and the front brightness can fall within a preferred range. The refractive index difference in the range described above is preferred in view of both the diffusion performance and the front brightness sustainability.

The refractive index of each domain can be measured, for example, by an ellipsometer (M220 produced by JASCO Corp.).

The size of the second domain is preferably 0.02 µm or more, more preferably 0.1 µm or more, and still more preferably 1 µm or more. As the size of the second domain composed of bubble is larger, the light diffusion performance is preferably more increased, but, the whole light transmittance tends to decrease. From the standpoint of sustaining the whole light transmittance, the size of the second domain is preferably 10 μm or less, and more preferably 5 μm or less.

The size of domain means a sphere-corresponding diameter. The size of domain is taken as the sphere-corresponding diameter thereof, a radius, r, of the domain is determined, and the volume thereof is determined. The sphere-corresponding diameter is represented by formula (1) shown below in which a volume of the second domain (bubble) having an anisotropic morphology is represented by V. The size of domain can be measured by an electron microscope.

$$\text{Sphere-corresponding diameter} = 2 \times (3 \times V/(4 \times \pi))^{(1/3)} \quad \text{Formula (1)}$$

The volume V of the second domain (bubble) in the formula above is calculated as $V = 4/3 \times \pi \times (a/2 \times b/2 \times c/2)$ assuming that the second domain is an ellipsoidal body and using the average length (a) of the major axis of the second domain, the minor axis average length (b) in the film in-plane direction of the second domain and the minor axis average length (c) in the film thickness direction of the second domain described above.

The volume fraction of the second domain in the optical film T is preferably from 20 to 70%, more preferably from 30 to 60%, and still more preferably from 40 to 50%. As the volume fraction is higher, the diffusibility can be more increased. On the other hand, when the volume fraction is 70% or less, the whole light transmittance is hard to decrease and the front brightness can fall within a preferred range, and in addition, the film strength does not decrease too much. The volume fraction of the second domain of a bubble in the range above is preferred in view of both the light diffusion performance and the strength.

The volume fraction means the ratio of the volume of the second domain to the total volume of the film and can be calculated based on the size of each domain measured in the manner described above.

The volume fraction can be determined from the area of the second domain and the area of the cross section of the film in electron micrograph of the cross section of the film. In the invention, the volume fraction is taken as an average value of the data of the area fraction of the second domain in 100 sites in the cross section of the film cut in the thickness direction at an angle at which the average direction of the major axis of the second domain is determined (cross section cut in the direction vertical to the film plane).

(Density Distribution in Thickness Direction)

In the optical film T, it is preferred that the second domain has a density distribution in the thickness direction. As the second domain has the density distribution in the thickness direction, the distance from scattering to the next scattering can be shortened and the amount of scattering can be gradually changed so that the scattering directivity tends to direct in the forward direction. As a result, the whole light transmittance of the film with the same haze can be increased than in uniform distribution scattering. In addition, as having a high-density region of the second domain in the thickness direction, the brittleness of the film as a whole is more effectively inhibited.

Taking the above into consideration, it is preferred to form a region having a high density of the second domain in the thickness direction such that 70% or more of all bubbles are contained in a half of the thickness. The high-density region of the second domain in the thickness direction may be present in the center of the film or in the surface of the film. In the case where the high-density region of the second domain in the thickness direction is present in the surface of the film, it is desirable that the high-density region of the second domain in the film thickness direction is arranged on the side opposite to the side of the film to which a polarizing plate is stuck, in order to more easily conduct working of the polarizing plate. The density distribution value of the second domain is preferably 70% or more, more preferably 75% or more, and particularly preferably 80% or more. The density distribution value of the second domain can be determined according to the method described below.

The density distribution value means a volume ratio of the second domain in the part of a half of the thickness when the half part of the thickness in which the density of the second domain is highest is selected. Similar to the above, the value can be determined, for example, in electron micrograph of the film cross section cut in the thickness direction at an angle at which the mean direction of the major axis of the second domain is determined (the cross section cut in the direction vertical to the film plane).

The haze of the optical film T is preferably from 5 to 50%, more preferably from 5 to 40%, and still more preferably from 5 to 30%. As the haze is higher, it more contributes to decrease in the front contrast. From this standpoint, the haze of the optical film T is preferably 50% or less, and more preferably 40% or less. The haze can be measured by a haze meter (NDH 2000 produced by Nippon Denshoku Industries Co., Ltd.).

(First Domain)

The first domain comprises a polymer composition. The polymer utilized is not limited and is preferably selected from polymers having a high light transmittance to a visible light. Taking in consideration that the refractive index of the second domain composed of a bubble is approximately 1.00 and the preferred volume fraction thereof described above, the refractive index n1 of the first domain is preferably 1.1 or more, more preferably 1.2 or more, still more preferably 1.3 or more, in order to achieve the preferred refractive index difference between the first and second domains described above. Examples of the polymer satisfying these characteristics include a cellulose acylate, a polycarbonate, polyvinyl alcohol, a polyimide, a polyolefin, a polyarylate, a polyester, a polystyrene, a styrene copolymer, polymethyl methacrylate, a methyl methacrylate copolymer and polyvinylidene chloride, but the invention should not be construed as being limited thereto. Taking in consideration that a polarizing film to be stuck is a polyvinyl alcohol film, it is preferred to contain a cellulose acylate or polyvinyl alcohol which has an affinity to the polyvinyl alcohol film and has good adhesiveness as the main component polymer, and from the standpoint of the time-lapse stability, a cellulose acylate is more preferred. The term "main component polymer" as referred to herein means, when the film is formed of a single polymer, the polymer itself, and when the film is formed of plural polymers, it means a polymer having the highest weight fraction of all the constituting polymers.

The cellulose acylate and additives which may be used are described in paragraphs [0024] to [0028] of JP-A-2009-265633 and these are similarly used in the invention.

The method for producing the optical film T is described in paragraphs [0029] to [0036] of JP-A-2009-265633 and it is similarly used in the invention. However, in the method for producing the optical film T, the stretching maximum stress in the stretching direction applied to the film being stretched is preferably controlled to be from 10 to 75 MPa, and more preferably from 25 to 70 MPa.

The optical film T is preferably a film obtained by stretching a film comprising a polymer composition and having a haze of 1% or less at a stretching temperature from (Tg−20) to Tc° C. and at a stretching ratio from 1 to 300%.

In the above, Tg means a glass transition temperature (unit: ° C.) of the film, and Tc means a crystallization temperature (unit: ° C.) of the film.

The thickness of the optical film T is not particularly limited and is ordinarily approximately from 20 to 200 μm, and from the standpoint of reducing the thickness it is preferably approximately from 20 to 100 μm.

In the liquid crystal display device according to the invention, by using the anisotropic light diffusion layer which is capable of increasing the light scattering amount in azimuth (ordinarily downward azimuth) having a bad gradation inversion characteristic specific to the twisted alignment mode liquid crystal cell in comparison with other azimuths, light in azimuth displaying good image quality without the occurrence of gradation inversion is scattered to the gradation inversion azimuth to be mixed, whereby the uniform (a small viewing angle dependent performance) display in all azimuths is possible. Since the use of the anisotropic light scattering layer enables the display of good image quality in comparison with the use of the isotropic light scattering layer even when the light scattering amount is small, the adverse effects, for example, decrease in a front contrast ratio or blurring of characters are inhibited.

Although the light diffusion layer is the member commonly used in the liquid crystal display device, even when it is used in the liquid crystal display device using a twisted alignment mode liquid crystal cell commonly used, the improvement in the gradation inversion when viewed from the downward direction cannot be achieved.

On the other hand, the liquid crystal display device according to the invention can inherently improve remarkably the gradation inversion when viewed from the downward direction and further, the use of the light diffusion layer described above is preferred because the gradation inversion can be significantly improved.

Furthermore, in order to enhance the light emission efficiency of the backlight, a prismatic or lenticular light-condensing type brightness-increasing sheet (film) may be stacked or a polarization reflection type brightness-increasing sheet (film) for improving light loss based on the absorption by the polarizing plate may be stacked between the backlight and the liquid crystal cell. Further, a diffusion sheet (film) for making the light source of the backlight uniform may be stacked or on the contrary, a sheet (film) having formed by printing or the like thereon a reflection or diffusion pattern for imparting in-plane distribution to the light source may be stacked.

The brightness half-width angle of light emitted from the backlight unit according to the invention is preferably 80° or less, more preferably 60° or less, and most preferably 40° or less. The value can be achieved by using a prism sheet or a light guide plate having light directivity or stacking a prism sheet. The range described above is preferred from the standpoint of improvement in the gradation inversion.

The brightness half-width angle as used herein means an angle at which the front brightness becomes a half value and is represented by the total value of angles in the vertical direction or in the horizontal direction. In the case where the values are different between the vertical direction and the horizontal direction, the larger value is adopted.

Moreover, the constitution according to the invention is also preferred from the standpoint that light leakage on four sides of the screen (frame-like light leakage) generated in black display after durability test (for example, at 60° C., dry, for 100 hours) in the conventional constitution can be significantly inhibited.

EXAMPLE

Example 1

(Production of Transparent Support)

The composition shown below was put into a mixing tank and stirred with heating at 30° C. to dissolve the components, thereby preparing Cellulose acetate solution C-1.

| Composition of Cellulose Acetate Solution C-1 (parts by weight) | Inner Layer | Outer Layer |
|---|---|---|
| Cellulose acetate having acetylation degree of 60.9% | 100 | 100 |
| Triphenyl phosphate (plasticizer) | 7.8 | 7.8 |
| Biphenyl diphenyl phosphate (plasticizer) | 3.9 | 3.9 |
| Methylene chloride (first solvent) | 293 | 314 |
| Methanol (second solvent) | 71 | 76 |
| 1-Butanol (third solvent) | 1.5 | 1.6 |
| Silica fine particle (AEROSIL R 972, produced by Nippon Aerosil Co., Ltd.) | 0 | 0.8 |
| Retardation raising agent | 1.7 | 0 |

Retardation raising agent

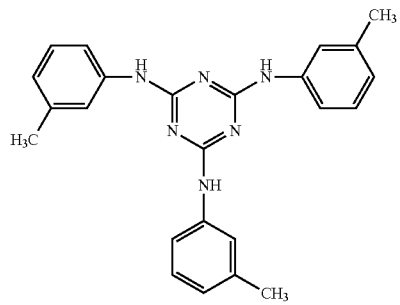 [SMILES: Cc1cccc(Nc2nc(Nc3cccc(C)c3)nc(Nc3cccc(C)c3)n2)c1]

The dope for inner layer of S-1 and the dope for outer layer thus obtained were cast on a drum cooled at 0° C. using a three-layer co-casting die. The film having a remaining solvent amount of 70% by weight was peeled from the drum, the both ends of the film were fixed by a pin tenter, and the film was dried at 80° C. while transporting at a draw ratio of 110% in the transporting direction and then dried at 110° C. when the remaining solvent amount became 10% by weight. Thereafter, the film was dried at a temperature of 140° C. for 30 minutes to produce Transparent supports 1 and 2 of cellulose acetate film (thickness: 80 μm, outer layer: 3 μm, inner layer 74 μm, outer layer: 3 μm) having the remaining solvent amount of 0.3% by weight. The in-plane retardation Re and the retardation in a thickness direction Rth at a wavelength of 550 nm of the transparent support were 9 nm and 90 nm, respectively.

The cellulose acetate film produced was immersed in a 2.0 N potassium hydroxide solution (25° C.) for 2 minutes, neutralized with sulfuric acid, washed with pure water and dried.

(Production of Oriented Film)

Coating solution H-1 having the composition shown below was coated on the respective transparent supports by a wire bar coater of #16 in an amount of 28 ml/m². The coated layer was dried with hot air of 60° C. for 60 seconds and then with hot air of 90° C. for 150 seconds. A rubbing treatment was conducted on the surface of film formed by rotating a rubbing roll at 500 rotations/min in a direction parallel to the transporting direction to produce an oriented film.

(Composition of Coating Solution H-1 for Oriented Film)

| Modified polyvinyl alcohol shown below | 10 parts by weight |
|---|---|
| Water | 370 parts by weight |
| Methanol | 120 parts by weight |
| Glutaraldehyde (crosslinking agent) | 0.5 parts by weight |

Modified polyvinyl alcohol

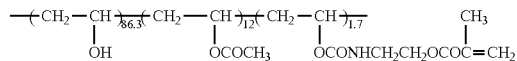

(Production of Optically Anisotropic Layer)

Coating solution K-1 shown below was continuously coated on the surface of the oriented film using a wire bar of #3.2. The solvent was dried in the process of continuously heating from room temperature to 100° C., and then the film was heated in a drying zone at 135° C. for about 90 seconds to align the discotic liquid crystal compound. Subsequently, the film was transported to a drying zone at 80° C. and in the state where the film surface temperature was about 100° C. an ultraviolet ray having an illuminance of 600 mW was irradiated for 10 seconds by an ultraviolet irradiation apparatus to accelerate a crosslinking reaction, thereby polymerizing the discotic liquid crystal compound. Thereafter, the film was allowed to cool to room temperature to form an optically anisotropic layer, thereby producing Optical compensation films 1 and 2.

| | |
|---|---|
| Methyl ethyl ketone | 98 parts by weight |
| Discotic liquid crystalline compound (1) shown below | 41.01 parts by weight |
| Ethylene oxide-modified trimethylolpropane triacrylate (V#360, produced by Osaka Organic Chemical Industry Ltd.) | 4.06 parts by weight |
| Cellulose acetate butyrate (CAB551-0.2, produced by Eastman Chemical Co.) | 0.34 parts by weight |
| Cellulose acetate butyrate (CAB531-1, produced by Eastman Chemical Co.) | 0.11 parts by weight |
| Fluoroaliphatic group-containing polymer-1 shown below | 0.13 parts by weight |
| Fluoroaliphatic group-containing polymer-2 shown below | 0.03 parts by weight |
| Photopolymerization initiator (IRGACURE 907, produced by Ciba-Geigy Co., Ltd.) | 1.35 parts by weight |
| Sensitizer (KAYACURE DETX, produced by Nippon Kayaku Co., Ltd.) | 0.45 parts by weight |

Discotic liquid crystalline compound (1)

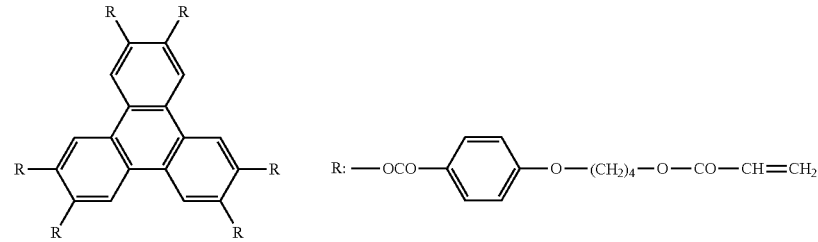

Fluoroaliphatic group-containing polymer-1 (a/b/c = 20/20/60% by weight)

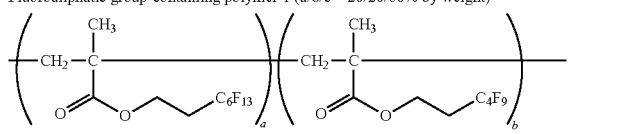

Fluoroaliphatic group-containing polymer-2 (a/b = 98/2% by weight)

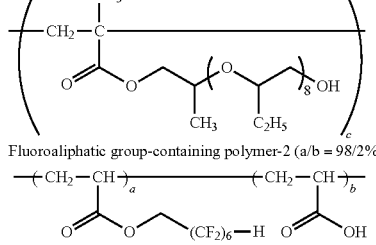

(Measurement of Optical Characteristic)

As to the measurement of optical characteristic, the optically anisotropic layer was produced in the same manner as above except for changing the support to a glass plate (EAGLE XG, produced by Corning Inc.), and the in-plane retardation Re (550) at a wavelength of 550 nm of the optically anisotropic layer was measured using KOBRA WR (produced by Oji Scientific Instruments). Also, retardation R [+40°] and retardation R [−40°] were measured by making light having a wavelength of 550 nm incident from a direction inclined ±40° to the normal direction in a plane orthogonal to the slow axis of the optically anisotropic layer to calculate R [−40°]/R [+40°].

The results are shown in Example 1 in Table 6.

Example 2

(Production of Transparent Support)

Respective components shown below were mixed at the ratio shown below to prepare Cellulose acylate solution C-2.
(Composition of Cellulose Acylate Solution C-2)

| | |
|---|---|
| Cellulose acylate having acetyl group substitution degree of 2.80 | 100 parts by weight |
| Retardation raising agent | 4 parts by weight |
| Triphenyl phosphate | 3 parts by weight |

-continued

| | |
|---|---|
| Diphenyl phosphate | 2 parts by weight |
| Methylene chloride | 418 parts by weight |
| Methanol | 62 parts by weight |

Cellulose acylate solution C-2 was co-cast using a band casting machine so as to have a thickness of 95 μm, and a web obtained was peeled from the band and dried at 130° C. for 30 minutes. Then, the web was stretched by 35% in a TD direction under condition of 180° C. to produce Transparent supports 1 and 2 each having a thickness of 50 μm. The in-plane retardation Re and the retardation in a thickness direction Rth at a wavelength of 550 μm of Transparent supports 1 and 2 produced were 35 nm and 97 nm, respectively.

(Production of Oriented Film and Optically Anisotropic Layer)

Transparent supports 1 and 2 produced as described above were subjected to the saponification treatment in the same manner as in Example 1, and H-1 and T-1 were coated thereon in the same manner as in Example 1 except for setting to have the Re (550) and the R [−40°]/R [+40°] shown in Table 6 to produce Optically anisotropic layers 1 and 2.

Example 3

Optically anisotropic layers 1 and 2 were produced by coating on Transparent supports 1 and 2 produced in Example 2 in the same manner as in Example 2 except for producing an optically anisotropic layer so as to have the Re (550) and the R [−40°]/R [+40°] shown in Table 6.

Example 4

(Production of Transparent Support)

Respective components shown below were mixed at the ratio shown below to prepare Cellulose acylate solution C-3.
(Composition of Cellulose Acylate Solution C-3)

| | |
|---|---|
| Cellulose acylate having acetyl group substitution degree of 2.80 | 100 parts by weight |
| Triphenyl phosphate | 3 parts by weight |
| Diphenyl phosphate | 2 parts by weight |
| Methylene chloride | 418 parts by weight |
| Methanol | 62 parts by weight |

Cellulose acylate solution C-2 was co-cast using a band casting machine so as to have a thickness of 70 μm, and a web obtained was peeled from the band and dried at 130° C. for 30 minutes. Then, the web was contracted by 9% in MD direction and stretched by 3% in a TD direction under condition of 230° C. to produce Transparent supports 1 and 2 each having a thickness of 74 μm. The in-plane retardation Re and the retardation in a thickness direction Rth at a wavelength of 550 nm of the transparent supports produced were 50 nm and 46 nm, respectively.

The transparent support produced was immersed in a 2.0 N potassium hydroxide solution (25° C.) for 2 minutes, neutralized with sulfuric acid, washed with pure water and dried.

(Production of Oriented Film)

Coating solution H-2 having the composition shown below was coated on the transparent support by a wire bar coater of #14 in an amount of 24 ml/m². The coated layer was dried with hot air of 100° C. for 120 seconds. A rubbing treatment was conducted on the surface of film formed by rotating a rubbing roll at 500 rotations/min in a direction parallel to the transporting direction to produce an oriented film.

(Composition of Coating Solution H-2 for Oriented Film)

| | |
|---|---|
| Modified polyvinyl alcohol shown below | 10 parts by weight |
| Water | 364 parts by weight |
| Methanol | 114 parts by weight |
| Glutaraldehyde (crosslinking agent) | 1.0 part by weight |
| Citrate ester (AS3, produced by Sankyo Kagaku Yakuhin Co., Ltd.) | 0.35 parts by weight |

Modified polyvinyl alcohol

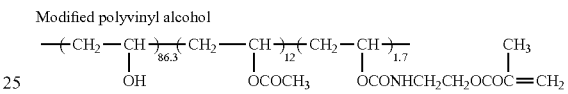

(Production of Optically Anisotropic Layer)

Coating solution K-2 shown below was continuously coated on the surface of the oriented film using a wire bar of #2.4. Then, the film was heated in a drying zone at 80° C. for about 120 seconds to align the discotic liquid crystal compound. Subsequently, the film was transported to a drying zone at 80° C. and an ultraviolet ray having an illuminance of 600 mW was irradiated for 10 seconds by an ultraviolet irradiation apparatus to accelerate a crosslinking reaction, thereby polymerizing the discotic liquid crystal compound. Thereafter, the film was allowed to cool to room temperature to form an optically anisotropic layer, thereby producing Optical compensation films 1 and 2.

(Composition of Coating Solution K-2 for Optically Anisotropic Layer)

| | |
|---|---|
| Discotic liquid crystal compound (2) shown below | 100.0 parts by weight |
| Pyridinium salt compound II-1 shown below | 1.0 part by weight |
| Triazine ring-containing compound III-1 shown below | 0.2 parts by weight |
| Photopolymerization initiator (IRGACURE 907, produced by Ciba-Geigy Co., Ltd.) | 3.0 parts by weight |
| Sensitizer (KAYACURE DETX, produced by Nippon Kayaku Co., Ltd.) | 1.0 part by weight |
| Methyl ethyl ketone | 341.8 parts by weight |

Discotic liquid crystalline compound (2)

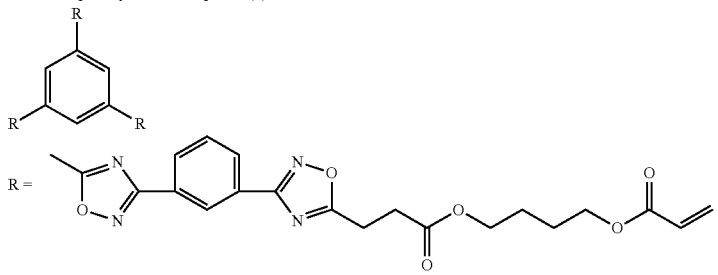

Structure of pyridinium salt compound (II-1)

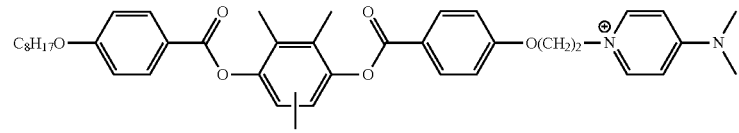

(II-2)
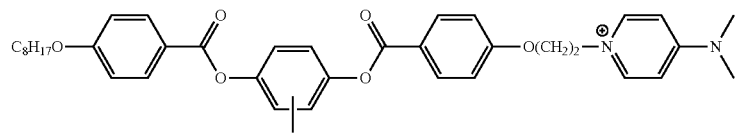
(II-3)
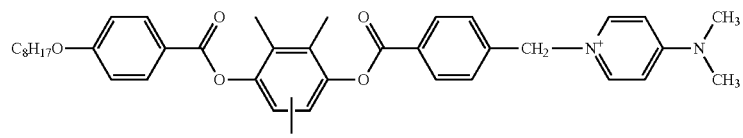
(II-4)
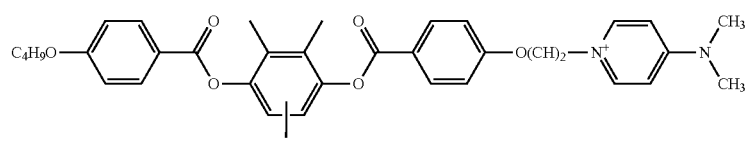
I-12 described in JP-A-2006-113500
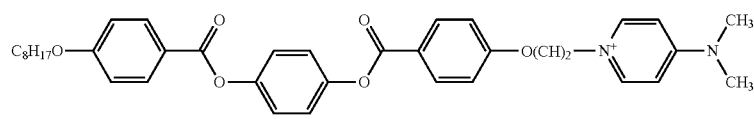
(CII-1)
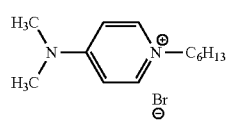
(CII-2)
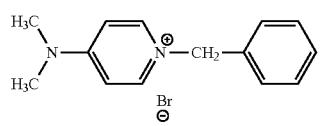 [SMILES: CN(C)c1cc[n+](Cc2ccccc2)cc1 ; [Br-]]
Triazine ring-containing compound
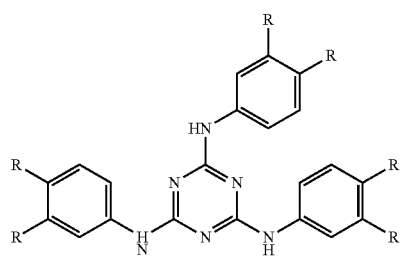
III-1: R = $O(CH_2)_2O(CH_2)_2C_6F_{13}$
III-2: R = $O(CH_2)_2O(CH_2)_2C_4F_9$
III-3: R = $O(CH_2)_2O(CH_2)_2C_8F_{17}$
III-4: R = $O(CH_2)_3C_6F_{13}$
CIII-1: R = $OCH_2(CF_2)_6H$
CIII-2: R = $C_{10}H_{21}$ The in-plane retardation Re (550) at a wavelength of 550 nm of the optically anisotropic layer was measured using the method same as in Example 1. Also, retardation R [+40°] and retardation R [−40°] were measured by making light having a wavelength of 550 nm incident from a direction inclined ±40° to the normal direction in a plane orthogonal to the slow axis of the optically anisotropic layer to calculate R [−40°]/R [+40°]. The results are shown in Table 6.

Example 5

Optically anisotropic layers 1 and 2 were produced by coating on Transparent supports 1 and 2 produced in Example 4 in the same manner as in Example 4 except for producing an optically anisotropic layer so as to have the Re (550) and the R [−40°]/R [+40°] shown in Table 6.
(Production of Polarizing Plate)

The optical compensation films produced in Examples 1 to 5 were stuck to a polarizing film such that the transparent support side and the polarizing film side were faced to each other to produce polarizing plates, respectively. A surface to be stuck of the film had been subjected to an alkali saponification treatment. As the polarizing film, a linear polarizing film having a thickness of 20 μm prepared by stretching continuously 5 times a polyvinyl alcohol film having a thickness of 80 μm in an aqueous iodine solution and drying was used, and as the adhesive, a 3% aqueous solution of polyvinyl alcohol (PVA-117H, produced by Kuraray Co., Ltd.) was used.

Example 6

A polarizing plate was produced by sticking through an adhesive the optical compensation film produced in Example 3 to the polarizing film such that the optically anisotropic layer side and the polarizing film side were faced to each other.
(Production of TN Mode Liquid Crystal Display Device)

Polarizing plates used in a TN mode liquid crystal display device (S23A350H, produced by Samsung Electronics Co., Ltd.) were peeled off, and instead thereof the polarizing plates described above were stuck through an adhesive on the viewing side and the backlight side, respectively, thereby producing the TN mode liquid crystal display devices shown in Table 6, respectively.

Example 7

As a light diffusion film, the following is used.
[Light Diffusion Film (High Internal Scattering Film)]
(Preparation of Coating Solution for Light Diffusion Layer)
Coating solution 1 for light diffusion layer shown below was filtered through a propylene filter having a pore size of 30 μm to prepare a coating solution for light diffusion layer.
Coating Solution 1 for Light Diffusion Layer

| | |
|---|---|
| DPHA | 15 g |
| PET-30 (PETA) | 73 g |
| IRGACURE 184 | 1 g |
| IRGACURE 127 | 1 g |
| Styrene particle having particle size of 5.0 μm | 8 g |
| Benzoguanamine particle having particle size of 1.5 μm | 2 g |
| MEK (methyl ethyl ketone) | 50 g |
| MIBK (methyl isobutyl ketone) | 50 g |

The compounds used are shown below.
DPHA: mixture of dipentaerythritol pentaacrylate and dipentaerythritol hexaacrylate (produced by Nippon Kayaku Co., Ltd.)
PET-30: pentaerythritol triacrylate (produced by Nippon Kayaku Co., Ltd.)
IRGACURE 127: polymerization initiator (produced by Ciba Specialty Chemicals Co., Ltd.)
IRGACURE 184: polymerization initiator (produced by Ciba Specialty Chemicals Co., Ltd.)
(Preparation of Coating Solution for Low Refractive Index Layer)
—Preparation of Sol Solution—

In a reaction vessel equipped with a stirrer and a reflux condenser were charged and mixed 120 parts of methyl ethyl ketone, 100 parts of acryloyloxypropyltrimethoxysilane (KBM-5103, produced by Shin-Etsu Chemical Co., Ltd.) and 3 parts of diisopropoxyaluminum ethylacetoacetate, then 30 parts of ion-exchanged water was added thereto, and the mixture was reacted at 60° C. for 4 hours and then cooled to room temperature to obtain a gel solution. The weight average molecular weight was 1,600, and the components having molecular weight of 1,000 to 20,000 of the components higher than oligomer components accounted 100%. Further, it was found from gas chromatography analysis that acryloyloxypropyltrimethoxysilane as the raw material did not remain at all.
—Preparation of Dispersion—

To 500 g of a hollow fine-particle silica sol (isopropyl alcohol silica sol, an average particle size: 60 nm, a shell thickness: 10 nm, a silica concentration: 20% by weight, a refractive index of silica particle: 1.31, prepared according to Preparation Example 4 of JP-A-2002-79616 except for changing a particle size) were added and mixed 30 g of acryloyloxypropyltrimethoxysilane (produced by Shin-Etsu Chemical Co., Ltd.) and 1.5 g of diisopropoxyaluminum ethylacetate, and then 9 g of ion-exchanged water was added thereto. The mixture was reacted at 60° C. for 8 hours and then cooled to room temperature, and 1.8 g of acetylacetone was added thereto. The dispersion (500 g) was subjected to solvent replacement by reduced pressure distillation while adding cyclohexanone thereto so as to maintain the content of silica almost constant. The occurrence of foreign substance was not observed in the dispersion and the viscosity at 25° C. was 5 mPa·s measured after adjusting a solid content concentration to 20% by weight with cyclohexanone. As a result of gas chromatography analysis, the remaining amount of isopropyl alcohol in Dispersion A thus-obtained was 1.5%.
—Preparation of Coating Solution for Low Refractive Index Layer—

In 500 g of methyl isobutyl ketone was dissolved 41.0 g (as a solid content) of an ethylenically unsaturated group-containing fluorine polymer (Fluorine polymer (A−1) described in Preparation Example 3 of JP-A-2005-89536), and further 260 parts by weight of Dispersion A (52.0 parts by weight as a total solid content of silica and surface treatment agent), 5.0 parts by weight of DPHA and 2.0 parts by weight of IRGACURE 127 (photopolymerization initiator, produced by Ciba Specialty Chemicals Co., Ltd.) were added thereto. The mixture was diluted with methyl ethyl ketone so as to have a solid content concentration of the whole coating solution of 6% by weight, thereby preparing a coating solution for low refractive index layer. The refractive index of the layer formed with the coating solution was 1.36.
(Formation of Light Diffusion Layer)

A triacetyl cellulose film (TAC-TD80U, produced by Fujifilm Corp.) in a roll form was wound off, and the coating solution for light diffusion layer was coated thereon by direct extrusion using a coater having a throttle die. The coating was performed under the condition of a transporting speed of 30 m/min, and the coated layer was dried at 30° C. for 15 seconds and then at 90° C. for 20 seconds. Subsequently, the coated layer was cured by irradiation of ultraviolet ray in an irradiation amount of 90 mJ/cm² using an air-cooled metal halide lamp of 160 W/cm (produced by Eye Graphics Co., Ltd.) in an oxygen concentration of 0.2% under nitrogen purge, thereby forming a light diffusion layer. The film was then rewound. The thickness of the light diffusion layer formed was 8.0 µm.

(Formation of Low Refractive Index Layer)

The coating solution for low refractive index layer was coated on the light diffusion layer formed as described above by direct extrusion using a coater having a throttle die on the surface on the side of a backup roll where the hardcoat layer was coated to form a low refractive index layer having a thickness of 100 nm, and then the film was rewound. Thus, Light diffusion film 1 was produced. The drying and curing conditions adopted are shown below.

Drying: The drying was performed at 90° C. for 60 seconds.

Curing: An ultraviolet ray was irradiated in an irradiation amount of 400 mJ/cm² using an air-cooled metal halide lamp (produced by Eye Graphics Co., Ltd.) under atmosphere of oxygen concentration of 0.1% with nitrogen purge. The haze at this time was 58%.

The light diffusion film was stuck to the polarizing plate on the viewing side of the TN mode liquid crystal display device described in Example 3 through an adhesive.

Example 8

In the TN mode liquid crystal display device of Example 7, two sheets of brightness enhancement films (BEFRP2-115, produced by 3M Co.) were arranged such that their prisms were orthogonal between a diffusion plate and a diffusion sheet both of which were backlight constituting members. The brightness half-width angle at this time was 70 degrees. As the measuring machine, EZContrast XL88 (produced by ELDIM S.A.) was used. From the measurement results, an angle at which the front brightness became a half value was determined. Ordinarily, the angle before arranging the two sheets of prisms was 86 degrees.

Comparative Example 1

Angles of the slow axes of the transparent support and the optically anisotropic layer produced in Example 1 and angles of the absorption axes of the polarizing plates were set as shown in Table 6.

Comparative Example 2

The optically anisotropic layer produced in Example 1 was stuck directly on the glass of the liquid crystal panel through an adhesive such that angles of the slow axis of the optically anisotropic layer and the absorption axis of the polarizing plate were set as shown in Table 6.

Comparative Example 3

The light diffusion film produced above was arranged on the viewing side of the liquid crystal display device produced in Comparative Example 1 through an adhesive.

Example 9

(Production of Transparent Support)

The transparent support was produced and the oriented film was formed in the same manner as in Example 2.

(Production of Optically Anisotropic Layer)

The coating solution shown below was continuously coated on the surface of the oriented film using a wire bar of #3.6. The solvent was dried in the process of continuously heating from room temperature to 100° C., and then the film was heated in a drying zone at 135° C. for about 90 seconds to align the discotic liquid crystal compound. Subsequently, the film was transported to a drying zone at 80° C. and in the state where the film surface temperature was about 100° C. an ultraviolet ray having an illuminance of 600 mW was irradiated for 10 seconds by an ultraviolet irradiation apparatus to accelerate a crosslinking reaction, thereby polymerizing the discotic liquid crystal compound. Thereafter, the film was allowed to cool to room temperature to form an optically anisotropic layer, thereby producing an optical compensation film.

(Composition of Coating Solution for Optically Anisotropic Layer)

| | |
|---|---|
| Methyl ethyl ketone | 333.39 parts by weight |
| Discotic liquid crystalline compound (1) shown above | 91.00 parts by weight |
| Ethylene oxide-modified trimethylolpropane triacrylate (V#360, produced by Osaka Organic Chemical Industry Ltd.) | 9.00 parts by weight |
| Air interface alignment controlling agent shown below | 0.75 parts by weight |
| Photopolymerization initiator (IRGACURE 907, produced by Ciba-Geigy Co., Ltd.) | 3.00 parts by weight |
| Sensitizer (KAYACURE DETX, produced by Nippon Kayaku Co., Ltd.) | 1.00 part by weight |

Air interface alignment controlling agent

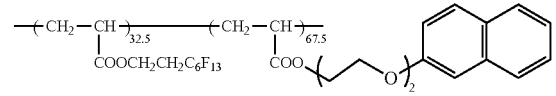

The optical measurement of the optically anisotropic layer was performed using the same method as described in Example 1. The results are shown in Tale 7.

(Production of TN Mode Liquid Crystal Display Device)

Angles of the slow axes of the transparent support and the optically anisotropic layer produced and angles of the absorption axes of the polarizing plates were set as shown in Table 7 to produce a TN mode liquid crystal display device.

Example 10

(Production of Transparent Support)

A cellulose acylate was synthesized according to the method described in JP-A-10-45804 and JP-A-8-231761, and a substitution degree of the cellulose acylate was measured. Specifically, sulfuric acid (7.8 parts by weight to 100 parts by weight of cellulose) was added as a catalyst, and a carboxylic acid as a material for an acyl substituent was added to undergo an acylation reaction at 40° C. At this time, the kind and the amount of the carboxylic acid were determined to control the kind and the substitution degree of the acyl group. After the acylation, the product was ripened at 40° C. The cellulose acylate was then washed with acetone to remove the low molecular-weight components.

(Preparation of Cellulose Acylate Solution C01)

The composition shown below was put into a mixing tank and stirred to dissolve the components, thereby preparing a cellulose acylate solution. The amounts of the solvents (methylene chloride and methanol) were appropriately adjusted such that the solid content concentration of the cellulose acylate solution became 22% by weight. However, in C05, the amounts of the solvents were appropriately adjusted such that the solid content concentration became 19% by weight.

| Cellulose acetate (substitution degree: 2.45) | 100.0 parts by weight |
| Additive: Compound A shown below | 19.0 parts by weight |
| Methylene chloride | 365.5 parts by weight |
| Methanol | 54.6 parts by weight |

(Preparation of Cellulose Acylate Solution C02)

The composition shown below was put into a mixing tank and stirred to dissolve the components, thereby preparing a cellulose acylate solution. The amounts of the solvents (methylene chloride and methanol) were appropriately adjusted such that the solid content concentration of the cellulose acylate solution became 22% by weight. However, in C05, the amounts of the solvents were appropriately adjusted such that the solid content concentration became 19% by weight.

| Cellulose acetate (substitution degree: 2.81) | 100.0 parts by weight |
| Additive: Compound A shown below | 12.0 parts by weight |
| Methylene chloride | 365.5 parts by weight |
| Methanol | 54.6 parts by weight |

Compound A represents a copolymer of terephthalic acid, succinic acid, ethylene glycol and propylene glycol (copolymerization ratio (% by mole)=27.5/22.5/25/25).

Compound A is a non-phosphate ester compound and is also a retardation developer. The terminal of compound A is capped with an acetyl group.

Using a belt stretching machine, Cellulose acylate solution C01 was casted so as to form a core layer having a thickness of 56 μm and Cellulose acylate solution C02 was casted so as to form skin A layer having a thickness of 2 μm. The web (film) obtained was peeled from the belt stretching machine, gripped with clips and laterally stretched using a tenter. The stretching temperature and the stretching ratio were set 172° C. and 30%, respectively. The film was then detached from the clips and dried at 130° C. for 20 minutes to obtain a cellulose acylate film.

The in-plane retardation Re and the retardation in a thickness direction Rth at a wavelength of 550 nm of the transparent support produced were 50 nm and 120 nm, respectively.

(Production of Optically Anisotropic Layer)

In the same manner as in Example 9 except for using the transparent support described above, the oriented film and the optically anisotropic layer are formed, thereby producing an optical compensation film.

The optical measurement of the optically anisotropic layer was performed using the same method as described in Example 1. The results are shown in Tale 7.

(Production of TN Mode Liquid Crystal Display Device)

Angles of the slow axes of the transparent support and the optically anisotropic layer produced and angles of the absorption axes of the polarizing plates were set as shown in Table 7 to produce a TN mode liquid crystal display device.

Example 11

(Production of Transparent Support)

The transparent support was produced and the oriented film was formed in the same manner as in Example 10.

(Production of Optically Anisotropic Layer)

An optically anisotropic layer was produced in the same manner as in Example 9 except for changing the wire bar to a wire bar of #3.0, the amount of Air interface alignment controlling agent to 0.00 parts by weight, and the amount of Air interface alignment controlling agent (2) to 0.75 parts by weight.

Air Interface Alignment Controlling Agent (2)

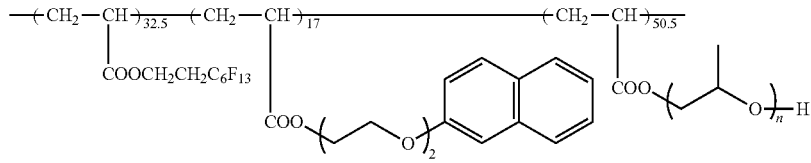

The optical measurement of the optically anisotropic layer was performed using the same method as described in Example 1. The results are shown in Tale 7.

(Production of TN Mode Liquid Crystal Display Device)

Angles of the slow axes of the transparent support and the optically anisotropic layer produced and angles of the absorption axes of the polarizing plates were set as shown in Table 7 to produce a TN mode liquid crystal display device.

Example 12

(Production of Transparent Support)

The transparent support was produced and the oriented film was formed in the same manner as in Example 2.

(Production of Optically Anisotropic Layer)

An optically anisotropic layer was produced in the same manner as in Example 9 except for changing the amount of methyl ethyl ketone to 321.45 parts by weight and the amount of ethylene oxide-modified trimethylolpropane triacrylate (V#360, produced by Osaka Organic Chemical Industry Ltd.) to 5.20 parts by weight.

The optical measurement of the optically anisotropic layer was performed using the same method as described in Example 1. The results are shown in Tale 7.

(Production of TN Mode Liquid Crystal Display Device)

Angles of the slow axes of the transparent support and the optically anisotropic layer produced and angles of the absorption axes of the polarizing plates were set as shown in Table 7 to produce a TN mode liquid crystal display device.

Example 13

(Production of Transparent Support)

The transparent support was produced and the oriented film was formed in the same manner as in Example 2.

An optically anisotropic layer was produced in the same manner as in Example 9 except for changing the amount of Air interface alignment controlling agent (2) to 0.00 parts by weight and adding 0.19 parts by weight of Air interface alignment controlling agent (3) shown below.

Air Interface Alignment Controlling Agent (3)

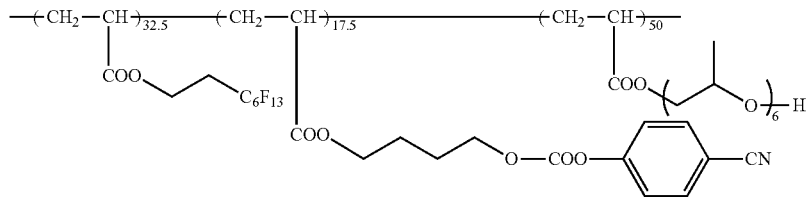

The optical measurement of the optically anisotropic layer was performed using the same method as described in Example 1. The results are shown in Tale 7.
(Production of TN Mode Liquid Crystal Display Device)

Angles of the slow axes of the transparent support and the optically anisotropic layer produced and angles of the absorption axes of the polarizing plates were set as shown in Table 7 to produce a TN mode liquid crystal display device.

Example 14

(Production of Light Diffusion Film 2)

Light diffusion film 2 was produced in the same manner as in Example 7 except that the amount of styrene particle having particle size of 5.0 μm was changed from 8 g to 2.5 g and the amount of benzoguanamine particle having particle size of 1.5 μm was changed from 2 g to 0.6 g in Coating solution 1 for light diffusion layer of the light diffusion film produced in Example 7.

Production of polarizing plate was performed in the same manner as in Example 11 except for using the light scattering film 2 described above.
(Production of TN Mode Liquid Crystal Display Device)

A TN mode liquid crystal display device was produced in the same manner as in Example 11 except for using the polarizing plate described above.

Example 15

(Production of Light Diffusion Film 3)
[Light Diffusion Film (Cellulose Acylate Film)]
(Measuring Method)

Measuring methods and evaluation methods of various characteristics measured as to the light diffusion film are described below.
1. Glass Transition Temperature (Tg)

Using a DSC measurement device (DSC8230, produced by Rigaku Corp.), a polymer film sample before heat treatment is put in an aluminum measurement pan (Cat. No. 8578, by Rigaku Corp.) of DSC in an amount from 5 to 6 mg. The sample is heated in a nitrogen stream of 50 mL/min from 25° C. to up to 120° C. at a temperature raising rate of 20° C./min, maintained at the temperature for 15 minutes, and then cooled to 30° C. at a rate of −20° C./min. Subsequently, the sample is again heated from 30° C. to 250° C. at a temperature raising rate of 20° C./min, and the temperature at the crossing point between the thermogram of the sample measured and the median line of two base lines is read as the glass transition temperature of the film.
2. Crystallization Temperature (Tc)

Using a DSC measurement device (DSC8230, produced by Rigaku Corp.), a polymer film sample before heat treatment is put in an aluminum measurement pan (Cat. No. 8578, by Rigaku Corp.) of DSC in an amount from 5 to 6 mg. The sample is heated in a nitrogen stream of 50 mL/min from 25° C. to up to 120° C. at a temperature raising rate of 20° C./min, maintained at the temperature for 15 minutes, and then cooled to 30° C. at a rate of −20° C./min. Then, the sample is again heated from 30° C. to 320° C. at a temperature raising rate of 20° C./min, and the start temperature of the exothermic peak appearing during the process is read as the crystallization temperature of the film.
3. Substitution Degree The acyl substitution degree of cellulose acylate is determined with $^{13}$C-NMR according to the method described in Carbohydr. Res., 273 (1995), 83-91 (Tezuka et al.).
4. Haze, Whole Light Transmittance and Parallel Transmittance The haze was measured using a haze meter (NDH 2000, produced by Nippon Denshoku Industries Co., Ltd.).

As to the whole light transmittance and parallel transmittance, the measurements were performed in the same manner.
(Production and Evaluation of Optical Film)

As shown in Table 1 below, Cellulose acylate B was added to and dissolved in a solvent in a ratio as shown in the Table to prepare a cellulose acylate dope. The details of the preparation method are described below.

The cellulose acylate was dried by heating at 120° C. so as to have a water content of 0.5% by weight or less and used in the amount (parts by weight) shown in Table 1.
1) <Cellulose Acylate>
Cellulose Acylate B (Cellulose Acetate):

Powder of cellulose acetate having a substitution degree of 2.86 was used. Cellulose acylate B had a viscosity-average polymerization degree of 300, a substitution degree of acetyl group at 6-position of 0.89, an acetone extract of 7% by weight, a ratio of weight average molecular weight/number average molecular weight of 2.3, a water content of 0.2% by weight, a viscosity in 6% by weight dichloromethane solution of 305 mPa·s, a residual acetic acid amount of 0.1% by weight or less, a Ca content of 65 ppm, an Mg content of 26 ppm, an iron content of 0.8 ppm, a sulfate ion content of 18 ppm, an yellow index of 1.9, and a free acetic acid amount of 47 ppm. The average particle size of the powder was 1.5 mm, and the standard deviation thereof was 0.5 mm.
2) <Solvent>

Solvent A shown below was used. The water content of the solvent was 0.2% by weight or less.
Solvent A:
Dichloromethane/methanol=87/13 (by weight ratio)
4) <Preparation of Cellulose Acylate Solution>

The solvent and additive described above were put into a 400 L stainless dissolving tank having a stirring blade and a cooling water circulator around its outer periphery, and while stirring and dispersing them, the cellulose acylate was gradually added thereto. After the completion of the addition, the mixture was stirred at room temperature for 2 hours, then swollen for 3 hours, and thereafter again stirred to obtain a cellulose acylate solution.

For the stirring, a dissolver-type eccentric stirring shaft stirring at a circumferential speed of 15 m/sec (shear stress of $5\times10^4$ kgf/m/sec$^2$ [$4.9\times10^5$ N/m/sec$^2$]) and a stirring shaft having an anchor blade in the central shaft and stirring at a circumferential speed of 1 m/sec (shear stress of $1\times10^4$ kgf/m/sec$^2$ [$9.8\times10^4$ N/m/sec$^2$]) were used. The swelling was conducted by stopping the high-speed stirring shaft and setting the circumferential speed of the stirring shaft having an anchor blade to 0.5 m/sec.

The swollen cellulose acetate solution was heated to 50° C. from the tank through a jacketed pipe, and then heated to 90° C. under a pressure of 2 MPa to achieve complete dissolution. The heating time was 15 minutes. In the process, the filter, housing and piping exposed to the high temperature were made of HASTELLOY alloy excellent in corrosion resistance and jacketed for circulating a heat medium for heat insulation and heating.

Subsequently, the solution was cooled to 36° C. to obtain a cellulose acylate solution.

5) <Filtration>

The cellulose acylate solution obtained was filtered through a paper filter (#63, produced by Toyo Roshi Kaisha, Ltd.) having an absolute filtration accuracy of 10 μm and further through a sintered metal filter (FH025, produced by Pall Corp.) having an absolute filtration accuracy of 2.5 μm to obtain a polymer solution.

6) <Production of Film>

The cellulose acylate solution was heated at 30° C. and cast on a mirror-face stainless support having a band length of 60 m set at 15° C. through a casting Giesser (described in JP-A-11-314233). The casting speed was 50 m/min and the coating width was 200 cm. The space temperature of the whole casting area was set at 15° C. At 50 cm before the endpoint of the casting unit, the cellulose acylate film thus cast while rotating was peeled from the band, and dry air at 45° C. was applied thereto. Subsequently, the film was dried at 110° C. for 5 minutes and then at 140° C. for 10 minutes to obtain a cellulose acylate film. The haze of the cellulose acylate film obtained was measured by the method described above. The result is shown in the Table 1 below.

7) <Stretching>

The cellulose acylate film obtained was stretched in the manner described below under the stretching condition shown in Table 1. The stretching ratio of the film was determined by drawing the gauge lines at regular intervals in the direction orthogonal to the transporting direction of the film, measuring the distance between the gauge lines before and after the stretching process and calculating by the formula shown below.

Stretching ratio of film (%)=100×(distance between the gauge lines after the stretching−distance between the gauge lines before the stretching)/distance between the gauge lines before the stretching The stretching described above was conducted by a longitudinal monoaxial stretching treatment using a roll stretcher. The rolls of the roll stretcher used were induction heating jacket rolls each having a mirror-finished surface, and the temperatures of the individual roll were set so as to be controlled separately. The stretching zone was covered with a casing, and its temperature was set shown in Table 1. The roll before the stretching zone was so set that it could be gradually heated to the stretching temperature shown in Table 1. The difference of temperature between the film surface temperature and the film rear surface temperature was so controlled as to have a temperature difference shown in Table 1 by controlling the temperature of the hot air to be provided to the surface and the rear surface of the film. The film surface temperature and the film rear surface temperature were determined by sticking a tape-type thermocouple surface temperature sensor (ST Series, produced by Anritsu Meter Co., Ltd.) to 3 points on both the surface and the rear surface of the film and averaging the data measured. The temperature difference shown in Table 1 was the value obtained by subtracting the film surface temperature from the film rear surface temperature. The stretching ratio was controlled by adjusting the circumferential speed of the nip rolls. The aspect ratio (distance between nip rolls/film inlet width) was adjusted to be 0.5, and the stretching speed was 10%/min relative to the stretching distance. These are also shown in Table 1.

8) <Evaluation of Cellulose Acylate Film>

The cellulose acylate film obtained was evaluated for the haze, the whole light transmittance, the parallel transmittance and the refractive index of each domain. The results are shown in Table 1.

(Detailed Determination of Structure of First Domain and Second Domain)

First, as to the optical film produced, the molecule alignment direction of the polymer main chain was determined by the X-ray diffraction measurement according to the method described above.

Next, the optical film produced was cut in the direction vertically to the film plane in the film thickness direction, and the cross section thereof was photographed by a scanning electron microscope (S-4300, produced by Hitachi, Ltd.). According to the method described above, the average direction of the major axis of the second domain was determined, and the average length (a) of the major axis of the second domain was determined. Then, the minor axis average length (b) in the film in-plane direction of the second domain and the minor axis average length (c) in the film thickness direction of the second domain were also determined according to the method described above.

The major axis average length of the second domain/the minor axis average length in the film in-plane direction of the second domain, the major axis average length of the second domain/the minor axis average length in the film thickness direction of the second domain and the sphere-corresponding diameter were calculated according to the methods described above. Also, the volume fraction and the density distribution of bubbles in the film thickness direction were determined according to the methods described above. The results obtained are shown in Table 1 below. It was known that in the optical film produced the molecule alignment direction of the polymer main chain was approximately in parallel to the stretching direction and was in the in-plane direction. It was also known that the average direction of the major axis of the second domain was approximately orthogonal to the molecule alignment direction of the polymer main chain (in the direction at about 90° in the film plane), that is, approximately orthogonal to the stretching direction.

As to the density distribution value in the film thickness direction, when the cross section of the film cut in the direction orthogonal to the film surface was photographed by a scanning electronic microscope and a part having a thickness equivalent to a half of the film thickness in which the density of the second domain was highest was selected, the proportion of the second domain in the part having a thickness equivalent to a half of the film thickness was regarded as the density distribution value in the film thickness direction. In the optical film produced, since the range of the half of the film thickness on the surface side of the film (that is, the upper half of the film, and the side on which the stretching temperature was lower in point of the stretching temperature difference between the surface and the rear surface of the film) was the part having a thickness equivalent to a half of the film thickness in which the density of the second domain was highest, the density distribution value in that part was determined.

(Evaluation on Heating)

The film produced was allowed to stand at 80° C. for 48 hours and then the cross section thereof was photographed by a scanning electronic microscope. The cross section was compared with the cross section of the film allowed to stand at normal temperature. As a result, it was found that the films described above were approximately equivalent in the angle between the polymer main chain and the average direction of the major axis, the ratio of the average length of the major axis to the average length of the minor axis in the in-plane direction, the density distribution, the size and the haze.

vertical direction of the liquid crystal display device (the gradation inversion direction of the TN mode liquid crystal display device being in the downward azimuth).

Comparative Example 4

A TN mode liquid crystal display device was produced in the same manner as in Comparative Example 3 except for using the light diffusion film produced in Example 14 as the light diffusion film.

Example 16

(Production of Transparent Support)

The transparent support was produced in the same manner as in Example 1.

TABLE 1

| | Cellulose Acylate Solution | | Cellulose Acylate Film before Stretching | | | Stretching | | | |
|---|---|---|---|---|---|---|---|---|---|
| | Cellulose Acylate (kind) | Cellulose Acylate (parts by weight) | Tg (° C.) | Tc (° C.) | Haze (%) | Temperature (° C.) | Temperature Difference between Front and Back Surfaces (° C.) | Stretching Rate (%) | Stretching Speed (%/min) | Stretching Maximum Stress (Mpa) |
| Light Diffusion Film B | B | 100 | 155 | 200 | 0.3 | 190 | 0.7 | 65 | 10 | 55 |

| | Optical Film after Stretching | | | | | Second Domain | | | | |
|---|---|---|---|---|---|---|---|---|---|---|
| | Haze (%) | Whole Light Transmittance (%) | Parallel Transmittance (%) | First Domain Refractive Index n1 | Refractive Index n2 | Major Axis Average Length/Minor Axis Average Length in Film In-Plane Direction | Major Axis Average Length/Minor Axis Average Length in Film Thickness Direction | Sphere-Corresponding Diameter (μm) | Volume Fraction (%) | Refractivity Difference n1 − n2 | Density Distribution of Bubbles in Film Thickness Direction (%) |
| Light Diffusion Film B | 15 | 90 | 85 | 1.46 | 1.00 | 5.5 | 100 | 1.62 | 15 | 0.46 | 85 |

When light was incident vertically to the film plane and the outgoing light was received while changing the polar angle in the stretching direction of film and in a direction orthogonal to the stretching direction using a goniophotometer (GP-5, produced by Murakami Color Research Laboratory Co., Ltd.), it was confirmed that in the stretching direction, light scattered at a polar angle of around 20 degrees and the light scattering was hardly recognized in the orthogonal direction.

Production of polarizing plate was performed in the same manner as in Example 11 except for using the light diffusion film described above.

(Production of TN Mode Liquid Crystal Display Device)

A TN mode liquid crystal display device was produced in the same manner as in Example 11 except for using the polarizing plate described above.

At this time, the polarizing plate was arranged such that the stretching direction of the light diffusion film was set to the The cellulose acetate film produced was immersed in a 2.0 N potassium hydroxide solution (25° C.) for 2 minutes, neutralized with sulfuric acid, washed with pure water and dried.

(Formation of Oriented Film)

The oriented film was formed in the same manner as in Example 1 on the transparent support produced.

(Production of Optically Anisotropic Layers A and B)

A coating solution containing a rod-like liquid crystal compound having the composition shown below was continuously coated on the oriented film by a wire bar of #2.2. The film was heated with hot air of 90° C. for 60 seconds for drying the solvent after the coating and alignment ripening of the rod-like liquid crystal compound. Subsequently, the alignment of the liquid crystal compound was fixed with UV irradiation to produce Optically anisotropic layers A (and B).

(Composition of Coating Solution for Optically Anisotropic Layers A (and B))

| | |
|---|---|
| Rod-like liquid crystal compound shown below | 100 parts by weight |
| Photopolymerization initiator shown below | 3 parts by weight |
| Sensitizer (KAYACURE DETX, produced by Nippon Kayaku Co., Ltd.) | 1 part by weight |
| Fluorine-based polymer (D) shown below | 0.4 parts by weight |
| Horizontal aligning agent shown below | 0.2 parts by weight |
| Methyl ethyl ketone | 195 parts by weight |

Rod-like liquid crystal compound

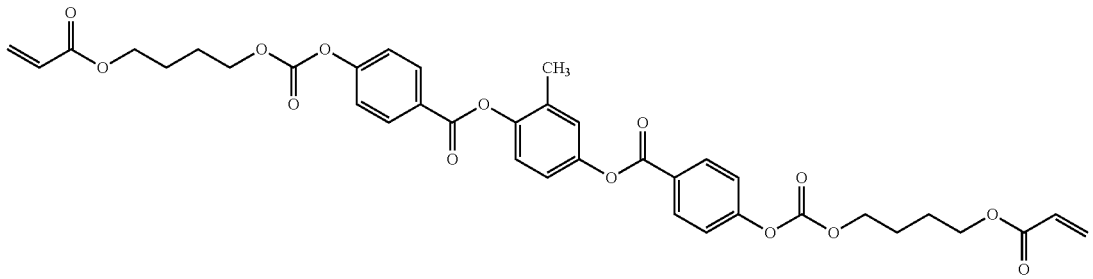 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

Photopolymerization initiator

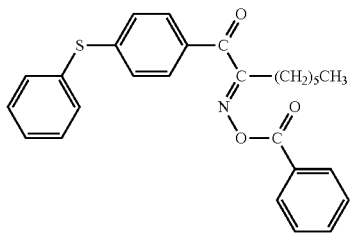

Fluorine-based polymer (D)

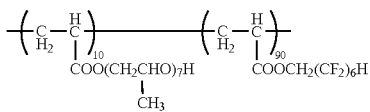

Horizontal aligning agent

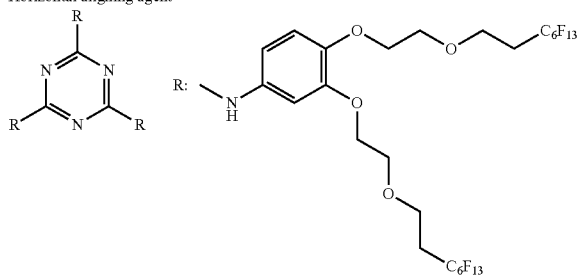

The in-plane retardation Re (550) at a wavelength of 550 nm of the optically anisotropic layer was measured using the same method as described in Example 1. Also, retardation R [+40°] and retardation R [−40°] were measured by making light having a wavelength of 550 nm incident from a direction inclined ±40° to the normal direction in a plane orthogonal to the fast axis of the optically anisotropic layer to calculate R [−40°]/R [+40°]. The Re (550) was 50 nm, and the R [−40°]/R [+40°] was 1.

(Formation of Oriented Film)

The oriented film was formed in the same manner as in Example 1 on the transparent film produced.

(Production of Optically Anisotropic Layer)

The optically anisotropic layer was produced in the same manner as in Example 11.

(Production of TN Mode Liquid Crystal Display Device)

Angles of the slow axes of the transparent support, Optically anisotropic layers A (and B) and the optically anisotropic layer produced and angles of the absorption axes of the polarizing plates were set as shown in Table 8 to produce a TN mode liquid crystal display device.

Example 17

(Production of Transparent Support)

A transparent support was produced and an oriented film was formed in the same manner as in the production of the transparent support of Example 1 except that the flow rate of the dope for inner layer was reduced to half of that in Example 1 when the dope for inner layer and the dope for outer layer were cast on a drum cooled at 0° C. using a three-layer co-casting die. A transparent support of a cellulose acetate film (thickness: 40 μm, outer layer: 3 μm, inner layer 34 μm, outer layer: 3 μm) was produced. The in-plane retardation Re and the retardation in a thickness direction Rth at a wavelength of 550 nm of the cellulose acetate film produced were 7 nm and 45 nm, respectively.

(Formation of Oriented Film)

The oriented film was formed in the same manner as in Example 1 on the transparent support produced.

(Production of Optically Anisotropic Layers A and B)

Optically anisotropic layers A (and B) were produced in the same manner as in Example 16.

(Formation of Oriented Film)

The oriented film was formed in the same manner as in Example 1 on the transparent film produced.

(Production of Optically Anisotropic Layer)

The optically anisotropic layer was produced in the same manner as in Example 11.

(Production of TN Mode Liquid Crystal Display Device)

Angles of the slow axes of the transparent support, Optically anisotropic layers A (and B) and the optically anisotropic layer produced and angles of the absorption axes of the polarizing plates were set as shown in Table 8 to produce a TN mode liquid crystal display device.

Example 18

(Production of Transparent Support)

The composition shown below was put into a mixing tank and stirred to dissolve the components, thereby preparing a solution.

| | |
|---|---|
| Cellulose acetate (substitution degree: 2.86) | 100.0 parts by weight |
| Additive 1 shown in Table 2 below | shown in Table 2 below |
| Additive 2 shown in Table 2 below | shown in Table 2 below |
| Methylene chloride | 365.8 parts by weight |
| Methanol | 92.6 parts by weight |
| Butanol | 4.6 parts by weight |

A film formation was performed using the dope by a solution casting method, thereby producing a cellulose ester film. A thickness of the film after stretching was 40 μm. The film was stretched in MD at a ratio ranging from 0 to 10% by transportation in MD. Specifically, the stretching ratio of Transparent support T-1 was 5%. The temperature at the stretching was in a range from Tg−30 to Tg−5° C. when the glass transition point of the film was represented by Tg.

TABLE 2

| | Additive 1 | | Additive 2 |
|---|---|---|---|
| | Kind (% by weight) | Average Ester Substitution Ratio (%) | Kind (% by weight) |
| Support T-1 | Sugar ester 1 (5.5) | 71 | Sugar ester 2 (1.5) |

In Table 2 above, each of Sugar ester 1 and Sugar ester 2 is the compound or the mixture having the structure shown below. The average ester substitution degree of Sugar ester 1, which was sucrose benzoate, was measured by the method shown below.

According to the measurement by HPLC under the condition described below, a peak found at the retention time of around 31.5 minutes was an 8-substitution derivative, a group of peaks found at the retention time of around from 27 to 29 minutes was a 7-substitution derivative, a group of peaks found at the retention time of around from 22 to 25 minutes was a 6-substitution derivative, a group of peaks found at the retention time of around from 15 to 20 minutes was a 5-substitution derivative, a group of peaks found at the retention time of around from 8.5 to 13 minutes was a 4-substitution derivative, and a group of peaks found at the retention time of around from 3 to 6 minutes was a 3-substitution derivative group, and an average substitution degree relative to the value obtained by totalizing the respective area ratios was calculated.

<<HPLC Measurement Condition>>

Column: TSK-gel ODS-100Z (Tosoh), 4.6*150 mm, Lot Number (P0014).

Eluent A: $H_2O$=100, Eluent B: AR=100. A and B both contained 0.1% of AcOH and 0.1% of $NEt_3$. Flow rate: 1 ml/min. Column temperature: 40° C. Wavelength: 254 nm. Sensitivity: AUX2. Injection amount: 10 Rinse solution: $THF/H_2O$=9/1 (in volume ratio).

Sample concentration: 5 mg/10 ml (THF).

Although the average ester substitution degree of Sugar ester 2 could be measured in the same manner, Sugar ester 2 was a single compound having an ester substitution degree of approximately 100%.

The sucrose benzoate used in the example had been subjected to reduced pressure drying (10 mmHg or less) of toluene which had been the reaction solvent and the toluene content was less than 100 ppm.

The in-plane retardation Re and the retardation in a thickness direction Rth at a wavelength of 550 nm of the cellulose acetate film (Support T-1) produced were 1 nm and 40 nm, respectively.

Sugar Ester 1; Average Ester Substitution Ratio: 71%

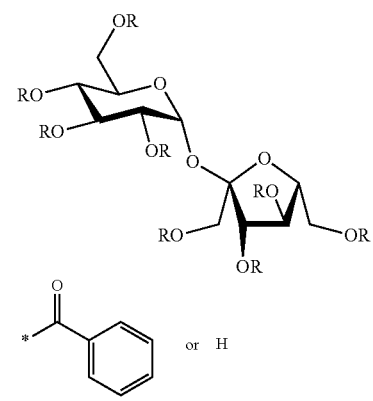

Sugar Ester 2; Average Ester Substitution Ratio: 100% (Single Compound)

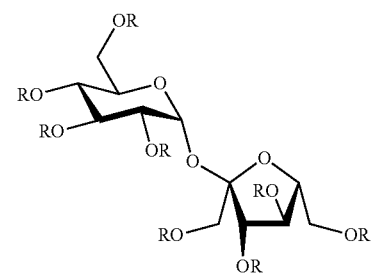

R = acetyl group/isobutyryl group (2/6)

(Formation of Oriented Film)

The oriented film was formed in the same manner as in Example 1 on the transparent support produced.

(Production of Optically Anisotropic Layers A and B)

Optically anisotropic layers A (and B) were produced in the same manner as in Example 16 except for changing the wire bar to a wire bar of #1.8.

(Formation of Oriented Film)

The oriented film was formed in the same manner as in Example 1 on the transparent film produced.

(Production of Optically Anisotropic Layer)

The optically anisotropic layer was produced in the same manner as in Example 12.

(Production of TN Mode Liquid Crystal Display Device)

Angles of the slow axes of the transparent support, Optically anisotropic layers A (and B) and the optically anisotropic layer produced and angles of the absorption axes of the polarizing plates were set as shown in Table 8 to produce a TN mode liquid crystal display device.

Example 19

(Production of Transparent Support)

The transparent support was produced in the same manner as in Example 1.

(Alkali Saponification Treatment)

The transparent support was passed through induction heated rollers at temperature of 60° C. to raise the film surface temperature to 40° C., and then on one surface of the film was coated an alkali solution having the composition shown below in an amount of 14 ml/m² using a bar coater, followed by transporting for 10 seconds under a steam-type far infrared heater (produced by Noritake Co., Ltd.) heated at 110° C. Subsequently, the film was coated with pure water in an amount of 3 ml/m² using a bar coater. Then, water washing by a fountain coater and draining by an air-knife were repeated three times, and the film was dried by transporting in a drying zone at 70° C. for 10 seconds, thereby producing the transparent support subjected to an alkali saponification treatment.

(Composition of Alkali Solution)
—Composition of Alkali Solution—

| Potassium hydroxide | 4.7 parts by weight |
| Water | 15.8 parts by weight |
| Isopropanol | 63.7 parts by weight |

-continued

| Surfactant SF-1: $C_{14}H_{29}O(CH_2CH_2O)_{20}H$ | 1.0 part by weight |
| Propylene glycol | 14.8 parts by weight |

(Formation of Oriented Film)

A coating solution for oriented film having the composition shown below was continuously coated on the transparent support subjected to the saponification treatment described above by a wire bar of #14. The coated layer was dried with hot air of 60° C. for 60 seconds and then with hot air of 100° C. for 120 seconds.

(Composition of Coating Solution for Oriented Film)

| Modified polyvinyl alcohol shown below | 10 parts by weight |
| Water | 371 parts by weight |
| Methanol | 119 parts by weight |
| Glutaraldehyde | 0.5 parts by weight |
| Photopolymerization initiator (IRGACURE 2959, produced by Ciba Japan Ltd.) | 0.3 parts by weight |

Modified polyvinyl alcohol (unit of a content ratio of each repeating unit being % by mole)

$$-(CH_2-CH)_{86.3}-(CH_2-CH)_{12}-(CH_2-CH)_{1.7}-$$
$$\phantom{-(CH_2-CH)_{86.3}}|\phantom{-(CH_2-CH)_{12}}|\phantom{-(CH_2-CH)_{1.7}}|$$
$$\phantom{-(CH_2-CH)_{86.3}}OH\phantom{xxx}OCOCH_3\phantom{xx}OCONHCH_2CH_2OCOC{=}CH_2$$
$$\phantom{xxxxxxxxxxxxxxxxxxxxxxxxxxxxxxxxxxxxxxxxxxxxxxxxxxxxxxxxxxxxxxxxx}|$$
$$\phantom{xxxxxxxxxxxxxxxxxxxxxxxxxxxxxxxxxxxxxxxxxxxxxxxxxxxxxxxxxxxxxxxx}CH_3$$

(Formation of Optically Anisotropic Layers A (and B))

A rubbing treatment was continuously conducted on the oriented film produced above. At this time, the longitudinal direction of the transparent support was parallel to the transporting direction thereof and the rotation axes of the rubbing roll were in directions of 45° and −45° clockwise to the longitudinal direction of the transparent support, respectively.

Coating solution (A) containing the discotic liquid crystal compound having the composition shown below was continuously coated on the oriented film produced above by a wire bar of #1.6. The transporting velocity (V) of the film was adjusted to 36 m/min. The film was heated with hot air of 80° C. for 90 seconds for drying the solvent of the coating solution and alignment ripening of the discotic liquid crystal compound. Subsequently, UV irradiation was conducted at 80° C. to fix alignment of the liquid crystal compound, thereby forming an optically anisotropic layer.

(Composition of Coating Solution (A) for Optically Anisotropic Layer)

| Discotic liquid crystal compound shown below | 100 parts by weight |
| Photopolymerization initiator (IRGACURE 907, produced by Ciba Japan Ltd.) | 3 parts by weight |
| Sensitizer (KAYACURE DETX, produced by Nippon Kayaku Co., Ltd.) | 1 part by weight |
| Pyridinium salt shown below | 1 part by weight |
| Fluorine-based polymer (FP1) shown below | 0.4 part by weight |
| Methyl ethyl ketone | 473 parts by weight |

Discotic liquid crystal compound

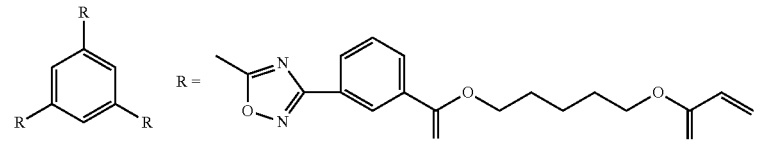

Pyridinium salt

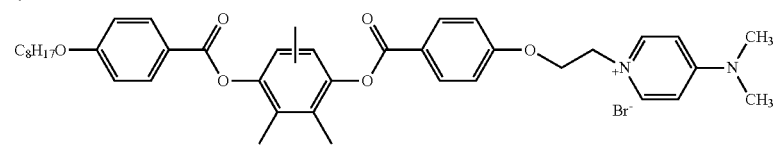

[ka 22]
Fluorine-based polymer (FP1)

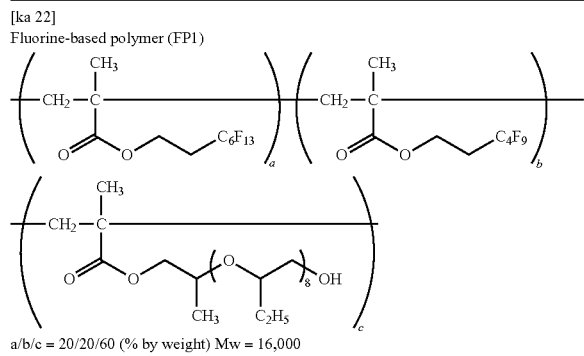

a/b/c = 20/20/60 (% by weight) Mw = 16,000

(Formation of Oriented Film)

The oriented film was formed in the same manner as in Example 1 on the transparent film produced.

(Production of Optically Anisotropic Layer)

The optically anisotropic layer was produced in the same manner as in Example 11.

(Production of TN Mode Liquid Crystal Display Device)

Angles of the slow axes of the transparent support, Optically anisotropic layers A (and B) and the optically anisotropic layer produced and angles of the absorption axes of the polarizing plates were set as shown in Table 8 to produce a TN mode liquid crystal display device.

Example 20

(Production of Transparent Support)

The transparent support was produced in the same manner as in Example 17.

(Formation of Optically Anisotropic Layers A (and B))

Using the transparent support described above, the alkali saponification treatment, the formation of oriented film and the production of Optically anisotropic layers A (and B) were performed in the same manner as in Example 19.

(Formation of Oriented Film)

The oriented film was formed in the same manner as in Example 1 on the transparent film produced.

(Production of Optically Anisotropic Layer)

The optically anisotropic layer was produced in the same manner as in Example 11.

(Production of TN Mode Liquid Crystal Display Device)

Angles of the slow axes of the transparent support, Optically anisotropic layers A (and B) and the optically anisotropic layer produced and angles of the absorption axes of the polarizing plates were set as shown in Table 8 to produce a TN mode liquid crystal display device.

Example 21

(Production of Transparent Support)

The transparent support was produced in the same manner as in Example 18.

Using the transparent support described above, the alkali saponification treatment and the formation of oriented film were performed in the same manner as in Example 19.

(Formation of Optically Anisotropic Layers A (and B))

Optically anisotropic layers A (and B) were produced in the same manner as in Example 19 except for changing the wire bar to a wire bar of #1.2.

(Formation of Oriented Film)

The oriented film was formed on the transparent film produced in the same manner as in Example 1.

(Production of Optically Anisotropic Layer)

The optically anisotropic layer was produced in the same manner as in Example 12.

(Production of TN Mode Liquid Crystal Display Device)

Angles of the slow axes of the transparent support, Optically anisotropic layers A (and B) and the optically anisotropic layer produced and angles of the absorption axes of the polarizing plates were set as shown in Table 8 to produce a TN mode liquid crystal display device.

Example 22

A TN mode liquid crystal display device was produced in the same manner as in Example 16 except for using the light diffusion film produced in Example 14 as the light diffusion film.

Example 23

A TN mode liquid crystal display device was produced in the same manner as in Example 16 except for using the light diffusion film produced in Example 15 as the light diffusion film.

Example 24

A TN mode liquid crystal display device was produced in the same manner as in Example 19 except for using the light diffusion film produced in Example 14 as the light diffusion film.

Example 25

A TN mode liquid crystal display device was produced in the same manner as in Example 19 except for using the light diffusion film produced in Example 15 as the light diffusion film.

[Evaluation of Liquid Crystal Display Device]

(Evaluation of Front White Brightness)

As to each of the liquid crystal display devices produced above, using a measuring machine, EZContrast XL88 (produced by ELDIM S.A.), brightness in the front direction (in the normal direction to the display surface) in white display was measured (the result was referred to as Y) and then, brightness of the backlight alone obtained by removing the liquid crystal panel from the liquid crystal display device was measured (the result was referred to as Y0), and using a ratio of these values, the front white brightness was evaluated according the criteria shown below.
4: 4.0%≤Y/Y0
3: 3.0%≤Y/Y0<4.0%
2: 2.0%≤Y/Y0<3.0%
1: 1.0%≤Y/Y0<2.0%
(Gradation Inversion)

On each of the liquid crystal display devices produced above, an image of ISO 12640-1:1997, Standard number JIS X 9201:1995, Image name: Portrait was displayed, and the image was visually observed from a downward direction (a polar angle of 30°) in a dark room to evaluate the gradation inversion of the displayed image.
5: Gradation inversion in the downward direction is not observed.
4: Gradation inversion in the downward direction is hardly observed.
3: Gradation inversion in the downward direction is somewhat observed.
2: Gradation inversion in the downward direction is observed.
1: Gradation inversion in the downward direction is greatly observed.
(Evaluation of Actual Image: Difference in Gradation Reproducibility and Tint Between Front Image and Oblique Image)

On each of the liquid crystal display devices produced above, an image of ISO 12640-1:1997, Standard number JIS X 9201:1995, Image name: Portrait was displayed, and the image was visually observed from the front and from an oblique direction (a polar angle of 45° and an optional azimuth angle) in a dark room to evaluate symmetry of the displayed image.
5: Difference in gradation and tint is hardly recognized even when viewed from any azimuth angles.
4: Difference in gradation and tint is very small even when viewed from any azimuth angles.
3: Difference in gradation and tint is small even when viewed from any azimuth angles.
2: Difference in gradation and tint occurs when viewed from a specific azimuth angle.
1: Difference in gradation and tint is large when viewed from a specific azimuth angle.

The respective results are shown in Tables 6 to 8.

Although the absorption axis of Polarizing plate 1 was set to 90° and the absorption axis of Polarizing plate 2 was set to 0° in the examples, similar effects are obtained when the absorption axis of Polarizing plate 1 is set to 0° and the absorption axis of Polarizing plate 2 is set to 90°.

Example 26

Pellets of a thermoplastic norbomene resin (ZEONOR 1420, produced by Zeon Corp., glass transition point: 137° C.) which was one kind of alicyclic olefin polymers were dried at 100° C. for 5 hours. The pellets were supplied to an extruder, molten in the extruder, passed through a polymer pipe and a polymer filter, extruded in the form of sheet from a T-die on a casting drum, and cooled to obtain a film roll having a thickness of 100 μm.

Using the stretching machine shown in FIG. 1, the film was obliquely stretched under the conditions of a feeding angle to the winding direction of the film of 40°, a stretching ratio of 1.6 and a stretching temperature of 140° C. to produce Film roll A. Then, Film roll A was stretched at a stretching ratio of 1.5 and a stretching temperature of 145° C. to produce a film roll (transparent support). The stretching ratio of Film roll A indicated a stretching ratio in the longitudinal direction of the film×a stretching ratio in the width direction of the film.

A thickness of the film was 55 μm. The in-plane retardation Re and the retardation in a thickness direction Rth at a wavelength of 550 nm of the transparent support were 52 nm and 105 nm, respectively.
(Saponification of Film)

The film roll (transparent support) produced and FUJITAC TD80UF (produced by Fujifilm Corp.) were immersed in an aqueous 1.5 mol/L NaOH solution (saponification solution) controlled at temperature of 55° C. for 2 minutes, then TD80UF was washed with water, thereafter immersed in an aqueous 0.05 mol/L sulfuric acid solution for 30 seconds, and further passed through a water washing bath. After repeating three times draining by an air-knife to remove water, the film was retained for 15 seconds in a drying zone at 70° C. to dry, thereby producing films subjected to the saponification treatment. As to the film roll, the surface treatment was changed to a corona treatment.
(Production of Optically Anisotropic Layer)

The oriented film and the optically anisotropic layer were produced in the same manner as in Example 11.
(Production of Polarizing Layer)

A film was stretched in the longitudinal direction applying a difference of peripheral speed between two pairs of nip rollers according to Example 1 of JP-A-2001-141926 to produce a polarizing layer having a thickness of 20 μm.
(Sticking)

The polarizing layer thus-obtained and the film roll (optical compensation film) and FUJITAC subjected to the saponification treatment described above were arranged such that the saponified surfaces of the films were faced the polarizing layer to sandwich the polarizing layer between the films and stuck in a roll-to-roll manner with a 3% aqueous solution of polyvinyl alcohol (PVA-117H, produced by Kuraray Co., Ltd.) as an adhesive such that the polarization axis and the longitudinal direction of the film were orthogonally crossed to each other.
(Production of Liquid Crystal Cell)

The polarizing plate produced was arranged so as to form the same relation between the absorption axis of the polarizing plate and the slow axis of the optical film as in Example 11, thereby producing a TN mode liquid crystal display device. The display performance obtained was equivalent to that in Example 11.

Examples 27 to 29

(Production of Transparent Support)

Transparent supports Z1 to Z3 were produced according the method shown below.
(Preparation of Cellulose Acylate Solution)
1] Cellulose Acylate Cellulose acylate A shown below was used. The cellulose acylate was dried by heating at 120° C. so as to have a water content of 0.5% by weight or less and then used in an amount of 20 parts by weight.
Cellulose Acylate A:

Powder of cellulose acetate having a substitution degree of 2.86 was used. Cellulose acylate A had a viscosity-average polymerization degree of 300, a substitution degree of acetyl group at 6-position of 0.89, an acetone extract of 7% by weight, a ratio of weight average molecular weight/number average molecular weight of 2.3, a water content of 0.2% by weight, a viscosity in 6% by weight dichloromethane solution of 305 mPa·s, a residual acetic acid amount of 0.1% by weight or less, a Ca content of 65 ppm, an Mg content of 26 ppm, an iron content of 0.8 ppm, a sulfate ion content of 18 ppm, an yellow index of 1.9, and a free acetic acid amount of 47 ppm.

The average particle size of the powder was 1.5 mm, and the standard deviation thereof was 0.5 mm.

2] Solvent

Solvent A shown below was used in an amount of 80 parts by weight. The water content of the solvent was 0.2% by weight or less.

Solvent A:

Dichloromethane/methanol/butanol=81/18/1 (by weight ratio)

3] Additives

The additives shown in Table 3 were selected from the group of additives shown below. The "addition amount" of the compound for controlling optical anisotropy or the retardation raising agent shown in Table 3 is indicated in % by weight when the amount of the cellulose acylate is taken as 100% by weight. The amounts of the additive and the retardation raising agent added to the cellulose acylate solution were adjusted so as to have the addition amounts shown in Table 3, respectively.

(Compound Having Repeating Unit)

A-1: Condensate of ethane diolladipic acid (1/1 by molar ratio), both terminals of which are acetate esters; number average molecular weight: 1,000, hydroxy group value: 0 mg KOH/g A-2: Condensate of ethane diolladipic acid (1/1 by molar ratio); number average molecular weight: 1,000, hydroxy group value: 112 mg KOH/g (Retardation Raising Agent)

[ka 23]

L: Compound having structure shown below

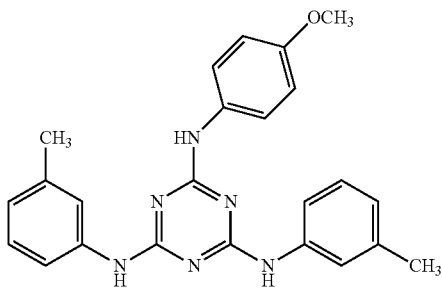

(Other Additives)

M1: Silicon dioxide fine particle (particle size: 20 nm, Mohs Hardness: about 7) (0.02 parts by weight)

M2: Silicon dioxide fine particle (particle size: 20 nm, Mohs Hardness: about 7) (0.05 parts by weight)

4] Dissolution

The solvent and additive described above were put into a 4000 L stainless dissolving tank having a stirring blade, and while stirring and dispersing them, the cellulose acylate described above was gradually added thereto. After the completion of the addition, the mixture was stirred at room temperature for 2 hours, then swollen for 3 hours, and thereafter again stirred to obtain a cellulose acylate solution.

For the stirring, a dissolver-type eccentric stirring shaft stirring at a circumferential speed of 5 m/sec (shear stress of $5 \times 10^4$ kgf/m/sec$^2$ [$4.9 \times 10^5$ N/m/sec$^2$]) and a stirring shaft having an anchor blade in the central shaft and stirring at a circumferential speed of 1 m/sec (shear stress of $1 \times 10^4$ kgf/m/sec$^2$ [$9.8 \times 10^4$ N/m/sec$^2$]) were used. The swelling was conducted by stopping the high-speed stirring shaft and setting the circumferential speed of the stirring shaft having an anchor blade to 0.5 m/sec.

The swollen cellulose acetate solution was heated to 50° C. from the tank through a jacketed pipe, and then heated to 90° C. under a pressure of 1.2 MPa to achieve complete dissolution. The heating time was 15 minutes. In the process, the filter, housing and piping exposed to the high temperature were made of HASTELLOY alloy (registered trademark) excellent in corrosion resistance and jacketed for circulating a heat medium for heat insulation and heating.

Subsequently, the solution was cooled to 36° C. to obtain a cellulose acylate solution.

The dope thus obtained prior to concentration was flashed in a tank at a normal pressure and 80° C. and the solvent evaporated was recovered and separated with a condenser. The solid content concentration of the dope after the flash was 24.8% by weight. The solvent condensed was sent to the recovery process so as to be reused as a solvent for the preparation process (the recovery being performed by the distillation process, dehydration process, and the like). The dope was stirred in the flash tank by rotating a central shaft having an anchor blade at a circumferential speed of 0.5 m/sec to defoam. The temperature of the dope in the tank was 25° C. and the average retention time in the tank was 50 minutes.

5] Filtration

Then, the dope first passed through a sintered fiber metal filter having a nominal pore diameter of 10 μm and then through a sintered fiber filter having a nominal pore diameter of 10 μm. The dope after filtration was stored in a 2000 L stainless steel stock tank while adjusting the temperature of the dope to 36° C.

(Production of Film)

1] Casting Process

Subsequently, the dope in the stock tank was transferred. The casting die had a width of 2.1 m, and the casting was performed by controlling the dope flow rate at the die exit point to have a casting width of 2,000 mm. In order to control the temperature of the dope to 36° C., a jacket was provided on the casting die to control the temperature of a heat transmitting medium supplied to the jacket at the inlet to 36° C.

The die, the feed block and the pipe were all kept at 36° C. during the operation process.

2) Casting Die

A material for the die was a two-phase stainless steel having a mixed composition of an austenite phase and a ferrite phase and a material having a thermal expansion coefficient of $2 \times 10^{-6}$ (° C.$^{-1}$) or less and a corrosion resistance approximately equivalent to that of SUS 316 according to an accelerated corrosion test in an aqueous electrolyte solution was used.

As a lip tip of the casting die, a lip tip having a WC coating formed by a thermal spraying method was used. A mixed solvent (dichloromethane/methanol/butanol (83/15/2 parts by weight)) which was a solvent for solubilizing the dope was supplied to air-liquid interfaces of the bead end and the slit at 0.5 ml/min on one side.

3) Metal Support

As the support for the dope extruded from the die, a mirror surface stainless steel support which was a drum having a width of 2.1 m and a diameter of 3 m was used. Nickel casting and hard chromium plating were performed on the surface thereof. The drum was polished to a surface roughness of 0.01 μm or less, and a support on which a pin hole of 50 μm or more did not exist at all, a pinhole of 10 μm to 50 μm was 1 per m$^2$ or less and a pin hole of 10 μm or less was 2 per m$^2$ or less was used. At that time, the temperature of the drum was set to −5° C., and the number of rotations of the drum was set such that a circumferential speed of the drum was 50 m/min. When the surface of the drum was contaminated during the casting, cleaning was appropriately performed.

4) Casting and Drying

Subsequently, the dope which was cast, cooled, and gelled on the drum placed in the space set at 15° C. was peeled off as a gelled film (web) at a time when the dope was rotated at 320° on the drum. At that time, the peel-off speed was set with respect to the support speed so as to have the stretching ratio shown in Table 3. The remaining solvent amount at the time of initiation of stretching was shown in Table 3.

5) Tenter Transportation•Drying Process Conditions

The web peeled-off was transported to a drying zone while being fixed at both edges thereof by a tenter having pin clips and dried with drying air.

6) Post Drying Process Conditions

The optical film after trimming obtained by the method described above was further dried in a roller transportation zone. A material of the roller was aluminum or carbon steel, and a surface thereof was plated with hard chromium. The surface of the roller used was flat or subjected to a matting processing with blasting. The optical film produced was subjected to the post heat treatment at the temperature and time shown in Table 3.

7) Post-Treatment and Winding Conditions

The polymer film after drying was cooled to 30° C. or less, and both edges thereof were trimmed. The trimming was performed by installing every two devices for slitting the film edge portions in both of left and right edges of the film (the number of the slitting devices was two per one side) and slitting the film edge portions. Further, the optical film was knurled at both edges thereof. The knurling was performed by embossing the film from one side. Thus, an optical film having a width of 1,400 mm as a final product was obtained and wound by a winding machine, thereby producing an optical film.

[Substitution Degree]

The acyl substitution degree of cellulose acylate was obtained by $^{13}$C-NMR according to the method described in Tezuka et al., *Carbohydr. Res.*, 273 (1995), pages 83 to 91.

[Remaining Solvent Amount]

The remaining solvent amount of the web (film) according to the invention was calculated based on the formula shown below.

$$\text{Remaining solvent amount (\% by weight)} = \{(M-N)/N\} \times 100$$

wherein M represents a weight of the web (film), and N represents a weight when the web (film) is dried at 110° C. for 3 hours.

TABLE 3

| Optical Film | Compound for Controlling Optically Anisotropic Layer | | Amount of Retardation Raising Agent | Other Additives | Stretching Direction | Remaining Solvent Amount (% by weight) | Stretching Ratio (%) | Tg (° C.) | Post Heat Treatment Temperature (° C.) | Post Heat Treatment Time (hours) |
|---|---|---|---|---|---|---|---|---|---|---|
| | Kind | Amount | | | | | | | | |
| Z1 | A-1 | 15 | 0 | M1 | MD | 230 | 39 | 125 | 115 | 10 |
| Z2 | A-1 | 25 | 0 | M2 | MD | 200 | 25 | 120 | 130 | 10 |
| Z3 | A-2 | 25 | 0.2 | M2 | MD | 200 | 25 | 120 | 130 | 10 |

The oriented film and Optically anisotropic layers A and B were formed in the same manner as in Example 16 on the transparent support produced.

Transparent support Z1 was used in Example 27, Transparent support Z2 was used in Example 28, and Transparent support Z3 was used in Example 29.

(Formation of Oriented Film)

The oriented film was formed in the same manner as in Example 16 on the transparent film produced.

(Production of Optically Anisotropic Layer)

The coating solution shown below was continuously coated on the surface of the oriented film using a wire bar of #3.6. The solvent was dried in the process of continuously heating from room temperature to 100° C., and then the film was heated in a drying zone at 135° C. for about 90 seconds to align the discotic liquid crystal compound. Subsequently, the film was transported to a drying zone at 80° C. and in the state where the film surface temperature was about 100° C. an ultraviolet ray having an illuminance of 600 mW was irradiated for 10 seconds by an ultraviolet irradiation apparatus to accelerate a crosslinking reaction, thereby polymerizing the discotic liquid crystal compound. Thereafter, the film was allowed to cool to room temperature to form an optically anisotropic layer, thereby producing an optical compensation film.

(Composition of Coating Solution for Optically Anisotropic Layer)

| | |
|---|---|
| Methyl ethyl ketone | 300.00 parts by weight |
| Discotic liquid crystalline compound (1) shown above | 91.00 parts by weight |
| Ethylene oxide-modified trimethylolpropane triacrylate (V#360, produced by Osaka Organic Chemical Industry Ltd.) | 9.00 parts by weight |
| Air interface alignment controlling agent A shown below | 0.18 parts by weight |

| | |
|---|---|
| Air interface alignment controlling agent B shown below | 0.42 parts by weight |
| Photopolymerization initiator (IRGACURE 907, produced by Ciba-Geigy Co., Ltd.) | 3.00 parts by weight |
| Sensitizer (KAYACURE DETX, produced by Nippon Kayaku Co., Ltd.) | 1.00 part by weight |

Air interface alignment controlling agent A

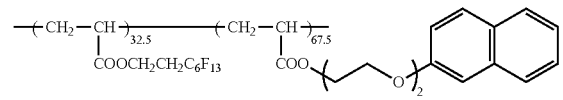

Air interface alignment controlling agent B

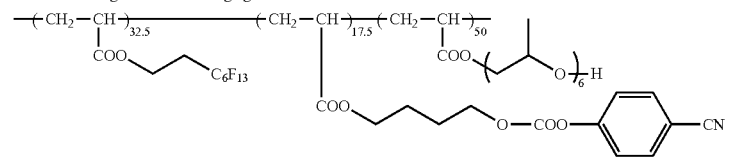

(Production of TN Mode Liquid Crystal Display Device)

Angles of the slow axes of the optical compensation films and the absorption axes of the polarizing plates were set as shown in Table 9 to produce a TN mode liquid crystal display device.

Example 30

(Production of Transparent Support)

Transparent supports Z4 was produced according to the method shown below.
(Preparation of Polymer Solution)
<1> Cellulose Acylate Cellulose acylate AA shown below was used. The cellulose acylate was dried by heating at 120° C. so as to have a water content of 0.5% by weight or less and then used in an amount of 20 parts by weight.
Cellulose Acylate AA:

Powder of cellulose acetate having a substitution degree of 2.86 was used. Cellulose acylate AA had a viscosity-average polymerization degree of 300, a substitution degree of acetyl group at 6-position of 0.89, an acetone extract of 7% by weight, a ratio of weight average molecular weight/number average molecular weight of 2.3, a water content of 0.2% by weight, a viscosity in 6% by weight dichloromethane solution of 305 mPa·s, a residual acetic acid amount of 0.1% by weight or less, a Ca content of 65 ppm, an Mg content of 26 ppm, an iron content of 0.8 ppm, a sulfate ion content of 18 ppm, an yellow index of 1.9, and a free acetic acid amount of 47 ppm. The average particle size of the powder was 1.5 mm, and the standard deviation thereof was 0.5 mm.
2] Solvent The water content of the solvent was 0.2% by weight or less.
Solvent AA:

Dichloromethane/methanol/butanol=81/18/1 (by weight ratio)
3] Additives

The additives shown in Table 4 were used. In addition, Additive M shown below was also added to the dopes for the support surface and the air surface. The "parts by weight" of each of the additives shown in Table 4 is indicated in parts by weight when the amount of the cellulose acylate is taken as 100 parts by weight.
(Compound Having Repeating Unit)
AA-1: Condensate of ethane diol/adipic acid (1/1 by molar ratio); number average molecular weight: 1,000, hydroxy group value: 112 mg KOH/g (Other Additive)
A: Compound having structure shown below

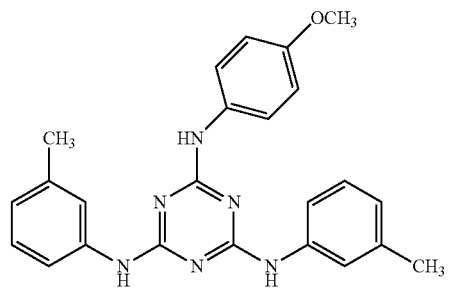 [SMILES: COc1ccc(Nc2nc(Nc3cccc(C)c3)nc(Nc3cccc(C)c3)n2)cc1]

B: Compound shown below

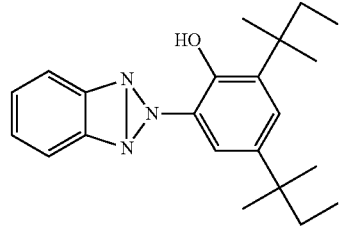 [SMILES: CCC(C)(C)c1cc(-n2n3c4ccccc4n23)c(O)c(C(C)(C)CC)c1]

M: Silicon dioxide fine particle (particle size: 20 nm, Mohs Hardness: about 7) (0.02 parts by weight)
4] Dissolution The solvent and additive described above were put into a 4000 L stainless dissolving tank having a stirring blade, and while stirring and dispersing them, the cellulose acylate described above was gradually added thereto. After the completion of the addition, the mixture was stirred at room temperature for 2 hours, then swollen for 3 hours, and thereafter again stirred to obtain a cellulose acylate solution.

For the stirring, a dissolver-type eccentric stirring shaft stirring at a circumferential speed of 5 m/sec (shear stress of $5\times10^4$ kgf/m/sec$^2$ [$4.9\times10^5$ N/m/sec$^2$]) and a stirring shaft having an anchor blade in the central shaft and stirring at a circumferential speed of 1 m/sec (shear stress of $1\times10^4$ kgf/m/sec$^2$ [$9.8\times10^4$ N/m/sec$^2$]) were used. The swelling was conducted by stopping the high-speed stirring shaft and setting the circumferential speed of the stirring shaft having an anchor blade to 0.5 m/sec.

The swollen cellulose acetate solution was heated to 50° C. from the tank through a jacketed pipe, and then heated to 90° C. under a pressure of 1.2 MPa to achieve complete dissolution. The heating time was 15 minutes. In the process, the filter, housing and piping exposed to the high temperature were made of HASTELLOY alloy (registered trademark) excellent in corrosion resistance and jacketed for circulating a heat medium for heat insulation and heating.

Subsequently, the solution was cooled to 36° C. to obtain a cellulose acylate solution.

The dope thus obtained prior to concentration was flashed in a tank at a normal pressure and 80° C. and the solvent evaporated was recovered and separated with a condenser. The solid content concentration of the dope after the flash was from 23.5 to 26.0% by weight. The solvent condensed was sent to the recovery process so as to be reused as a solvent for the preparation process (the recovery being performed by the distillation process, dehydration process, and the like). The dope was stirred in the flash tank by rotating a central shaft having an anchor blade at a circumferential speed of 0.5 m/sec to defoam. The temperature of the dope in the tank was 25° C. and the average retention time in the tank was 50 minutes.

5] Filtration

Then, the dope was subjected to defoaming by irradiating a weak ultrasonic wave. Subsequently, the dope in the pressurized state of 1.3 MPa was first passed through a sintered fiber metal filter having a nominal pore diameter of 10 μm and then through a sintered fiber filter having a nominal pore diameter of 10 μm. The primary pressures thereof were 1.4 MPa and 1.1 MPa, respectively and the secondary pressures thereof were 1.0 MPa and 0.7 Mpa, respectively. The dope after filtration was stored in a 2000 L stainless steel stock tank while adjusting the temperature of the dope to 36° C. In the stock tank, the dope was stirred by always rotating a shaft having an anchor blade in a central shaft at a circumferential speed of 0.3 m/sec. In the production of dope from the dope before concentration, a problem, for example, corrosion did not occurred at all in the dope contact part.

(Formation of Film)

1) Casting Process

Subsequently, the dope in the stock tank was sent by a gear pump for primary increasing pressure under feedback control by an inverter motor such that the primary lateral pressure of the high precision gear pump became 0.8 MPa. The high precision gear pump has a performance of volumetric efficiency of 99.3% and discharge amount variation of 0.4% or less. Further, discharge pressure was 1.4 MPa. A device having a width of 2.1 m equipped with a feed block adjusting for co-casting and capable of stacking the main stream and respective layers on both sides of the main stream to mold a film having a three-layer structure was used as a co-casting die.

As the solution sending flow channel of the dope, three flow channels for intermediate layer, for support surface and for air surface were used, and the solid content concentration of each dope was appropriately controlled to decrease by adding the solvent or to increase by adding a solution having a high solid content concentration.

The casting was performed by controlling the dope flow rate at the die exit point to have a casting width of 2,000 mm. In order to control the temperature of the dope to 36° C., a jacket was provided on the casting die to control the temperature of a heat transmitting medium supplied to the jacket at the inlet to 36° C.

The die, the feed block and the pipe were all kept at 29° C. during the operation process. The die used was a coat hanger type die equipped with an automatic thickness control mechanism using a heat bolt where thickness control bolts were provided at a pitch of 20 mm. The heat bolt had a performance of setting a profile corresponding to the solution sending amount of high precision gear pump by a program set preliminarily and also capable of conducting feedback control by a control program based on the profile of an infrared thickness gauge installed in the film forming process. In the film excluding 20 mm of a casting edge portion, the thickness difference between any two points apart from each other by 50 mm was controlled to 1 μm or less, and the largest difference between the minimum values in the width direction was controlled to 2 μm or less. Also, a chamber for reducing the pressure was installed on the primary side of the die. The decompression degree of the decompression chamber was configured to apply a pressure difference from 1 to 5000 Pa between the upstream side and downstream side of a casting bead, and the adjustment was capable of performing corresponding to the casting speed. At that time, the pressure difference was set such that the length of bead was from 2 to 50 mm.

2) Casting Dye

A material for the die was a two-phase stainless steel having a mixed composition of an austenite phase and a ferrite phase and a material having a thermal expansion coefficient of $2 \times 10^{-6}$ (° C.$^{-1}$) or less and a corrosion resistance approximately equivalent to that of SUS 316 according to an accelerated corrosion test in an aqueous electrolyte solution was used. The finishing accuracy of the solution-contact surface of the casting die and the feed block was adjusted such that the surface roughness was 1 μm or less, the straightness was 1 μm/m or less in any direction, and the clearance of slit could be adjusted from 0.5 to 3.5 mm by the automatic adjustment. The production of the film was performed with the clearance of 0.7 mm. A corner portion of the solution-contact part at the lip tip of the die was processed such that R was 50 μm or less over the entire slit width. The shear speed inside the die was in a range from 1 to 5000 (sec$^{-1}$).

Also, a cured layer was provided at the lip tip of the casting die. There are tungsten carbide (WC), $Al_2O_3$, TiN, $Cr_2O_3$ and the like and WC is particularly preferred. In the invention, the WC coating formed by a thermal spraying method was used. A mixed solvent (dichloromethane/methanol/butanol (81/18/1 parts by weight)) which was a solvent for solubilizing the dope was supplied to air-liquid interfaces of the bead end and the slit at 0.5 ml/min on one side. Further, in order to make the temperature of the decompression chamber constant, a jacket was attached and a heat transmitting medium adjusted to 35 C.° was supplied into the jacket. The device capable of adjusting the edge suction air volume to a range from 1 to 100 L/min was used, and the edge suction air volume was appropriately adjusted to a range from 30 to 40 L/min in the production of the film.

3) Metal Support

As the support for the dope extruded from the die, a mirror surface stainless steel support which was a drum having a width of 2.1 m and a diameter of 3 m was used. Nickel casting and hard chromium plating were performed on the surface thereof. The drum was polished to a surface roughness of 0.01 μm or less, and a support on which a pin hole of 50 μm or more did not exist at all, a pinhole of 10 μm to 50 μm was 1 per m$^2$ or less and a pin hole of 10 μm or less was 2 per m$^2$ or less was used. At that time, the temperature of the drum was set to −5° C., and the number of rotations of the drum was set such that a circumferential speed of the drum was 80 m/min. The speed variation was 2% or less and the position variation was 200 μm or less.

4) Casting and Drying

Subsequently, the dope which was cast, cooled, and gelled on the drum placed in the space set at 15° C. was peeled off as a gelled film (web) at a time when the dope was rotated at 320° on the drum. At that time, the peeling tension was 3 kgf/m, and the peeling speed was set to 106% with respect to the support speed.

5) Tenter Transportation•Drying Process Conditions

The web peeled-off was transported to a drying zone while being fixed at both edges thereof by a tenter having pin clips and dried with drying air for about 180 seconds. The drive of the tenter was performed by a chain, and the speed variation of the sprocket of the chain was 0.5% or less. Also, the tenter was divided into four zones (a stretching zone, a width-reducing zone, a heating zone and a cooling zone) so that the drying air temperature of each zone could be independently controlled. The gas composition of the drying air was that of saturated gas concentration at −40° C. In the tenter, the film was stretched by increasing and decreasing the width in the width direction while transporting the film.

The ratio of the length fixed by the tenter of the base end was 70%. The transportation was conducted with cooling such that the temperature of the tenter clip did not exceed 50° C. The solvent evaporated in the tenter was condensed into a liquid at a temperature of −10° C. and recovered. The condensed solvent was reused by adjusting the water content therein to 0.5% by weight or less.

The edges of the film were trimmed within 30 seconds after passing through the outlet of the tenter. The both edges of 50 mm were trimmed by an NT type cutter. The oxygen concentration in the drying atmosphere of the tenter unit was maintained at 5% by volume.

The remaining solvent amount shown in Table 4 is a value of the remaining solvent amount at the inlet of each zone calculated based on the formula shown below. In the case where the sampling was difficult, the remaining solvent amount (% by weight based on the total solid content of the web) at the entrance of each zone was estimated using the drying simulation of the web.

Remaining solvent amount (% by weight)=$\{(M-N)/N\}\times 100$ wherein M represents a weight of the web (film), and N represents a weight when the web (film) is dried at 110° C. for 3 hours.

6) Post-Drying Process Conditions

The optical film after trimming obtained by the method described above was further dried in a roller transportation zone. The roller transportation zone was divided into four zones so that the drying air temperature of each zone could be independently controlled. At that time, the roller transportation tension of the film was 80 N/width, and the film was dried for about 10 minutes. The wrap angle around the roller was 90 degrees and 180 degrees. A material of the roller was aluminum or carbon steel, and a surface thereof was plated with hard chromium. The surface of the roller used was flat or subjected to a matting processing with blasting. The displacements of the film due to the rotation of the roller were all 50 μm or less. The deflection of the roller at the tension of 80 N/width was set to 0.5 mm or less.

A forced neutralization device (a neutralization bar) was installed to control the electric charge of the film during transportation to a range from −3 to 3 kV at all times. In the winding unit, not only the neutralization bar but also an ionized air neutralization device were installed to control the electric charge of the film to −1.5 to 1.5 kV.

In Table 4 below, the "temperature" indicates a temperature at the blow outlet for drying air, and the "film surface temperature" indicates a temperature of the film measured by an infrared type thermometer installed in the process. The "stretching ratio" indicates a value calculated according to the formula: $(W2-W1)/W1\times 100$, when W1 is taken as a tenter width at the inlet of each zone and W2 is taken as a tenter width at the outlet of the zone.

In the table 4 below, the tenter widths in the width-reducing zone and in the heating zone were set to narrow to the extent of not loosening while watching the state of the film. A ratio (Wt/Ww) of a width-reducing ratio (Wt) in the width-reducing zone to a coefficient of free contraction (Ww) of the web is in a range from 0.7 to 1.3.

The width-reducing ratio (Wt) is a value obtained by multiplying the stretching ratio by −1 (a reversed value of positive and negative values).

7) Post-Treatment and Winding Conditions

The polymer film after drying was cooled to 30° C. or less, and both edges thereof were trimmed. The trimming was performed by installing every two devices for slitting the film edge portions in both of left and right edges of the film (the number of the slitting devices was two per one side) and slitting the film edge portions. The slitting device was constituted of a disc-shaped rotary upper blade and a roll-shaped rotary lower blade. A material of the rotary upper blade was a super steel material, a diameter of the rotary upper blade was 200 mm, and a thickness of the blade at the cutting edge was 0.5 mm. A material of the roll-shaped rotary lower blade was a super steel material, and a roll diameter of the rotary lower blade was 100 mm. A cross-section of the film slit was relatively smooth, and no chip was observed. Also, in the film formation of the film, breakage of the film was not observed at all during transportation. Further, the film was knurled at both edges thereof. The knurling was performed by embossing the film from one side. The width of the knurling was 10 mm, and the pressure was set such that the maximum height was higher by 5 μm in average than the average thickness. Thus, the film having a width of 1,500 mm as a final product was obtained and wound by a winding machine.

Thus, the film having a width of 1,500 mm as a final product was obtained and wound by a winding machine. The winding chamber was maintained at temperature of 25° C. and a humidity of 60%. A diameter of a winding core was 168 mm, and a tension pattern was adopted such that the tension was 230 N/width in the beginning of winding and 190 N/width in the end of winding, respectively. A total length of winding was 3,900 m. In the winding, an oscillation period was 400 m, and an oscillation width was ±5 mm. Also, a pressure of a press roll to the winding roll was set at 50 N/width.

TABLE 4

| | | Additive | | | Tenter Zone | | | | | |
|---|---|---|---|---|---|---|---|---|---|---|
| | | | Amount | | Stretching Zone | | | Width-Reducing Zone | | |
| Optical Film | Kind | Total (parts by weight) | Support Surface (parts by weight) | Air Surface (parts by weight) | Remaining Solvent (% by weight) | Temperature (° C.) | Stretching Ratio (%) | Remaining Solvent (% by weight) | Temperature (° C.) | Stretching Ratio (%) |
| Z4 | AA-1 | 15 | 11 | 11 | 220 | 45 | 10 | 15 | 50 | −8 |

TABLE 4-continued

| | Tenter Zone | | | | | | | | Post-Drying |
|---|---|---|---|---|---|---|---|---|---|
| | Heating Zone | | | | | Cooling Zone | | | |
| Optical Film | Remaining Solvent (% by weight) | Temperature (° C.) | Tg (° C.) | Tc (° C.) | Stretching Ratio (%) | Heating Time (sec) | Remaining Solvent (% by weight) | Temperature (° C.) | Stretching Ratio (%) | Zone Temperature (° C.) |
| Z4 | 1.3 | 130 | 130 | 160 | 0 | 60 | 1.1 | 80 | −1 | 100 |

A liquid crystal display device was produced in the same manner as in Example 27 except for using Transparent support Z4 produced above.

Examples 31 to 33

(Production of Transparent Support)

The composition shown below was put into a mixing tank and stirred to dissolve the components, thereby preparing each solution.

| | |
|---|---|
| Cellulose acetate (substitution degree: 2.86) | 100.0 parts by weight |
| Additive 1 shown in Table 5 below | shown in Table 5 below |
| Additive 2 shown in Table 5 below | shown in Table 5 below |
| Methylene chloride | 365.8 parts by weight |
| Methanol | 92.6 parts by weight |
| Butanol | 4.6 parts by weight |

Film formation was performed by a solution casting method using each dope prepared to produce each cellulose ester film. A thickness of each film after stretching was 25 μm. Each film was stretched in MD at a ratio ranging from 0 to 10% by transportation in MD. Specifically, the stretching ratios of Transparent support T-1 and Transparent support T-3 were 3%, respectively and the stretching ratio of Transparent support T-2 was 5%. The temperature at the stretching was in a range from Tg−30 to Tg−5° C. when the glass transition point of the film was represented by Tg in each film.

TABLE 5

| | Additive 1 | | Additive 2 |
|---|---|---|---|
| | Kind (% by weight) | Average Ester Substitution Ratio (%) | Kind (% by weight) |
| Support T-1 | Sugar ester 1 (12) | 71 | — |
| Support T-2 | Sugar ester 1 (5.5) | 71 | Sugar ester 2 (1.5) |
| Support T-3 | Sugar ester 1-SB (12) | 94 | — |

In Table 5 above, each of Sugar ester 1, Sugar ester 1-SB and Sugar ester 2 is the compound or the mixture having the structure shown below. The average ester substitution degrees of Sugar ester 1 and Sugar ester 1-SB, each of which was sucrose benzoate, were measured by the method shown below.

According to the measurement by HPLC under the condition described below, a peak found at the retention time of around 31.5 minutes was an 8-substitution derivative, a group of peaks found at the retention time of around from 27 to 29 minutes was a 7-substitution derivative, a group of peaks found at the retention time of around from 22 to 25 minutes was a 6-substitution derivative, a group of peaks found at the retention time of around from 15 to 20 minutes was a 5-substitution derivative, a group of peaks found at the retention time of around from 8.5 to 13 minutes was a 4-substitution derivative, and a group of peaks found at the retention time of around from 3 to 6 minutes was a 3-substitution derivative group, and an average substitution degree to the value obtained by totalizing the respective area ratios was calculated.

<<HPLC Measurement Condition>>

Column: TSK-gel ODS-100Z (Tosoh), 4.6*150 mm, Lot Number (P0014).

Eluent A: $H_2O=100$, Eluent B: AR=100. A and B both contained 0.1% of AcOH and 0.1% of $NEt_3$.

Flow rate: 1 ml/min. Column temperature: 40° C. Wavelength: 254 nm. Sensitivity: AUX2. Injection amount: 10 μl. Rinse solution: $THF/H_2O=9/1$ (in volume ratio).

Sample concentration: 5 mg/10 ml (tetrahydrofuran (THF)).

Although the average ester substitution degree of Sugar ester 2 could be measured in the same manner, Sugar ester 2 was a single compound having an ester substitution degree of approximately 100%.

The sucrose benzoate used in the examples had been subjected to reduced pressure drying (10 mmHg or less) of toluene which had been the reaction solvent and the toluene content was less than 100 ppm.

The in-plane retardation Re and the retardation in a thickness direction Rth at a wavelength of 550 nm of the cellulose acetate film produced are shown in Table 9.

Sugar Ester 1; Average Ester Substitution Ratio: 71%

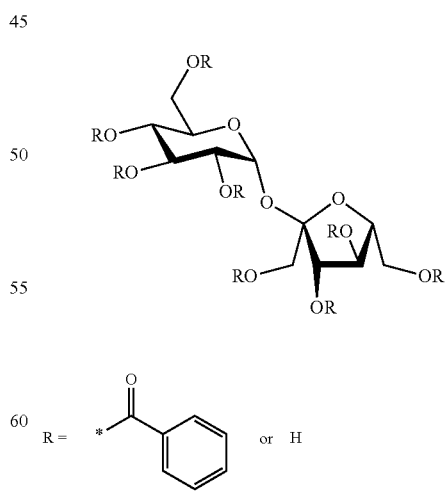

Sugar Ester 1-SB; MONOPET SB (Produced by Dai-Ichi Kogyo Seiyaku Co., Ltd., Average Ester Substitution Ratio: 94%)

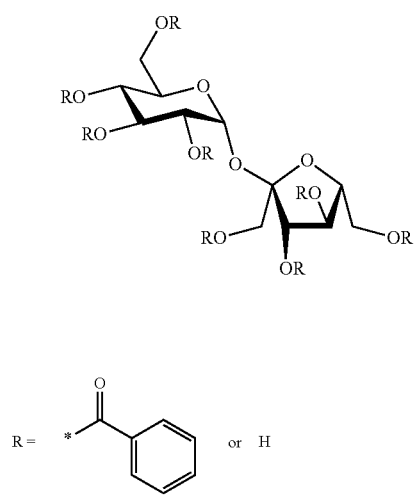

R = <image as structure> or H

Sugar Ester 2; Average Ester Substitution Ratio: 100% (Single Compound)

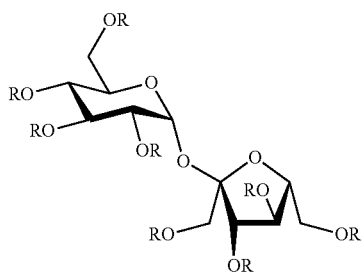

R = acetyl group/isobutyryl group (2/6)

Example 34

A liquid crystal display device was produced in the same manner as in Example 27 except for changing the transparent support to the transparent support produced in Example 10.

Example 35

(Production of Transparent Support)

Respective components shown below were mixed to prepare a cellulose acylate solution. The cellulose acylate solution was cast on a metal support, and a web obtained was peeled from the support and stretched by 20% in a TD direction at 185° C. to produce a transparent film. The TD direction as referred to herein means a direction orthogonal to the transporting direction of the film.

(Composition of Cellulose Acylate Solution)

| | |
|---|---|
| Cellulose acrylate having acetyl substitution degree of 2.94 | 100 parts by weight |
| Triphenyl phosphate (plasticizer) | 3 parts by weight |
| Biphenyl phosphate (plasticizer) | 2 parts by weight |
| Retardation controlling agent (1) | 5 parts by weight |
| Retardation controlling agent (2) | 2 parts by weight |
| Methylene chloride (first solvent) | 644 parts by weight |
| Methanol (second solvent) | 56 parts by weight |

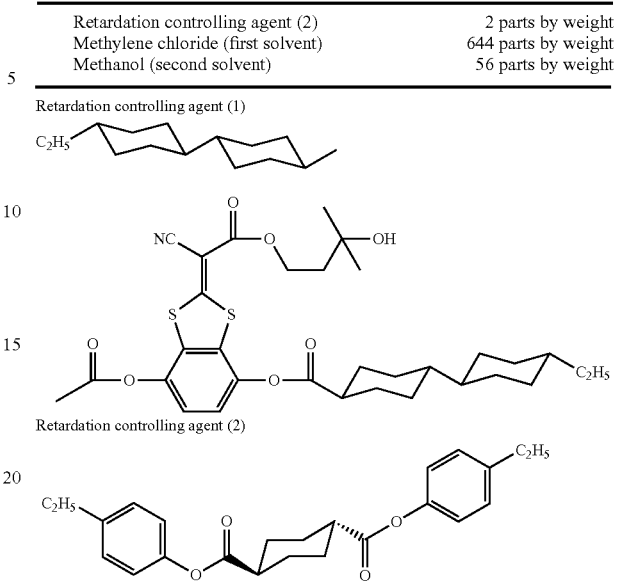

Retardation controlling agent (1)

Retardation controlling agent (2)

A liquid crystal display device was produced in the same manner as in Example 27 except for using the transparent support produced.

Example 36

A liquid crystal display device was produced in the same manner as in Example 29 except for changing the amount of the horizontal aligning agent to 0.0 parts by weight, the amount of methyl ethyl ketone to 238 parts by weight and the wire bar to a wire bar of #1.6 in the production of Optically anisotropic layers A and B.

The in-plane retardation Re (550) at a wavelength of 550 nm of Optically anisotropic layers A and B was measured using the same method as described in Example 1. Also, retardation R [+40°] and retardation R [−40°] were measured by making light having a wavelength of 550 nm incident from a direction inclined ±40° to the normal direction in a plane orthogonal to the fast axis of the optically anisotropic layer to calculate R [−40°]/R [+40°]. The Re (550) was 15 nm, and the R [−40°]/R [+40°] was 2.9.

Example 37

A liquid crystal display device was produced in the same manner as in Example 29 except for changing the wire bar to a wire bar of #3.2 in the production of Optically anisotropic layers A and B.

Example 38

A surface of commercially available norbornene polymer film (ZEONOR ZF 14-060, produced by Optes Inc.) was subjected to a corona discharge treatment by a solid state corona treatment machine (6KVA, produced by Pillar Technologies). A liquid crystal display device was produced in the same manner as in Example 27 except for using the film as the transparent support.

Example 39

A surface of commercially available cycloolefin polymer film (ARTON FLZR50, produced by JSR Corp.) was subjected to the corona discharge treatment in the same manner as in Film 14. A liquid crystal display device was produced in the same manner as in Example 27 except for using the film as the transparent support.

Example 40

A stretched film (Protective film A) was produced according to the description in paragraphs [0223] to [0226] of JP-A-2007-127893. Easily adhesive layer coating composition P-2 was prepared according to the description in paragraph [0232] of JP-A-2007-127893, and the composition was coated on the surface of the stretched film according the description in paragraph [0246] of JP-A-2007-127893 to form an easily adhesive layer. A liquid crystal display device was produced in the same manner as in Example 27 except for using the film as the transparent support.

Example 41

A propylene/ethylene random copolymer containing approximately 5% by weight of ethylene unit (SUMITOMONOBLEN W151, produced by Sumitomo Chemical Co., Ltd.) was extruded from a melt extrusion molding machine comprising a T-die arranged in a uniaxial melt extruder at a melt temperature of 260° C. to obtain a raw film. The raw film was then subjected to a corona discharge treatment on both of the front and back surfaces thereof. A liquid crystal display device was produced in the same manner as in Example 27 except for using the film as the transparent support.

Examples 42 to 50

Liquid crystal display devices were produced in the same manner as in Example 29 except for changing the sticking surfaces of the optical compensation film and the polarizing plate and/or the stack order of the optically anisotropic layer in the production of the optical compensation film so as to have the stack order shown in Table 10, respectively.

Examples 51 to 55

(Production of TN Mode Liquid Crystal Display Device)
TN mode liquid crystal display devices were produced in the same manner as in Example 11 except that the rubbing treatment to the oriented film was conducted such that the slow axis azimuth of the optical film was set to the value shown in Table 11, respectively.

Examples 56 to 57

(Production of TN Mode Liquid Crystal Display Device)
TN mode liquid crystal display devices were produced in the same manner as in Examples 53 to 54 except for using the light diffusion film described in Example 14 as the light diffusion film, respectively.

Examples 58 to 59

(Production of TN Mode Liquid Crystal Display Device)
TN mode liquid crystal display devices were produced in the same manner as in Examples 53 to 54 except for using the light diffusion film described in Example 15 as the light diffusion film, respectively.

Comparative Examples 5 to 8

(Production of TN Mode Liquid Crystal Display Device)
TN mode liquid crystal display devices were produced in the same manner as in comparative Example 1 except that the rubbing treatment to the oriented film was conducted such that the slow axis azimuths of Optically anisotropic layers 1 and 2 were set to the values shown in Table 11, respectively.

Examples 60 to 68

(Production of TN Mode Liquid Crystal Display Device)
TN mode liquid crystal display devices were produced in the same manner as in Example 29 except that the rubbing treatment to the oriented film was conducted such that the slow axis azimuth of the optical film was set to the value shown in Table 12, respectively.

Examples 69 to 70

(Production of TN Mode Liquid Crystal Display Device)
TN mode liquid crystal display devices were produced in the same manner as in Examples 62 to 63 except for using the light diffusion film described in Example 14 as the light diffusion film, respectively.

Examples 71 to 72

(Production of TN Mode Liquid Crystal Display Device)
TN mode liquid crystal display devices were produced in the same manner as in Examples 62 to 63 except for using the light diffusion film described in Example 15 as the light diffusion film, respectively.

Examples 73 to 81

(Production of TN Mode Liquid Crystal Display Device)
TN mode liquid crystal display devices were produced in the same manner as in Example 19 except that the rubbing treatment to the oriented film was conducted such that the slow axis azimuth of the optical film was set to the value shown in Table 13, respectively.

Examples 82 to 83

(Production of TN Mode Liquid Crystal Display Device)
TN mode liquid crystal display devices were produced in the same manner as in Examples 75 to 76 except for using the light diffusion film described in Example 14 as the light diffusion film, respectively.

Examples 84 to 85

(Production of TN Mode Liquid Crystal Display Device)
TN mode liquid crystal display devices were produced in the same manner as in Examples 75 to 76 except for using the light diffusion film described in Example 15 as the light diffusion film, respectively.

The results obtained by conducting the evaluation described above as to Examples 51 to 85 and Comparative Examples 5 to 8 are shown in Tables 11 to 13. From the results it can be seen that in the liquid crystal display device according to the invention, the display performance hardly deteriorated against the change in the slow axis of the optically anisotropic layer. It can also be found that in Comparative Examples 5 to 8, the front brightness in the black display is twice or more that in Comparative Example 1 (and Examples 11, 19, 29 and 51 to 85) and the increase in the front black brightness is large to deteriorate the display performance.

Example 86

(Production of Optical Compensation Film and Polarizing Plate)
The optical compensation film and the polarizing plate were produced in the same manner as in Example 11.

(Production of Liquid Crystal Cell)

A twisted alignment mode liquid crystal cell having a twist angle of 90° and Δnd (550) at a wavelength of 550 nm of 350 nm was prepared. Oriented films formed on inner surfaces of substrates were subjected to a rubbing treatment in a direction of +45° and −45°, respectively, taking the right direction of the liquid crystal cell as 0°. As a liquid crystal material, ZL1-4792 (produced by Merck and Co., Inc.) was used.

(Production of TN Mode Liquid Crystal Display Device)

The respective polarizing plates each having the optical compensation film produced above were stuck on the up and down sides of the liquid crystal cell to produce a liquid crystal panel. The surface of the optically anisotropic layer of the polarizing plate and the surface of the liquid crystal cell were stuck.

Examples 87 to 89

Liquid crystal panels were produced in the same manner as in Example 86 except for changing the Δnd (550) of the liquid crystal cell to the value shown in Table 14, respectively.

Examples 90 and 92

Liquid crystal panels were produced in the same manner as in Examples 87 and 88 except for using the light diffusion film described in Example 14 as the light diffusion film, respectively.

Examples 91 and 93

Liquid crystal panels were produced in the same manner as in Examples 87 and 88 except for using the light diffusion film described in Example 15 as the light diffusion film, respectively.

Comparative Examples 9 to 12

Liquid crystal panels were produced in the same manner as in Example 86 except for using the optical compensation film and the polarizing plate produced in Comparative Example 1 and changing the Δnd (550) of the liquid crystal cell to the values shown in Table 14, respectively.

Examples 94 to 97

Liquid crystal panels were produced in the same manner as in Examples 86 except for using the optical compensation film described in Example 29 as the optical compensation film and changing the Δnd (550) of the liquid crystal cell to the values shown in Table 15, respectively.

Examples 98 and 100

Liquid crystal panels were produced in the same manner as in Examples 95 and 96 except for using the light diffusion film described in Example 14 as the light diffusion film, respectively.

Examples 99 and 101

Liquid crystal panels were produced in the same manner as in Examples 95 and 96 except for using the light diffusion film described in Example 15 as the light diffusion film, respectively.

Examples 102 to 105

Liquid crystal panels were produced in the same manner as in Examples 86 except for using the optical compensation film described in Example 19 as the optical compensation film and changing the Δnd (550) of the liquid crystal cell to the values shown in Table 15, respectively.

Examples 106 and 108

Liquid crystal panels were produced in the same manner as in Examples 103 and 104 except for using the light diffusion film described in Example 14 as the light diffusion film, respectively.

Examples 107 and 109

Liquid crystal panels were produced in the same manner as in Examples 103 and 104 except for using the light diffusion film described in Example 15 as the light diffusion film, respectively.

(Evaluation of Front White Brightness)

A liquid crystal panel of a liquid crystal display device (S23A350H, produced by Samsung Electronics Co., Ltd.) was deconstructed, and a substrate (color filter-forming substrate) on the viewing side and a substrate (TFT-forming substrate) on the backlight side were washed to remove a liquid crystal material sealed in the liquid crystal panel.

The color filter-forming substrate and the TFT-forming substrate were arranged on the viewing side and on the backlight side of each of the liquid crystal panels produced in Examples 86 to 109 and Comparative Examples 9 to 12, respectively. Liquid paraffin 128-04375 (produced by Wako Pure Chemical Industries, Ltd.) was introduced between the liquid crystal panel and the color filter-forming substrate and the TFT-forming substrate, and the resulting liquid crystal panel was arranged on the backlight which was obtained by removing the liquid crystal panel from the liquid crystal display device (S23A350H, produced by Samsung Electronics Co., Ltd.). As to the liquid crystal display device, using a measuring machine, EZContrast XL88 (produced by ELDIM S.A.), brightness in the front direction (in the normal direction to the display surface) in white display was measured (the result was referred to as Y). A state where voltage was not applied to the liquid crystal panel was used as the white display. Then, brightness of the backlight alone obtained by removing the liquid crystal panel from the liquid crystal display device was measured (the result was referred to as Y0), and using a ratio of these values, the front white brightness was evaluated according the criteria shown below. In Examples 90 to 93, 98 to 101 and 106 to 109, the light diffusion film was arranged on the color filter-forming substrate (on the viewing side), and the evaluation was conducted in the same manner.

4: $4.0\% \leq Y/Y0$
3: $3.0\% \leq Y/Y0 < 4.0\%$
2: $2.0\% \leq Y/Y0 < 3.0\%$
1: $1.0\% \leq Y/Y0 < 2.0\%$ (Gradation Inversion)

Each of the liquid crystal panels produced in Examples 86 to 109 and Comparative Examples 9 to 12 was arranged on the backlight which was obtained by removing the liquid crystal panel from the liquid crystal display device (S23A350H, produced by Samsung Electronics Co., Ltd.), and a state where voltage was not applied to the liquid crystal panel (voltage=0(V)) was set as white display (L7) and a state where voltage of 6 (V) was applied to the liquid crystal panel (voltage=6(V)) was set as black display (L0). The voltages applied to the liquid crystal cell for forming from gradation L1 to gradation L6 (6 gradations) were set such that the front brightness in the white display was equally divided (for example, the front brightness of gradation L1 was set to ⅐ of that of gradation L7).

Gradation L0 to L7 (8 gradations) was displayed on the liquid crystal panel arranged on the backlight and visually observed from a downward direction (a polar angle of 30°) in a dark room to evaluate the gradation inversion of the displayed image.
5: Gradation inversion in the downward direction is not observed.
4: Gradation inversion in the downward direction is hardly observed.
3: Gradation inversion in the downward direction is somewhat observed.
2: Gradation inversion in the downward direction is observed.
1: Gradation inversion in the downward direction is greatly observed.
(Evaluation of Actual Image: Difference in Gradation Reproducibility and Tint Between Front Image and Oblique Image)

Gradation L0 to L7 (8 gradations) was displayed on each of the liquid crystal panels produced in Examples 86 to 109 and Comparative Examples 9 to 12 and arranged on the backlight which was obtained by removing the liquid crystal panel from the liquid crystal display device (S23A350H, produced by Samsung Electronics Co., Ltd.) and visually observed from the front and from an oblique direction (a polar angle of 45° and an optional azimuth angle) in a dark room to evaluate symmetry of the displayed image.
5: Difference in gradation and tint is hardly recognized even when viewed from any azimuth angles.
4: Difference in gradation and tint is very small even when viewed from any azimuth angles.
3: Difference in gradation and tint is small even when viewed from any azimuth angles.
2: Difference in gradation and tint occurs when viewed from a specific azimuth angle.
1: Difference in gradation and tint is large when viewed from a specific azimuth angle.

The results obtained by conducting the evaluation described above are shown in Table 15.

Although the absorption axis of Polarizing plate 1 was set to 90° and the absorption axis of Polarizing plate 2 was set to 0° in the examples described above, similar effects are obtained when the absorption axis of Polarizing plate 1 is set to 0° and the absorption axis of Polarizing plate 2 is set to 90°

Example 110

(Production of Optical Compensation Film and Polarizing Plate)
The optical compensation film and the polarizing plate were produced in the same manner as in Example 11.
(Production of TN Mode Liquid Crystal Display Device)
A pair of polarizing plates provided in a liquid crystal display device (S23A350H, produced by Samsung Electronics Co., Ltd.) using a TN type liquid crystal cell was peeled off, and instead thereof two sheets of the polarizing plates described above were selected and stuck through an adhesive on the viewer side and the backlight side, respectively.
(Production of Backlight)
A diffusion sheet was arranged on the outermost surface of a backlight (backlight unit of S23A350H). The haze of the diffusion sheet used was 80%.
Using the backlight, a TN mode liquid crystal display device having the constitution described in Table 16 below was produced.
The directivity of the liquid crystal display device was evaluated using a measuring machine, EZContrast XL88 (produced by ELDIM S.A.). The brightness (Y) in the front direction (in the normal direction to the display surface) and brightnesses (Y ($\Phi$, 45)) at a polar angle of 45° and an azimuth angle varied from 0 to 315° in increments of 45° were measured in white display, and a brightness ratio (Y ($\Phi$, 45)/Y) of the front direction and the polar angle of 45° was calculated. Herein, $\Phi$ represents an azimuth angle. The average value of the brightness ratios was 0.34. The average value of the brightnesses (Y ($\Phi$, 45)) at a polar angle of 45° was 83 (cd/m$^2$).

Example 111

(Production of Optical Compensation Film and Polarizing Plate)
The optical compensation film and the polarizing plate were produced in the same manner as in the example above.
(Production of TN Mode Liquid Crystal Display Device)
A pair of polarizing plates provided in a liquid crystal display device (S23A350H, produced by Samsung Electronics Co., Ltd.) using a TN type liquid crystal cell was peeled off, and instead thereof two sheets of the polarizing plates described above were selected and stuck through an adhesive on the viewer side and the backlight side, respectively.
(Production of Backlight)
Two sheets of brightness enhancement films (BEFRP2-115, produced by 3M Co.) were arranged such that their prisms were orthogonal to each other underneath the diffusion sheet of the backlight (backlight unit of S23A350H).
Using the backlight, a TN mode liquid crystal display device having the constitution described in Table 16 below was produced.
The directivity of the liquid crystal display device was evaluated using a measuring machine, EZContrast XL88 (produced by ELDIM S.A.). The brightness (Y) in the front direction (in the normal direction to the display surface) and brightnesses (Y ($\Phi$, 45)) at a polar angle of 45° and an azimuth angle varied from 0 to 315° in increments of 45° were measured in white display, and a brightness ratio (Y ($\Phi$, 45)/Y) of the front direction and the polar angle of 45° was calculated. Herein, $\Phi$ represents an azimuth angle. The average value of the brightness ratios was 0.17. The average value of the brightnesses (Y ($\Phi$, 45)) at a polar angle of 45° was 48 (cd/m$^2$).

Comparative Example 13

(Production of Optical Compensation Film and Polarizing Plate)
The optical compensation film and the polarizing plate were produced in the same manner as in Comparative Example 1.
(Production of TN Mode Liquid Crystal Display Device)
A pair of polarizing plates provided in a liquid crystal display device (S23A350H, produced by Samsung Electronics Co., Ltd.) using a TN type liquid crystal cell was peeled off, and instead thereof two sheets of the polarizing plates described above were selected and stuck through an adhesive on the viewer side and the backlight side, respectively.
(Production of Backlight)
A diffusion sheet was arranged on the outermost surface of a backlight (backlight unit of S23A350H). The haze of the diffusion sheet used was 80%.
Using the backlight, a TN mode liquid crystal display device having the constitution described in Table 16 below was produced.
The directivity of the liquid crystal display device was evaluated using a measuring machine, EZContrast XL88 (produced by ELDIM S.A.). The brightness (Y) in the front direction (in the normal direction to the display surface) and brightnesses (Y ($\Phi$, 45)) at a polar angle of 45° and an azimuth angle varied from 0 to 315° in increments of 45° were measured in white display, and a brightness ratio (Y ($\Phi$, 45)/Y) of the front direction and the polar angle of 45° was calculated. Herein, $\Phi$ represents an azimuth angle. The average value of the brightness ratios was 0.3. The average value of the brightnesses (Y ($\Phi$, 45)) at a polar angle of 45° was 80 (cd/m$^2$).

Comparative Example 14

(Production of Optical Compensation Film and Polarizing Plate)

The optical compensation film and the polarizing plate were produced in the same manner as in Comparative Example 1.

(Production of TN Mode Liquid Crystal Display Device)

A pair of polarizing plates provided in a liquid crystal display device (S23A350H, produced by Samsung Electronics Co., Ltd.) using a TN type liquid crystal cell was peeled off, and instead thereof two sheets of the polarizing plates described above were selected and stuck through an adhesive on the viewer side and the backlight side, respectively.

(Production of Backlight)

Two sheets of brightness enhancement films (BEFRP2-115, produced by 3M Co.) were arranged such that their prisms were orthogonal to each other underneath the diffusion sheet of the backlight (backlight unit of S23A350H).

Using the backlight, a TN mode liquid crystal display device having the constitution described in Table 16 below was produced.

The directivity of the liquid crystal display device was evaluated using a measuring machine, EZContrast XL88 (produced by ELDIM S.A.). The brightness (Y) in the front direction (in the normal direction to the display surface) and brightnesses (Y ($\Phi$, 45)) at a polar angle of 45° and an azimuth angle varied from 0 to 315° in increments of 45° were measured in white display, and a brightness ratio (Y ($\Phi$, 45)/Y) of the front direction and the polar angle of 45° was calculated. Herein, $\Phi$ represents an azimuth angle. The average value of the brightness ratios was 0.15. The average value of the brightnesses (Y ($\Phi$, 45)) at a polar angle of 45° was 45 (cd/m$^2$).

Example 112

A liquid crystal display device was produced in the same manner as in Examples 110 except for changing the optical compensation film to the optical compensation film described in Example 29.

The average value of the brightness ratios (Y ($\Phi$, 45)/Y) was 0.34. The average value of the brightnesses (Y ($\Phi$, 45)) at a polar angle of 45° was 84 (cd/m$^2$).

Example 113

A liquid crystal display device was produced in the same manner as in Examples 110 except for changing the optical compensation film to the optical compensation film described in Example 29.

The average value of the brightness ratios (Y ($\Phi$, 45)/Y) was 0.17. The average value of the brightnesses (Y ($\Phi$, 45)) at a polar angle of 45° was 48 (cd/m$^2$).

Example 114

A liquid crystal display device was produced in the same manner as in Examples 110 except for changing the optical compensation film to the optical compensation film described in Example 29.

The average value of the brightness ratios (Y ($\Phi$, 45)/Y) was 0.34. The average value of the brightnesses (Y ($\Phi$, 45)) at a polar angle of 45° was 83 (cd/m$^2$).

Example 115

A liquid crystal display device was produced in the same manner as in Examples 110 except for changing the optical compensation film to the optical compensation film described in Example 29.

The average value of the brightness ratios (Y ($\Phi$, 45)/Y) was 0.17. The average value of the brightnesses (Y ($\Phi$, 45)) at a polar angle of 45° was 47 (cd/m$^2$).

Evaluation of Liquid Crystal Display Device (Evaluation of Front White Brightness)

As to each of the liquid crystal display devices produced above, using a measuring machine, EZContrast XL88 (produced by ELDIM S.A.), brightness in the front direction (in the normal direction to the display surface) in white display was measured (the result was referred to as Y) and then, brightness of the backlight alone obtained by removing the liquid crystal panel from the liquid crystal display device was measured (the result was referred to as Y0), and using a ratio of these values, the front white brightness was evaluated according the criteria shown below.

4: 4.0%≤Y/Y0
3: 3.0%≤Y/Y0<4.0%
2: 2.0%≤Y/Y0<3.0%
1: 1.0%≤Y/Y0<2.0%

(Gradation Inversion)

On each of the liquid crystal display devices produced above, an image of ISO 12640-1:1997, Standard number JIS X 9201:1995, Image name: Portrait was displayed, and the image was visually observed from a downward direction (a polar angle of 30°) in a dark room to evaluate the gradation inversion of the displayed image.

5: Gradation inversion in the downward direction is not observed.
4: Gradation inversion in the downward direction is hardly observed.
3: Gradation inversion in the downward direction is somewhat observed.
2: Gradation inversion in the downward direction is observed.
1: Gradation inversion in the downward direction is greatly observed.

(Evaluation of Actual Image: Difference in Gradation Reproducibility and Tint Between Front Image and Oblique Image)

On each of the liquid crystal display devices produced above, an image of ISO 12640-1:1997, Standard number JIS X 9201:1995, Image name: Portrait was displayed, and the image was visually observed from the front and from an oblique direction (a polar angle of 45° and an optional azimuth angle) in a dark room to evaluate symmetry of the displayed image.

5: Difference in gradation and tint is hardly recognized even when viewed from any azimuth angles.
4: Difference in gradation and tint is very small even when viewed from any azimuth angles.
3: Difference in gradation and tint is small even when viewed from any azimuth angles.
2: Difference in gradation and tint occurs when viewed from a specific azimuth angle.
1: Difference in gradation and tint is large when viewed from a specific azimuth angle.

(Evaluation of Visibility Under Light Environment)

On each of the liquid crystal display devices produced above, an image of ISO 12640-1:1997, Standard number JIS X 9201:1995, Image name: Portrait was displayed, and the image was visually observed from m an oblique direction (a polar angle of 45° and an azimuth angle varied from 0 to 315° in increments of 45°) under light environment to evaluate visibility of the displayed image.

The evaluation of visibility was performed under the conditions described below.

The screen of the liquid crystal display device was placed so as to be horizontal to the floor.

A light diffusion sheet (white paper) was arranged on the wall (in front of the liquid crystal display device) vertical to the floor.

Light of a light source (fluorescent lamp) was emitted to the light diffusion sheet such that the reflected light might uniformly illuminate the screen of the liquid crystal display device. The illuminance on the screen of the liquid crystal display device was measured using a measuring machine, a digital illuminometer IM-3 (produced by Topcon Corp.). An average value of the illuminances measured at the four corners and the center of 200 mm square area was 500 (lx) and the error to the average value was within 3%.

The displayed image of the liquid crystal display device was observed from a position opposite to the light diffusion sheet. The observation distance was 500 mm from the center of the displayed image.

5: The displayed image was bright and easily visible in all azimuths.

4: Although influence of the surface-reflected light on the screen was recognized, the displayed image was easily visible in all azimuths.

3: Although degradation of the visibility due to the surface-reflected light on the screen was recognized, the displayed image could be visible in all azimuths.

2: The displayed image was hard to visible in specific one azimuth due to the surface-reflected light on the screen and/or degradation of brightness of image or change in gradation relative to other azimuths.

1: The displayed image was hard to visible in plural azimuths due to the surface-reflected light on the screen and/or degradation of brightness of image or change in gradation relative to other azimuths.

The results of the evaluation on the display performance of each of the liquid crystal display device produced above are shown in Table 17.

Example 116

(Production of Optical Compensation Film and Polarizing Plate)

An optical compensation film and a polarizing plate were produced in the same manner as in Example 11 except for changing the values of the slow axes of the transparent support and the optically anisotropic layer and the azimuth of the absorption axis of the polarizing plate to those shown in Table 18.

(Production of Liquid Crystal Cell)

A twisted alignment mode liquid crystal cell having a twist angle of 90° and Δnd (550) at a wavelength of 550 nm of 400 nm was prepared. Oriented films formed on inner surfaces of substrates were subjected to a rubbing treatment in directions of +45° and −45°, respectively, taking the right direction of the liquid crystal cell as 0°. As a liquid crystal material, ZL1-4792 (produced by Merck and Co., Inc.) was used.

(Production of TN Mode Liquid Crystal Display Device)

The respective polarizing plates each having the optical compensation film produced above were stuck on the up and down sides of the liquid crystal cell to produce a liquid crystal panel. The surface of the optically anisotropic layer of the polarizing plate and the surface of the liquid crystal cell were stuck.

Examples 117 to 122

(Production of Optical Compensation Film and Polarizing Plate)

An optical compensation film and a polarizing plate were produced in the same manner as in Example 11 except for changing the values of the slow axes of the transparent support and the optically anisotropic layer and the azimuth of the absorption axis of the polarizing plate to those shown in Table 18.

(Production of Liquid Crystal Cell)

Using the optical compensation film described above, a liquid crystal panel was produced in the same manner as in Example 116 except for changing the liquid crystal cell such that the twist angle, the rubbing direction and the Δnd (550) at a wavelength of 550 nm were set to the values shown in Table 18.

Comparative Examples 15 to 16

(Production of Optical Compensation Film and Polarizing Plate)

An optical compensation film and a polarizing plate were produced in the same manner as in Comparative Example 1 except for changing the values of the slow axes of the transparent support and the optically anisotropic layer and the azimuth of the absorption axis of the polarizing plate to those shown in Table 18.

(Production of Liquid Crystal Cell)

Using the optical compensation film described above, a liquid crystal panel was produced in the same manner as in Example 116 except for changing the liquid crystal cell such that the twist angle, the rubbing direction and the Δnd (550) at a wavelength of 550 nm were set to the values shown in Table 18.

Examples 123 to 129

(Production of Optical Compensation Film and Polarizing Plate)

An optical compensation film and a polarizing plate were produced in the same manner as in Example 29 except for changing the values of the slow axes of the transparent support and the optically anisotropic layer and the azimuth of the absorption axis of the polarizing plate to those shown in Table 19.

(Production of Liquid Crystal Cell)

Using the optical compensation film described above, a liquid crystal panel was produced in the same manner as in Example 116 except for changing the liquid crystal cell such that the twist angle, the rubbing direction and the Δnd (550) at a wavelength of 550 nm were set to the values shown in Table 19.

Examples 130 to 136

(Production of Optical Compensation Film and Polarizing Plate)

An optical compensation film and a polarizing plate were produced in the same manner as in Example 19 except for changing the values of the slow axes of the transparent support and the optically anisotropic layer and the azimuth of the absorption axis of the polarizing plate to those shown in Table 19.

(Production of Liquid Crystal Cell)

Using the optical compensation film described above, a liquid crystal panel was produced in the same manner as in Example 116 except for changing the liquid crystal cell such that the twist angle, the rubbing direction and the Δnd (550) at a wavelength of 550 nm were set to the values shown in Table 19.

(Evaluation of Display Performance)

The results of the evaluation on the display performance of each of the liquid crystal display device produced above are shown in Table 19.

Example 137

(Production of Optical Compensation Film and Polarizing Plate)

An optical compensation film and a polarizing plate were produced in the same manner as in Example 11 except for changing the values of the slow axes of the transparent support and the optically anisotropic layer and the azimuth of the absorption axis of the polarizing plate to those shown in Table 20.

(Production of Liquid Crystal Cell)

A twisted alignment mode liquid crystal cell having a twist angle of 70° and Δnd (550) at a wavelength of 550 nm of 400 nm was prepared. Oriented films formed on inner surfaces of substrates were subjected to a rubbing treatment in directions of +55° and −55°, respectively, taking the right direction of the liquid crystal cell as 0°. As a liquid crystal material, ZL1-4792 (produced by Merck and Co., Inc.) was used.

(Production of TN Mode Liquid Crystal Display Device)

The respective polarizing plates each having the optical compensation film produced above were stuck on the up and down sides of the liquid crystal cell to produce a liquid crystal panel. The surface of the optically anisotropic layer of the polarizing plate and the surface of the liquid crystal cell were stuck.

Example 138 and Comparative Examples 19 to 20

(Production of Optical Compensation Film and Polarizing Plate)

An optical compensation film and a polarizing plate were produced in the same manner as in Example 11 except for changing the values of the slow axes of the transparent support and the optically anisotropic layer and the azimuth of the absorption axis of the polarizing plate to those shown in Table 20.

(Production of Liquid Crystal Cell)

Using the optical compensation film described above, a liquid crystal panel was produced in the same manner as in Example 137 except for changing the liquid crystal cell such that the twist angle, the rubbing direction and the Δnd (550) at a wavelength of 550 nm were set to the values shown in Table 20.

Comparative Examples 17 to 20

(Production of Optical Compensation Film and Polarizing Plate)

An optical compensation film and a polarizing plate were produced in the same manner as in comparative Example 1 except for changing the values of the slow axes of the transparent support and the optically anisotropic layer and the azimuth of the absorption axis of the polarizing plate to those shown in Table 20.

(Production of Liquid Crystal Cell)

Using the optical compensation film described above, a liquid crystal panel was produced in the same manner as in Example 137 except for changing the liquid crystal cell such that the twist angle, the rubbing direction and the Δnd (550) at a wavelength of 550 nm were set to the values shown in Table 20.

Example 139 to 140 and Comparative Examples 21 to 22

(Production of Optical Compensation Film and Polarizing Plate)

An optical compensation film and a polarizing plate were produced in the same manner as in Example 29 except for changing the values of the slow axes of the transparent support and the optically anisotropic layer and the azimuth of the absorption axis of the polarizing plate to those shown in Table 21.

(Production of Liquid Crystal Cell)

Using the optical compensation film described above, a liquid crystal panel was produced in the same manner as in Example 137 except for changing the liquid crystal cell such that the twist angle, the rubbing direction and the Δnd (550) at a wavelength of 550 nm were set to the values shown in Table 21.

Example 141 to 142 and Comparative Examples 23 to 24

(Production of Optical Compensation Film and Polarizing Plate)

An optical compensation film and a polarizing plate were produced in the same manner as in Example 19 except for changing the values of the slow axes of the transparent support and the optically anisotropic layer and the azimuth of the absorption axis of the polarizing plate to those shown in Table 21.

(Production of Liquid Crystal Cell)

Using the optical compensation film described above, a liquid crystal panel was produced in the same manner as in Example 137 except for changing the liquid crystal cell such that the twist angle, the rubbing direction and the Δnd (550) at a wavelength of 550 nm were set to the values shown in Table 21.

The results obtained by conducting the evaluation described above as to Examples 137 to 142 and Comparative Examples 17 to 18 are shown in Table 21. As to Examples 87, 95, 103 and 137 to 142 and Comparative Examples 10 and 17 to 18, the front brightness in black display was measured using a measuring machine, EZContrast XL88 (produced by ELDIM S.A.). It can be found that in Comparative Examples 17 to 18, the front brightness in the black display is twice or more that in Comparative Example 10 (and Examples 87, 95, 103 and 137 to 144) and the increase in the front black brightness is large to deteriorate the display performance.

Although the absorption axis of Polarizing plate 1 was set to 90° and the absorption axis of Polarizing plate 2 was set to 0° in the examples described above, similar effects are obtained when the absorption axis of Polarizing plate 1 is set to 0° and the absorption axis of Polarizing plate 2 is set to 90°

TABLE 6

| Layer Constitution | | | | Example 1 | Example 2 | Example 3 | Example 4 | Example 5 | Example 6 |
|---|---|---|---|---|---|---|---|---|---|
| | Polarizing Plate 1 | | Absorption Axis | 90 | 90 | 90 | 90 | 90 | 90 |
| | Optical Compensation Film 1 | Transparent Support 1 | Slow Axis | 45 | 45 | 45 | 45 | 45 | 45 |
| | | | Re (550)/Rth (550) | 9/90 | 35/97 | 35/97 | 50/46 | 50/46 | 35/97 |
| | | Optically Anisotropic Layer 1 | Slow Axis | 135 | 135 | 135 | 135 | 135 | 135 |
| | | | Re (550) | 50 | 32 | 35 | 46 | 49 | 35 |
| | | | R [−40]/R [+40] | 4.2 | 8.8 | 12.5 | 4.8 | 4.1 | 12.5 |
| | | Sum of Re of Transparent Support 1 and Optically Anisotropic Layer 1 | | 41 | −3 | 0 | −4 | −1 | 0 |
| | | Stack Order of Transparent Support 1/Liquid Crystal Compound-Containing Cured Layer 1 | | A | A | A | A | A | B |

TABLE 6-continued

| | | | | | | | | |
|---|---|---|---|---|---|---|---|---|
| | Liquid Crystal Cell | Rubbing Direction (Side Adjacent to Polarizing Plate 1) | 45 | 45 | 45 | 45 | 45 | 45 |
| | Optical Compensation Film 2 | Transparent Support 2 | Slow Axis | 135 | 135 | 135 | 135 | 135 | 135 |
| | | | Re (550)/Rth (550) | 9/90 | 35/97 | 35/97 | 50/46 | 50/46 | 35/97 |
| | | Optically Anisotropic Layer 2 | Slow Axis | 45 | 45 | 45 | 45 | 45 | 45 |
| | | | Re (550) | 50 | 32 | 35 | 46 | 49 | 35 |
| | | | R [−40]/R [+40] | 4.2 | 8.8 | 12.5 | 4.8 | 4.1 | 12.5 |
| | | Stack Order of Transparent Support 2/Liquid Crystal Compound-Containing Cured Layer 2 | | A | A | A | A | A | B |
| | | Sum of Re of Transparent Support 2 and Optically Anisotropic Layer 2 | | 41 | −3 | 0 | −4 | −1 | 0 |
| | Polarizing Plate 2 | Absorption Axis | | 0 | 0 | 0 | 0 | 0 | 0 |
| Thickness of Transparent Support 1, 2 (μm) | | | | 80 | 50 | 50 | 74 | 74 | 50 |
| Surface Film: Kind | | | | Absent | Absent | Absent | Absent | Absent | Absent |
| Surface Film: Haze | | | | — | — | — | — | — | — |
| Display Performance | Evaluation Item | Front Brightness | | 3 | 4 | 4 | 4 | 4 | 4 |
| | | Gradation Inversion | | 3 | 3 | 3 | 3 | 3 | 3 |
| | | Evaluation of Oblique Actual Image | | 2 | 3 | 4 | 3 | 4 | 4 |

| | | | | Example 7 | Example 8 | Comparative Example 1 | Comparative Example 2 | Comparative Example 3 |
|---|---|---|---|---|---|---|---|---|
| Layer Constitution | Polarizing Plate 1 | Absorption Axis | | 90 | 90 | 45 | 90 | 45 |
| | Optical Compensation Film 1 | Transparent Support 1 | Slow Axis | 45 | 45 | 45 | — | 45 |
| | | | Re (550)/Rth (550) | 35/97 | 35/97 | 9/90 | — | 9/90 |
| | | Optically Anisotropic Layer 1 | Slow Axis | 135 | 135 | 135 | 135 | 135 |
| | | | Re (550) | 35 | 35 | 50 | 50 | 50 |
| | | | R [−40]/R [+40] | 12.5 | 12.5 | 4.2 | 4.2 | 4.2 |
| | | Sum of Re of Transparent Support 1 and Optically Anisotropic Layer 1 | | 0 | 0 | — | 41 | — |
| | | Stack Order of Transparent Support 1/Liquid Crystal Compound-Containing Cured Layer 1 | | A | A | A | A | A |
| | Liquid Crystal Cell | Rubbing Direction (Side Adjacent to Polarizing Plate 1) | | 45 | 45 | 45 | 45 | 45 |
| | Optical Compensation Film 2 | Transparent Support 2 | Slow Axis | 135 | 135 | 135 | — | 135 |
| | | | Re (550)/Rth (550) | 35/97 | 35/97 | 9/90 | — | 9/90 |
| | | Optically Anisotropic Layer 2 | Slow Axis | 45 | 45 | 45 | 45 | 45 |
| | | | Re (550) | 35 | 35 | 50 | 50 | 50 |
| | | | R [−40]/R [+40] | 12.5 | 12.5 | 4.2 | 4.2 | 4.2 |
| | | Stack Order of Transparent Support 2/Liquid Crystal Compound-Containing Cured Layer 2 | | A | A | A | A | A |
| | | Sum of Re of Transparent Support 2 and Optically Anisotropic Layer 2 | | 0 | 0 | — | 41 | — |
| | Polarizing Plate 2 | Absorption Axis | | 0 | 0 | 135 | 0 | 135 |
| Thickness of Transparent Support 1, 2 (μm) | | | | 50 | 50 | 80 | — | 80 |
| Surface Film: Kind | | | | Present (isotropy) | Present (isotropy) | Absent | Absent | Present (isotropy) |
| Surface Film: Haze | | | | 58% | 58% | — | — | 58% |
| Display Performance | Evaluation Item | Front Brightness | | 4 | 4 | 4 | 3 | 4 |
| | | Gradation Inversion | | 4 | 4 | 2 | 3 | 2 |
| | | Evaluation of Oblique Actual Image | | 4 | 4 | 2 | 1 | 2 |

*Stack Order of Transparent Support/Liquid Crystal Compound-Containing Cured Layer
A: The transparent support is stacked adjacent to the polarizing plate.
B: The transparent support is stacked adjacent to the liquid crystal cell.

TABLE 7

|  |  |  |  | Example 9 | Example 10 | Example 11 | Example 12 | Example 13 | Example 14 | Example 15 | Comparative Example 4 |
|---|---|---|---|---|---|---|---|---|---|---|---|
| Layer Constitution | Polarizing Plate 1 |  | Absorption Axis | 90 | 90 | 90 | 90 | 90 | 90 | 90 | 45 |
|  | Optical Compensation Film 1 | Transparent Support 1 | Slow Axis | 45 | 45 | 45 | 45 | 45 | 45 | 45 | 45 |
|  |  |  | Re (550)/Rth (550) | 35/97 | 50/120 | 50/120 | 35/97 | 35/97 | 50/120 | 50/120 | 9/90 |
|  |  | Optically Anisotropic Layer 1 | Slow Axis | 135 | 135 | 135 | 135 | 135 | 135 | 135 | 135 |
|  |  |  | Re (550) | 13 | 13 | 25 | 13 | 13 | 25 | 25 | 50 |
|  |  |  | R [−40]/R [+40] | 16.1 | 16.1 | 11 | 16.1 | 16.1 | 11 | 11 | 4.2 |
|  |  | Sum of Re of Transparent Support 1 and Optically Anisotropic Layer 1 |  | −22 | −37 | −25 | −22 | −22 | −25 | −25 | — |
|  |  | Stack Order of Transparent Support 1/Liquid Crystal Compound-Containing Cured Layer 1 |  | A | A | A | A | A | A | A | A |
|  | Liquid Crystal Cell |  | Rubbing Direction (Side Adjacent to Polarizing Plate 1) | 45 | 45 | 45 | 45 | 45 | 45 | 45 | 45 |
|  | Optical Compensation Film 2 | Transparent Support 2 | Slow Axis | 135 | 135 | 135 | 135 | 135 | 135 | 135 | 135 |
|  |  |  | Re (550)/Rth (550) | 35/97 | 50/120 | 50/120 | 35/97 | 35/97 | 50/120 | 50/120 | 9/90 |
|  |  | Optically Anisotropic Layer 2 | Slow Axis | 45 | 45 | 45 | 45 | 45 | 45 | 45 | 45 |
|  |  |  | Re (550) | 13 | 13 | 25 | 13 | 13 | 25 | 25 | 50 |
|  |  |  | R [−40]/R [+40] | 16.1 | 16.1 | 11 | 16.1 | 16.1 | 11 | 11 | 4.2 |
|  |  | Stack Order of Transparent Support 2/Liquid Crystal Compound-Containing Cured Layer 2 |  | A | A | A | A | A | A | A | A |
|  |  | Sum of Re of Transparent Support 2 and Optically Anisotropic Layer 2 |  | −22 | −37 | −25 | −22 | −22 | −25 | −25 | — |
|  | Polarizing Plate 2 |  | Absorption Axis | 0 | 0 | 0 | 0 | 0 | 0 | 0 | 135 |
| Thickness of Transparent Support 1, 2 (μm) |  |  |  | 50 | 60 | 60 | 50 | 50 | 60 | 60 | 80 |
| Surface Film: Kind |  |  |  | Absent | Absent | Absent | Absent | Absent | Present (isotropy) | Present (anisotropy) | Present (isotropy) |
| Surface Film: Haze |  |  |  | — | — | — | — | — | 27 | 15 | 27 |
| Display Performance | Evaluation Item | Front Brightness |  | 4 | 4 | 4 | 4 | 4 | 4 | 4 | 4 |
|  |  | Gradation Inversion |  | 3 | 3 | 3 | 3 | 3 | 4 | 5 | 2 |
|  |  | Evaluation of Oblique Actual Image |  | 4 | 4 | 4 | 4 | 4 | 4 | 4 | 2 |

TABLE 8

|  |  |  |  | Example 16 | Example 17 | Example 18 | Example 19 | Example 20 | Example 21 |
|---|---|---|---|---|---|---|---|---|---|
| Layer Constitution | Polarizing Rate 1 |  | Absorption Axis | 90 | 90 | 90 | 90 | 90 | 90 |
|  | Optical Compensation Film 1 | Transparent Support 1 | Slow Axis | 90 | 90 | 90 | 90 | 90 | 90 |
|  |  |  | Re (550)/Rth (550) | 9/90 | 7/45 | 1/40 | 9/90 | 7/45 | 1/40 |
|  |  | Optically Anisotropic Layer A | Slow Axis | 45 | 45 | 45 | 45 | 45 | 45 |
|  |  |  | Re (550) | 51 | 51 | 42 | 52 | 52 | 39 |
|  |  | Optically Anisotropic Layer 1 | Slow Axis | 135 | 135 | 135 | 135 | 135 | 135 |
|  |  |  | Re (550) | 25 | 25 | 13 | 25 | 25 | 13 |
|  |  |  | R [−40]/R [+40] | 11 | 11 | 16.1 | 11 | 11 | 16.1 |
|  |  | Sum of Re of Optically Anisotropic Layer A and Optically Anisotropic Layer 1 |  | −26 | −26 | −29 | −27 | −27 | −26 |
|  |  | Stack Order of Transparent Support 1/Optically Anisotropic Layer 1/Optically Anisotropic Layer A (*) |  | A2 | A2 | A2 | A2 | A2 | A2 |
|  | Liquid Crystal Cell |  | Rubbing Direction (Side Adjacent to Polarizing Plate 1) | 45 | 45 | 45 | 45 | 45 | 45 |
|  | Optical Compensation Film 2 | Transparent Support 2 | Slow Axis | 0 | 0 | 0 | 0 | 0 | 0 |
|  |  |  | Re (550)/Rth (550) | 9/90 | 7/45 | 1/40 | 9/90 | 7/45 | 1/40 |
|  |  | Optically Anisotropic Layer B | Slow Axis | 135 | 135 | 135 | 135 | 135 | 135 |
|  |  |  | Re (550) | 51 | 51 | 42 | 52 | 52 | 39 |

TABLE 8-continued

| | | | | | | | | | |
|---|---|---|---|---|---|---|---|---|---|
| | | Optically Anisotropic Layer 2 | Slow Axis | 45 | 45 | 45 | 45 | 45 | 45 |
| | | | Re (550) | 25 | 25 | 13 | 25 | 25 | 13 |
| | | | R [−40]/R [+40] | 11 | 11 | 16.1 | 11 | 11 | 16.1 |
| | | Stack Order of Transparent Support 2/Optically Anisotropic Layer 2/Optically Anisotropic Layer B (*) | | A2 | A2 | A2 | A2 | A2 | A2 |
| | | Sum of Re of Optically Anisotropic Layer B and Optically Anisotropic Layer 2 | | −26 | −26 | −29 | −27 | −27 | −26 |
| | Polarizing Plate 2 | Absorption Axis | | 0 | 0 | 0 | 0 | 0 | 0 |
| Thickness of Transparent Support 1, 2 (μm) | | | | 80 | 40 | 40 | 80 | 40 | 40 |
| Surface Film: Kind | | | | Absent | Absent | Absent | Absent | Absent | Absent |
| Surface Film: Haze | | | | — | — | — | — | — | — |
| Display Performance | Evaluation Item | Front Brightness | | 4 | 4 | 4 | 4 | 4 | 4 |
| | | Gradation Inversion | | 3 | 3 | 3 | 3 | 3 | 3 |
| | | Evaluation of Oblique Actual Image | | 4 | 4 | 4 | 4 | 4 | 4 |

| | | | | | Example 22 | Example 23 | Example 24 | Example 25 |
|---|---|---|---|---|---|---|---|---|
| Layer Constitution | Polarizing Rate 1 | | Absorption Axis | | 90 | 90 | 90 | 90 |
| | Optical Compensation Film 1 | Transparent Support 1 | Slow Axis | | 90 | 90 | 90 | 90 |
| | | | Re (550)/Rth (550) | | 9/90 | 9/90 | 9/90 | 9/90 |
| | | Optically Anisotropic Layer A | Slow Axis | | 45 | 45 | 45 | 45 |
| | | | Re (550) | | 51 | 51 | 52 | 52 |
| | | Optically Anisotropic Layer 1 | Slow Axis | | 135 | 135 | 135 | 135 |
| | | | Re (550) | | 25 | 25 | 25 | 25 |
| | | | R [−40]/R [+40] | | 11 | 11 | 11 | 11 |
| | | Sum of Re of Optically Anisotropic Layer A and Optically Anisotropic Layer 1 | | | −26 | −26 | −27 | −27 |
| | | Stack Order of Transparent Support 1/Optically Anisotropic Layer 1/Optically Anisotropic Layer A (*) | | | A2 | A2 | A2 | A2 |
| | Liquid Crystal Cell | | Rubbing Direction (Side Adjacent to Polarizing Plate 1) | | 45 | 45 | 45 | 45 |
| | Optical Compensation Film 2 | Transparent Support 2 | Slow Axis | | 0 | 0 | 0 | 0 |
| | | | Re (550)/Rth (550) | | 9/90 | 9/90 | 9/90 | 9/90 |
| | | Optically Anisotropic Layer B | Slow Axis | | 135 | 135 | 135 | 135 |
| | | | Re (550) | | 51 | 51 | 52 | 52 |
| | | Optically Anisotropic Layer 2 | Slow Axis | | 45 | 45 | 45 | 45 |
| | | | Re (550) | | 25 | 25 | 25 | 25 |
| | | | R [−40]/R [+40] | | 11 | 11 | 11 | 11 |
| | | Stack Order of Transparent Support 2/Optically Anisotropic Layer 2/Optically Anisotropic Layer B (*) | | | A2 | A2 | A2 | A2 |
| | | Sum of Re of Optically Anisotropic Layer B and Optically Anisotropic Layer 2 | | | −26 | −26 | −27 | −27 |
| | Polarizing Plate 2 | | Absorption Axis | | 0 | 0 | 0 | 0 |
| Thickness of Transparent Support 1, 2 (μm) | | | | | 80 | 80 | 80 | 80 |
| Surface Film: Kind | | | | | Present (isotropy) | Present (anisotropy) | Present (isotropy) | Present (anisotropy) |
| Surface Film: Haze | | | | | 27 | 15 | 27 | 15 |
| Display Performance | Evaluation Item | Front Brightness | | | 4 | 4 | 4 | 4 |
| | | Gradation Inversion | | | 4 | 5 | 4 | 5 |
| | | Evaluation of Oblique Actual Image | | | 4 | 4 | 4 | 4 |

(*) Stack Order of Transparent Support/Liquid Crystal Compound-Containing Cured Layer/Optically Anisotropic Layer A (or B)

A2: Stacking in order of Polarizing Plate/Transparent Support/Optically Anisotropic Layer A (or B)/Liquid Crystal Compound-Containing Cured Layer B2: Stacking in order of Polarizing Plate/Transparent Support/Liquid Crystal Compound-Containing Cured Layer/Optically Anisotropic Layer A (or B)

TABLE 9

| | | | | Example 27 | Example 28 | Example 29 | Example 30 | Example 31 | Example 32 | Example 33 | Example 34 | Example 35 |
|---|---|---|---|---|---|---|---|---|---|---|---|---|
| Layer Constitution | Polarizing Plate 1 | | Absorption Axis | 90 | 90 | 90 | 90 | 90 | 90 | 90 | 90 | 45 |
| | Optical Compensation Film 1 | Transparent Support 1 | Slow Axis | 90 | 90 | 90 | — | 90 | 90 | 90 | 90 | 90 |
| | | | Re (550)/Rth (550) | 6/−1 | 3/−10 | 1/−5 | 0/0 | 1/24 | 1/26 | 1/22 | 50/120 | 80/60 |
| | | Optically Anisotropic Layer A | Slow Axis | 45 | 45 | 45 | 45 | 45 | 45 | 45 | 45 | 45 |
| | | | Re (550) | 51 | 51 | 51 | 51 | 51 | 51 | 51 | 51 | 51 |
| | | Optically Anisotropic Layer 1 | Slow Axis | 135 | 135 | 135 | 135 | 135 | 135 | 135 | 135 | 135 |
| | | | Re (550) | 26 | 26 | 26 | 26 | 26 | 26 | 26 | 26 | 26 |
| | | | R [−40]/R [+40] | 16.7 | 16.7 | 16.7 | 16.7 | 16.7 | 16.7 | 16.7 | 16.7 | 16.7 |
| | | Sum of Re of Optically Anisotropic Layer A and Optically Anisotropic Layer 1 | | −25 | −25 | −25 | −25 | −25 | −25 | −25 | −25 | −25 |
| | | Stack Order of Transparent Support 1/Optically Anisotropic Layer 1/Optically Anisotropic Layer A (*) | | A2 | A2 | A2 | A2 | A2 | A2 | A2 | A2 | A2 |
| | Liquid Crystal Cell | | Rubbing Direction (Side Adjacent to Polarizing Plate 1) | 45 | 45 | 45 | 45 | 45 | 45 | 45 | 45 | 45 |
| | Optical Compensation Film 2 | Transparent Support 2 | Slow Axis | 0 | 0 | 0 | — | 0 | 0 | 0 | 0 | 0 |
| | | | Re (550)/Rth (550) | 6/−1 | 3/−10 | 1/−5 | 0/0 | 1/24 | 1/26 | 1/22 | 50/120 | 80/60 |
| | | Optically Anisotropic Layer B | Slow Axis | 135 | 135 | 135 | 135 | 135 | 135 | 135 | 135 | 135 |
| | | | Re (550) | 51 | 51 | 51 | 51 | 51 | 51 | 51 | 51 | 51 |
| | | Optically Anisotropic Layer 2 | Slow Axis | 45 | 45 | 45 | 45 | 45 | 45 | 45 | 45 | 45 |
| | | | Re (550) | 26 | 26 | 26 | 26 | 26 | 26 | 26 | 26 | 26 |
| | | | R [−40]/R [+40] | 16.7 | 16.7 | 16.7 | 16.7 | 16.7 | 16.7 | 16.7 | 16.7 | 16.7 |
| | | Stack Order of Transparent Support 2/Optically Anisotropic Layer 2/Optically Anisotropic Layer B (*) | | A2 | A2 | A2 | A2 | A2 | A2 | A2 | A2 | A2 |
| | | Sum of Re of Optically Anisotropic Layer B and Optically Anisotropic Layer 2 | | −25 | −25 | −25 | −25 | −25 | −25 | −25 | −25 | −25 |
| | Polarizing Plate 2 | | Absorption Axis | 0 | 0 | 0 | — | 0 | 0 | 0 | 0 | 0 |
| Thickness of Transparent Support 1, 2 (μm) | | | | 40 | 40 | 40 | 20 | 25 | 25 | 25 | 60 | 80 |
| Surface Film: Kind | | | | Absent | Absent | Absent | Absent | Absent | Absent | Absent | Absent | Absent |
| Surface Film: Haze | | | | — | — | — | — | — | — | — | — | — |
| Display Performance | Evaluation Item | Front Brightness | | 4 | 4 | 4 | 4 | 4 | 4 | 4 | 4 | 4 |
| | | Gradation Inversion | | 3 | 3 | 3 | 3 | 3 | 3 | 3 | 3 | 3 |
| | | Evaluation of Oblique Actual Image | | 4 | 4 | 4 | 4 | 4 | 4 | 4 | 4 | 4 |

| | | | | Example 36 | Example 37 | Example 38 | Example 39 | Example 40 | Example 41 |
|---|---|---|---|---|---|---|---|---|---|
| Layer Constitution | Polarizing Plate 1 | | Absorption Axis | 90 | 90 | 90 | 90 | 90 | 90 |
| | Optical Compensation Film 1 | Transparent Support 1 | Slow Axis | 90 | 90 | 90 | 90 | 90 | 90 |
| | | | Re (550)/Rth (550) | 1/−5 | 1/−5 | 2/3 | 2/2 | 1/1 | 7/28 |
| | | Optically Anisotropic Layer A | Slow Axis | 45 | 45 | 45 | 45 | 45 | 45 |
| | | | Re (550) | 15 | 75 | 51 | 51 | 51 | 51 |
| | | Optically Anisotropic Layer 1 | Slow Axis | 135 | 135 | 135 | 135 | 135 | 135 |
| | | | Re (550) | 26 | 26 | 26 | 26 | 26 | 26 |
| | | | R [−40]/R [+40] | 16.7 | 16.7 | 16.7 | 16.7 | 16.7 | 16.7 |
| | | Sum of Re of Optically Anisotropic Layer A and Optically Anisotropic Layer 1 | | 11 | 49 | −25 | −25 | −25 | −25 |
| | | Stack Order of Transparent Support 1/Optically Anisotropic Layer 1/Optically Anisotropic Layer A (*) | | A2 | A2 | A2 | A2 | A2 | A2 |
| | Liquid Crystal Cell | | Rubbing Direction (Side Adjacent to Polarizing Plate 1) | 45 | 45 | 45 | 45 | 45 | 45 |
| | Optical Compensation Film 2 | Transparent Support 2 | Slow Axis | 0 | 0 | 0 | 0 | 0 | 0 |
| | | | Re (550)/Rth (550) | 1/−5 | 1/−5 | 2/3 | 2/2 | 1/1 | 7/28 |
| | | Optically Anisotropic Layer B | Slow Axis | 135 | 135 | 135 | 135 | 135 | 135 |
| | | | Re (550) | 15 | 75 | 51 | 51 | 51 | 51 |
| | | Optically Anisotropic Layer 2 | Slow Axis | 45 | 45 | 45 | 45 | 45 | 45 |
| | | | Re (550) | 26 | 26 | 26 | 26 | 26 | 26 |
| | | | R [−40]/R [+40] | 16.7 | 16.7 | 16.7 | 16.7 | 16.7 | 16.7 |
| | | Stack Order of Transparent Support 2/Optically Anisotropic Layer 2/Optically Anisotropic Layer B (*) | | A2 | A2 | A2 | A2 | A2 | A2 |

TABLE 9-continued

|  |  |  |  |  |  |  |  |
|---|---|---|---|---|---|---|---|
|  | Sum of Re of Optically Anisotropic Layer B and Optically Anisotropic Layer 2 | 11 | −49 | −25 | −25 | −25 | −25 |
|  | Polarizing Plate 2 — Absorption Axis | 0 | 0 | 0 | 0 | 0 | 0 |
| Thickness of Transparent Support 1, 2 (μm) |  | 40 | 40 | 60 | 50 | 30 | 80 |
| Surface Film: Kind |  | Absent | Absent | Absent | Absent | Absent | Absent |
| Surface Film: Haze |  | — | — | — | — | — | — |
| Display Performance | Evaluation Item — Front Brightness | 4 | 4 | 4 | 4 | 4 | 4 |
|  | Gradation Inversion | 3 | 3 | 3 | 3 | 3 | 3 |
|  | Evaluation of Oblique Actual Image | 4 | 4 | 4 | 4 | 4 | 4 |

(*) Stack Order of Transparent Support/Liquid Crystal Compound-Containing Cured Layer/Optically Anisotropic Layer A (or B)

A2: Stacking in order of Polarizing Plate/Transparent Support/Optically Anisotropic Layer A (or B)/Liquid Crystal Compound-Containing Cured Layer B2: Stacking in order of Polarizing Plate/Transparent Support/Liquid Crystal Compound-Containing Cured Layer/Optically Anisotropic Layer A (or B)

Slow axis: "—" indicates that the slow axis cannot be defined because Re is approximately 0 nm.

TABLE 10

|  |  |  |  | Example 42 | Example 43 | Example 44 | Example 45 | Example 46 | Example 47 | Example 48 | Example 49 | Example 50 |
|---|---|---|---|---|---|---|---|---|---|---|---|---|
| Layer Constitution | Polarizing Plate 1 |  | Absorption Axis | 90 | 90 | 90 | 90 | 90 | 90 | 90 | 90 | 90 |
|  | Optical Compensation Film 1 | Transparent Support 1 | Slow Axis | 90 | 90 | 90 | 90 | 90 | 90 | 90 | 90 | 90 |
|  |  |  | Re (550)/Rth (550) | 1/−5 | 1/−5 | 1/−5 | 1/−5 | 1/−5 | 1/−5 | 1/−5 | 1/−5 | 1/−5 |
|  |  | Optically Anisotropic Layer A | Slow Axis | 45 | 45 | 45 | 45 | 45 | 45 | 45 | 45 | 45 |
|  |  |  | Re (550) | 51 | 51 | 51 | 51 | 51 | 51 | 51 | 51 | 51 |
|  |  | Optically Anisotropic Layer 1 | Slow Axis | 135 | 135 | 135 | 135 | 135 | 135 | 135 | 135 | 135 |
|  |  |  | Re (550) | 26 | 26 | 26 | 26 | 26 | 26 | 26 | 26 | 26 |
|  |  |  | R [−40]/R [+40] | 16.7 | 16.7 | 16.7 | 16.7 | 16.7 | 16.7 | 16.7 | 16.7 | 16.7 |
|  |  | Sum of Re of Optically Anisotropic Layer A and Optically Anisotropic Layer 1 |  | −25 | −25 | −25 | −25 | −25 | −25 | −25 | −25 | −25 |
|  |  | Stack Order of Transparent Support 1/Optically Anisotropic Layer 1/Optically Anisotropic Layer A (*) |  | B2 | C2 | D2 | B2 | C2 | D2 | C2 | D2 | D2 |
|  | Liquid Crystal Cell |  | Rubbing Direction (Side Adjacent to Polarizing Plate 1) | 45 | 45 | 45 | 45 | 45 | 45 | 45 | 45 | 45 |
|  | Optical Compensation Film 2 | Transparent Support 2 | Slow Axis | 0 | 0 | 0 | 0 | 0 | 0 | 0 | 0 | 0 |
|  |  |  | Re (550)/Rth (550) | 1/−5 | 1/−5 | 1/−5 | 1/−5 | 1/−5 | 1/−5 | 1/−5 | 1/−5 | 1/−5 |
|  |  | Optically Anisotropic Layer B | Slow Axis | 135 | 135 | 135 | 135 | 135 | 135 | 135 | 135 | 135 |
|  |  |  | Re (550) | 51 | 51 | 51 | 51 | 51 | 51 | 51 | 51 | 51 |
|  |  | Optically Anisotropic Layer 2 | Slow Axis | 45 | 45 | 45 | 45 | 45 | 45 | 45 | 45 | 45 |
|  |  |  | Re (550) | 26 | 26 | 26 | 26 | 26 | 26 | 26 | 26 | 26 |
|  |  |  | R [−40]/R [+40] | 16.7 | 16.7 | 16.7 | 16.7 | 16.7 | 16.7 | 16.7 | 16.7 | 16.7 |
|  |  | Support 2/Optically Anisotropic Layer 2/Optically Anisotropic Layer B (*) |  |  |  |  |  |  |  |  |  |  |
|  |  | Sum of Re of Optically Anisotropic Layer B and Optically Anisotropic Layer 2 |  | −25 | −25 | −25 | −25 | −25 | −25 | −25 | −25 | −25 |
|  | Polarizing Plate 2 |  | Absorption Axis | 0 | 0 | 0 | 0 | 0 | 0 | 0 | 0 | 0 |
| Thickness of Transparent Support 1, 2 (μm) |  |  |  | 40 | 40 | 40 | 40 | 40 | 40 | 40 | 40 | 40 |
| Surface Film: Kind |  |  |  | Absent | Absent | Absent | Absent | Absent | Absent | Absent | Absent | Absent |
| Surface Film: Haze |  |  |  | — | — | — | — | — | — | — | — | — |
| Display Performance | Evaluation Item | Front Brightness |  | 4 | 4 | 4 | 4 | 4 | 4 | 4 | 4 | 4 |
|  |  | Gradation Inversion |  | 3 | 3 | 3 | 3 | 3 | 3 | 3 | 3 | 3 |
|  |  | Evaluation of Oblique Actual Image |  | 3 | 4 | 3 | 3 | 4 | 3 | 3 | 3 | 3 |

(*) Stack Order of Transparent Support/Liquid Crystal Compound-Containing Cured Layer/Optically Anisotropic Layer A (or B)

A2: Stacking in order of Polarizing Plate/Transparent Support/Optically Anisotropic Layer A (or B)/Liquid Crystal Compound-Containing Cured Layer B2: Stacking in order of Polarizing Plate/Transparent Support/Liquid Crystal Compound-Containing Cured Layer/Optically Anisotropic Layer A (or B)

C2: Stacking in order of Polarizing Plate/Optically Anisotropic Layer A (or B)/Liquid Crystal Compound-Containing Cured Layer/Transparent Support D2: Stacking in order of Polarizing Plate/Liquid Crystal Compound-Containing Cured Layer/Optically Anisotropic Layer A (or B)/Transparent Support

TABLE 11

| | | | | Example 51 | Example 52 | Example 53 | Example 54 | Example 55 | Example 56 | Example 57 | Example 58 | Example 59 |
|---|---|---|---|---|---|---|---|---|---|---|---|---|
| Layer Constitution | Polarizing Plate 1 | | Absorption Axis | 90 | 90 | 90 | 90 | 90 | 90 | 90 | 90 | 90 |
| | Optical Compensation Film 1 | Transparent Support 1 | Slow Axis | 45 | 45 | 45 | 45 | 45 | 45 | 45 | 45 | 45 |
| | | | Re (550)/Rth (550) | 50/120 | 50/120 | 50/120 | 50/120 | 50/120 | 50/120 | 50/120 | 50/120 | 50/120 |
| | | Optically Anisotropic Layer 1 | Slow Axis | 140 | 130 | 150 | 120 | 125 | 150 | 120 | 150 | 120 |
| | | | Re (550) | 25 | 25 | 25 | 25 | 25 | 25 | 25 | 25 | 25 |
| | | | R [−40]/R [+40] | 11 | 11 | 11 | 11 | 11 | 11 | 11 | 11 | 11 |
| | | | Sum of Re of Transparent Support 1 and Optically Anisotropic Layer 1 | −25 | −25 | −25 | −25 | −25 | −25 | −25 | −25 | −25 |
| | | | Stack Order of Transparent Support 1/Liquid Crystal Compound-Containing Cured Layer 1 | A | A | A | A | A | A | A | A | A |
| | Liquid Crystal Cell | | Rubbing Direction (Side Adjacent to Polarizing Plate 1) | 45 | 45 | 45 | 45 | 45 | 45 | 45 | 45 | 45 |
| | Optical Compensation Film 2 | Transparent Support 2 | Slow Axis | 135 | 135 | 135 | 135 | 135 | 135 | 135 | 135 | 135 |
| | | | Re (550)/Rth (550) | 50/120 | 50/120 | 50/120 | 50/120 | 50/120 | 50/120 | 50/120 | 50/120 | 50/120 |
| | | Optically Anisotropic Layer 2 | Slow Axis | 40 | 50 | 30 | 60 | 60 | 30 | 60 | 30 | 60 |
| | | | Re (550) | 25 | 25 | 25 | 25 | 25 | 25 | 25 | 25 | 25 |
| | | | R [−40]/R [+40] | 11 | 11 | 11 | 11 | 11 | 11 | 11 | 11 | 11 |
| | | | Stack Order of Transparent Support 2/Liquid Crystal Compound-Containing Cured Layer 2 | A | A | A | A | A | A | A | A | A |
| | | | Sum of Re of Transparent Support 2 and Optically Anisotropic Layer 2 | −25 | −25 | −25 | −25 | −25 | −25 | −25 | −25 | −25 |
| | Polarizing Plate 2 | | Absorption Axis | 0 | 0 | 0 | 0 | 0 | 0 | 0 | 0 | 0 |
| Thickness of Transparent Support 1, 2 (μm) | | | | 60 | 60 | 60 | 60 | 60 | 60 | 60 | 60 | 60 |
| Surface Film: Kind | | | | Absent | Absent | Absent | Absent | Absent | Present (isotropy) | Present (isotropy) | Present (anisotropy) | Present (anisotropy) |
| Surface Film: Haze | | | | — | — | — | — | — | 27% | 27% | 15% | 15% |
| Display Performance | Evaluation Item | Front Brightness | | 4 | 4 | 4 | 4 | 4 | 4 | 4 | 4 | 4 |
| | | Gradation Inversion | | 3 | 3 | 3 | 3 | 3 | 4 | 4 | 5 | 5 |
| | | Evaluation of Oblique Actual Image | | 4 | 4 | 4 | 4 | 4 | 4 | 4 | 4 | 4 |

| | | | | Comparative Example 5 | Comparative Example 6 | Comparative Example 7 | Comparative Example 8 |
|---|---|---|---|---|---|---|---|
| Layer Constitution | Polarizing Plate 1 | | Absorption Axis | 45 | 45 | 45 | 45 |
| | Optical Compensation Film 1 | Transparent Support 1 | Slow Axis | 45 | 45 | 45 | 45 |
| | | | Re (550)/Rth (550) | 9/90 | 9/90 | 9/90 | 9/90 |
| | | Optically Anisotropic Layer 1 | Slow Axis | 140 | 130 | 150 | 120 |
| | | | Re (550) | 50 | 50 | 50 | 50 |
| | | | R [−40]/R [+40] | 4.2 | 4.2 | 4.2 | 4.2 |
| | | | Sum of Re of Transparent Support 1 and Optically Anisotropic Layer 1 | — | — | — | — |
| | | | Stack Order of Transparent Support 1/Liquid Crystal Compound-Containing Cured Layer 1 | A | A | A | A |
| | Liquid Crystal Cell | | Rubbing Direction (Side Adjacent to Polarizing Plate 1) | 45 | 45 | 45 | 45 |
| | Optical Compensation Film 2 | Transparent Support 2 | Slow Axis | 135 | 135 | 135 | 135 |
| | | | Re (550)/Rth (550) | 9/90 | 9/90 | 9/90 | 9/90 |
| | | Optically Anisotropic Layer 2 | Slow Axis | 40 | 50 | 30 | 60 |
| | | | Re (550) | 50 | 50 | 50 | 50 |
| | | | R [−40]/R [+40] | 4.2 | 4.2 | 4.2 | 4.2 |
| | | | Stack Order of Transparent Support 2/Liquid Crystal Compound-Containing Cured Layer 2 | A | A | A | A |
| | | | Sum of Re of Transparent Support 2 and Optically Anisotropic Layer 2 | — | — | — | — |
| | Polarizing Plate 2 | | Absorption Axis | 135 | 135 | 135 | 135 |
| Thickness of Transparent Support 1, 2 (μm) | | | | 80 | 80 | 80 | 80 |
| Surface Film: Kind | | | | Absent | Absent | Absent | Absent |
| Surface Film: Haze | | | | — | — | — | — |
| Display Performance | Evaluation Item | Front Brightness | | 4 | 4 | 4 | 4 |
| | | Gradation Inversion | | 2 | 2 | 2 | 2 |
| | | Evaluation of Oblique Actual Image | | 2 | 2 | 1 | 1 |

*Stack Order of Transparent Support/Liquid Crystal Compound-Containing Cured Layer
A: The transparent support is stacked adjacent to the polarizing plate.
B: The transparent support is stacked adjacent to the liquid crystal cell.

TABLE 12

|  |  |  |  | Example 60 | Example 61 | Example 62 | Example 63 | Example 64 | Example 65 | Example 66 |
|---|---|---|---|---|---|---|---|---|---|---|
| Layer Constitution | Polarizing Plate 1 |  | Absorption Axis | 90 | 90 | 90 | 90 | 90 | 90 | 90 |
|  | Optical Compensation Film 1 | Transparent Support 1 | Slow Axis | 90 | 90 | 90 | 90 | 90 | 90 | 90 |
|  |  |  | Re (550)/Rth (550) | 1/−5 | 1/−5 | 1/−5 | 1/−5 | 1/−5 | 1/−5 | 1/−5 |
|  |  | Optically Anisotropic Layer A | Slow Axis | 45 | 45 | 45 | 45 | 45 | 40 | 50 |
|  |  |  | Re (550) | 51 | 51 | 51 | 51 | 51 | 51 | 51 |
|  |  | Optically Anisotropic Layer 1 | Slow Axis | 140 | 130 | 150 | 120 | 125 | 140 | 140 |
|  |  |  | Re (550) | 26 | 26 | 26 | 26 | 26 | 26 | 26 |
|  |  |  | R [−40]/R [+40] | 16.7 | 16.7 | 16.7 | 16.7 | 16.7 | 16.7 | 16.7 |
|  |  | Sum of Re of Optically Anisotropic Layer A and Optically Anisotropic Layer 1 |  | −25 | −25 | −25 | −25 | −25 | −25 | −25 |
|  |  | Stack Order of Transparent Support 1/Optically Anisotropic Layer 1/Optically Anisotropic Layer A (*) |  | A2 | A2 | A2 | A2 | A2 | A2 | A2 |
|  | Liquid Crystal Cell |  | Rubbing Direction (Side Adjacent to Polarizing Plate 1) | 45 | 45 | 45 | 45 | 45 | 45 | 45 |
|  | Optical Compensation Film 2 | Transparent Support 2 | Slow Axis | 0 | 0 | 0 | 0 | 0 | 0 | 0 |
|  |  |  | Re (550)/Rth (550) | 1/−5 | 1/−5 | 1/−5 | 1/−5 | 1/−5 | 1/−5 | 1/−5 |
|  |  | Optically Anisotropic Layer B | Slow Axis | 135 | 135 | 135 | 135 | 135 | 140 | 130 |
|  |  |  | Re (550) | 51 | 51 | 51 | 51 | 51 | 51 | 51 |
|  |  | Optically Anisotropic Layer 2 | Slow Axis | 40 | 50 | 30 | 60 | 60 | 40 | 40 |
|  |  |  | Re (550) | 26 | 26 | 26 | 26 | 26 | 26 | 26 |
|  |  |  | R [−40]/R [+40] | 16.7 | 16.7 | 16.7 | 16.7 | 16.7 | 16.7 | 16.7 |
|  |  | Stack Order of Transparent Support 2/Optically Anisotropic Layer 2/Optically Anisotropic Layer B (*) |  | A2 | A2 | A2 | A2 | A2 | A2 | A2 |
|  |  | Sum of Re of Optically Anisotropic Layer B and Optically Anisotropic Layer 2 |  | −25 | −25 | −25 | −25 | −25 | −25 | −25 |
|  | Polarizing Plate 2 |  | Absorption Axis | 0 | 0 | 0 | 0 | 0 | 0 | 0 |
| Thickness of Transparent Support 1, 2 (μm) |  |  |  | 40 | 40 | 40 | 40 | 40 | 40 | 40 |
| Surface Film: Kind |  |  |  | Absent | Absent | Absent | Absent | Absent | Absent | Absent |
| Surface Film: Haze |  |  |  | — | — | — | — | — | — | — |
| Display Performance | Evaluation Item | Front Brightness |  | 4 | 4 | 4 | 4 | 4 | 4 | 4 |
|  |  | Gradation Inversion |  | 3 | 3 | 3 | 3 | 3 | 3 | 3 |
|  |  | Evaluation of Oblique Actual Image |  | 4 | 4 | 4 | 4 | 4 | 4 | 4 |

|  |  |  |  | Example 67 | Example 68 | Example 69 | Example 70 | Example 71 | Example 72 |
|---|---|---|---|---|---|---|---|---|---|
| Layer Constitution | Polarizing Plate 1 |  | Absorption Axis | 90 | 90 | 90 | 90 | 90 | 90 |
|  | Optical Compensation Film 1 | Transparent Support 1 | Slow Axis | 90 | 90 | 90 | 90 | 90 | 90 |
|  |  |  | Re (550)/Rth (550) | 1/−5 | 1/−5 | 1/−5 | 1/−5 | 1/−5 | 1/−5 |
|  |  | Optically Anisotropic Layer A | Slow Axis | 40 | 50 | 45 | 45 | 45 | 45 |
|  |  |  | Re (550) | 51 | 51 | 51 | 51 | 51 | 51 |
|  |  | Optically Anisotropic Layer 1 | Slow Axis | 130 | 130 | 150 | 120 | 150 | 120 |
|  |  |  | Re (550) | 26 | 26 | 26 | 26 | 26 | 26 |
|  |  |  | R [−40]/R [+40] | 16.7 | 16.7 | 16.7 | 16.7 | 16.7 | 16.7 |
|  |  | Sum of Re of Optically Anisotropic Layer A and Optically Anisotropic Layer 1 |  | −25 | −25 | −25 | −25 | −25 | −25 |
|  |  | Stack Order of Transparent Support 1/Optically Anisotropic Layer 1/Optically Anisotropic Layer A (*) |  | A2 | A2 | A2 | A2 | A2 | A2 |
|  | Liquid Crystal Cell |  | Rubbing Direction (Side Adjacent to Polarizing Plate 1) | 45 | 45 | 45 | 45 | 45 | 45 |
|  | Optical Compensation Film 2 | Transparent Support 2 | Slow Axis | 0 | 0 | 0 | 0 | 0 | 0 |
|  |  |  | Re (550)/Rth (550) | 1/−5 | 1/−5 | 1/−5 | 1/−5 | 1/−5 | 1/−5 |
|  |  | Optically Anisotropic Layer B | Slow Axis | 140 | 130 | 135 | 135 | 135 | 135 |
|  |  |  | Re (550) | 51 | 51 | 51 | 51 | 51 | 51 |
|  |  | Optically Anisotropic Layer 2 | Slow Axis | 50 | 50 | 30 | 60 | 30 | 60 |
|  |  |  | Re (550) | 26 | 26 | 26 | 26 | 26 | 26 |
|  |  |  | R [−40]/R [+40] | 16.7 | 16.7 | 16.7 | 16.7 | 16.7 | 16.7 |
|  |  | Stack Order of Transparent Support 2/Optically Anisotropic Layer 2/Optically Anisotropic Layer B (*) |  | A2 | A2 | A2 | A2 | A2 | A2 |

TABLE 12-continued

|  |  |  |  |  |  |  |  |  |
|---|---|---|---|---|---|---|---|---|
|  |  | Sum of Re of Optically Anisotropic Layer B and Optically Anisotropic Layer 2 | −25 | −25 | −25 | −25 | −25 | −25 |
|  | Polarizing Plate 2 | Absorption Axis | 0 | 0 | 0 | 0 | 0 | 0 |
| Thickness of Transparent Support 1, 2 (μm) |  |  | 40 | 40 | 40 | 40 | 40 | 40 |
| Surface Film: Kind |  |  | Absent | Absent | Present (isotropy) | Present (isotropy) | Present (anisotropy) | Present (anisotropy) |
| Surface Film: Haze |  |  | — | — | 27% | 27% | 15% | 15% |
| Display Performance | Evaluation Item | Front Brightness | 4 | 4 | 4 | 4 | 4 | 4 |
|  |  | Gradation Inversion | 3 | 3 | 4 | 4 | 5 | 5 |
|  |  | Evaluation of Oblique Actual Image | 4 | 4 | 4 | 4 | 4 | 4 |

(*) Stack Order of Transparent Support/Liquid Crystal Compound-Containing Cured Layer/Optically Anisotropic Layer A (or B)

A2: Stacking in order of Polarizing Plate/Transparent Support/Optically Anisotropic Layer A (or B)/Liquid Crystal Compound-Containing Cured Layer B2: Stacking in order of Polarizing Plate/Transparent Support/Liquid Crystal Compound-Containing Cured Layer/Optically Anisotropic Layer A (or B)

TABLE 13

|  |  |  |  | Example 73 | Example 74 | Example 75 | Example 76 | Example 77 | Example 78 | Example 79 |
|---|---|---|---|---|---|---|---|---|---|---|
| Layer Constitution | Polarizing Plate 1 |  | Absorption Axis | 90 | 90 | 90 | 90 | 90 | 90 | 90 |
|  | Optical Compensation Film 1 | Transparent Support 1 | Slow Axis | 90 | 90 | 90 | 90 | 90 | 90 | 90 |
|  |  |  | Re (550)/Rth (550) | 9/90 | 9/90 | 9/90 | 9/90 | 9/90 | 9/90 | 9/90 |
|  |  | Optically Anisotropic Layer A | Slow Axis | 45 | 45 | 45 | 45 | 45 | 40 | 50 |
|  |  |  | Re (550) | 52 | 52 | 52 | 52 | 52 | 52 | 52 |
|  |  | Optically Anisotropic Layer 1 | Slow Axis | 140 | 130 | 150 | 120 | 125 | 140 | 140 |
|  |  |  | Re (550) | 25 | 25 | 25 | 25 | 25 | 25 | 25 |
|  |  |  | R [−40]/R [+40] | 11 | 11 | 11 | 11 | 11 | 11 | 11 |
|  |  | Sum of Re of Optically Anisotropic Layer A and Optically Anisotropic Layer 1 |  | −27 | −27 | −27 | −27 | −27 | −27 | −27 |
|  |  | Stack Order of Transparent Support 1/Optically Anisotropic Layer 1/Optically Anisotropic Layer A (*) |  | A2 | A2 | A2 | A2 | A2 | A2 | A2 |
|  | Liquid Crystal Cell |  | Rubbing Direction (Side Adjacent to Polarizing Plate 1) | 45 | 45 | 45 | 45 | 45 | 45 | 45 |
|  | Optical Compensation Film 2 | Transparent Support 2 | Slow Axis | 0 | 0 | 0 | 0 | 0 | 0 | 0 |
|  |  |  | Re (550)/Rth (550) | 9/90 | 9/90 | 9/90 | 9/90 | 9/90 | 9/90 | 9/90 |
|  |  | Optically Anisotropic Layer B | Slow Axis | 135 | 135 | 135 | 135 | 135 | 140 | 130 |
|  |  |  | Re (550) | 52 | 52 | 52 | 52 | 52 | 52 | 52 |
|  |  | Optically Anisotropic Layer 2 | Slow Axis | 40 | 50 | 30 | 60 | 60 | 40 | 40 |
|  |  |  | Re (550) | 25 | 25 | 25 | 25 | 25 | 25 | 25 |
|  |  |  | R [−40]/R [+40] | 11 | 11 | 11 | 11 | 11 | 11 | 11 |
|  |  | Stack Order of Transparent Support 2/Optically Anisotropic Layer 2/Optically Anisotropic Layer B (*) |  | A2 | A2 | A2 | A2 | A2 | A2 | A2 |
|  |  | Sum of Re of Optically Anisotropic Layer B and Optically Anisotropic Layer 2 |  | −27 | −27 | −27 | −27 | −27 | −27 | −27 |
|  | Polarizing Plate 2 |  | Absorption Axis | 0 | 0 | 0 | 0 | 0 | 0 | 0 |
| Thickness of Transparent Support 1, 2 (μm) |  |  |  | 80 | 80 | 80 | 80 | 80 | 80 | 80 |
| Surface Film: Kind |  |  |  | Absent | Absent | Absent | Absent | Absent | Absent | Absent |
| Surface Film: Haze |  |  |  | — | — | — | — | — | — | — |
| Display Performance | Evaluation Item | Front Brightness |  | 4 | 4 | 4 | 4 | 4 | 4 | 4 |
|  |  | Gradation Inversion |  | 3 | 3 | 3 | 3 | 3 | 3 | 3 |
|  |  | Evaluation of Oblique Actual Image |  | 4 | 4 | 4 | 4 | 4 | 4 | 4 |

|  |  |  |  | Example 80 | Example 81 | Example 82 | Example 83 | Example 84 | Example 85 |
|---|---|---|---|---|---|---|---|---|---|
| Layer Constitution | Polarizing Plate 1 |  | Absorption Axis | 90 | 90 | 90 | 90 | 90 | 90 |
|  | Optical Compensation Film 1 | Transparent Support 1 | Slow Axis | 90 | 90 | 90 | 90 | 90 | 90 |
|  |  |  | Re (550)/Rth (550) | 9/90 | 9/90 | 9/90 | 9/90 | 9/90 | 9/90 |
|  |  | Optically Anisotropic Layer A | Slow Axis | 40 | 50 | 45 | 45 | 45 | 45 |
|  |  |  | Re (550) | 52 | 52 | 52 | 52 | 52 | 52 |

TABLE 13-continued

|  |  |  |  |  |  |  |  |  |
|---|---|---|---|---|---|---|---|---|
|  |  | Optically Anisotropic Layer 1 | Slow Axis | 130 | 130 | 150 | 120 | 150 | 120 |
|  |  |  | Re (550) | 25 | 25 | 25 | 25 | 25 | 25 |
|  |  |  | R [−40]/R [+40] | 11 | 11 | 11 | 11 | 11 | 11 |
|  |  | Sum of Re of Optically Anisotropic Layer A and Optically Anisotropic Layer 1 |  | −27 | −27 | −27 | −27 | −27 | −27 |
|  |  | Stack Order of Transparent Support 1/Optically Anisotropic Layer 1/Optically Anisotropic Layer A (*) |  | A2 | A2 | A2 | A2 | A2 | A2 |
|  | Liquid Crystal Cell | Rubbing Direction (Side Adjacent to Polarizing Plate 1) |  | 45 | 45 | 45 | 45 | 45 | 45 |
|  | Optical Compensation Film 2 | Transparent Support 2 | Slow Axis | 0 | 0 | 0 | 0 | 0 | 0 |
|  |  |  | Re (550)/Rth (550) | 9/90 | 9/90 | 9/90 | 9/90 | 9/90 | 9/90 |
|  |  | Optically Anisotropic Layer B | Slow Axis | 140 | 130 | 135 | 135 | 135 | 135 |
|  |  |  | Re (550) | 52 | 52 | 52 | 52 | 52 | 52 |
|  |  | Optically Anisotropic Layer 2 | Slow Axis | 50 | 50 | 30 | 60 | 30 | 60 |
|  |  |  | Re (550) | 25 | 25 | 25 | 25 | 25 | 25 |
|  |  |  | R [−40]/R [+40] | 11 | 11 | 11 | 11 | 11 | 11 |
|  |  | Stack Order of Transparent Support 2/Optically Anisotropic Layer 2/Optically Anisotropic Layer B (*) |  | A2 | A2 | A2 | A2 | A2 | A2 |
|  |  | Sum of Re of Optically Anisotropic Layer B and Optically Anisotropic Layer 2 |  | −27 | −27 | −27 | −27 | −27 | −27 |
|  | Polarizing Plate 2 | Absorption Axis |  | 0 | 0 | 0 | 0 | 0 | 0 |
| Thickness of Transparent Support 1, 2 (μm) |  |  |  | 80 | 80 | 80 | 80 | 80 | 80 |
| Surface Film: Kind |  |  |  | Absent | Absent | Present (isotropy) | Present (isotropy) | Present (anisotropy) | Present (anisotropy) |
| Surface Film: Haze |  |  |  | — | — | 27% | 27% | 15% | 15% |
| Display Performance | Evaluation Item | Front Brightness |  | 4 | 4 | 4 | 4 | 4 | 4 |
|  |  | Gradation Inversion |  | 3 | 3 | 4 | 4 | 5 | 5 |
|  |  | Evaluation of Oblique Actual Image |  | 4 | 4 | 4 | 4 | 4 | 4 |

(*) Stack Order of Transparent Support/Liquid Crystal Compound-Containing Cured Layer/Optically Anisotropic Layer A (or B)
A2: Stacking in order of Polarizing Plate/Transparent Support/Optically Anisotropic Layer A (or B)/Liquid Crystal Compound-Containing Cured Layer
B2: Stacking in order of Polarizing Plate/Transparent Support/Liquid Crystal Compound-Containing Cured Layer/Optically Anisotropic Layer A (or B)

TABLE 14

|  |  |  |  | Example 86 | Example 87 | Example 88 | Example 89 | Example 90 | Example 91 | Example 92 |
|---|---|---|---|---|---|---|---|---|---|---|
| Layer Constitution | Polarizing Plate 1 | Absorption Axis |  | 90 | 90 | 90 | 90 | 90 | 90 | 90 |
|  | Optical Compensation Film 1 | Transparent Support 1 | Slow Axis | 45 | 45 | 45 | 45 | 45 | 45 | 45 |
|  |  |  | Re (550)/Rth (550) | 50/120 | 50/120 | 50/120 | 50/120 | 50/120 | 50/120 | 50/120 |
|  |  | Optically Anisotropic Layer 1 | Slow Axis | 135 | 135 | 135 | 135 | 135 | 135 | 135 |
|  |  |  | Re (550) | 25 | 25 | 25 | 25 | 25 | 25 | 25 |
|  |  |  | R [−40]/R [+40] | 11 | 11 | 11 | 11 | 11 | 11 | 11 |
|  |  | Sum of Re of Transparent Support 1 and Optically Anisotropic Layer 1 |  | −25 | −25 | −25 | −25 | −25 | −25 | −25 |
|  |  | Stack Order of Transparent Support 1/Liquid Crystal Compound-Containing Cured Layer 1 |  | A | A | A | A | A | A | A |
|  | Liquid Crystal Cell | Rubbing Direction (Side Adjacent to Polarizing Plate 1) |  | 45 | 45 | 45 | 45 | 45 | 45 | 45 |
|  |  | Δnd (550) |  | 350 | 400 | 450 | 500 | 400 | 400 | 450 |
|  | Optical Compensation Film 2 | Transparent Support 2 | Slow Axis | 135 | 135 | 135 | 135 | 135 | 135 | 135 |
|  |  |  | Re (550)/Rth (550) | 50/120 | 50/120 | 50/120 | 50/120 | 50/120 | 50/120 | 50/120 |
|  |  | Optically Anisotropic Layer 2 | Slow Axis | 45 | 45 | 45 | 45 | 45 | 45 | 45 |
|  |  |  | Re (550) | 25 | 25 | 25 | 25 | 25 | 25 | 25 |
|  |  |  | R [−40]/R [+40] | 11 | 11 | 11 | 11 | 11 | 11 | 11 |
|  |  | Stack Order of Transparent Support 2/Liquid Crystal Compound-Containing Cured Layer 2 |  | A | A | A | A | A | A | A |
|  |  | Sum of Re of Transparent Support 2 and Optically Anisotropic Layer 2 |  | −25 | −25 | −25 | −25 | −25 | −25 | −25 |
|  | Polarizing Plate 2 | Absorption Axis |  | 0 | 0 | 0 | 0 | 0 | 0 | 0 |
| Thickness of Transparent Support 1, 2 (μm) |  |  |  | 60 | 60 | 60 | 60 | 60 | 60 | 60 |
| Surface Film: Kind |  |  |  | Absent | Absent | Absent | Absent | Present (isotropy) | Present (anisotropy) | Present (isotropy) |

TABLE 14-continued

| | | | | | | | | | 27% | 15% | 27% |
|---|---|---|---|---|---|---|---|---|---|---|---|
| Surface Film: Haze | | | | — | — | — | — | 27% | 15% | 27% |
| Display Perfor- mance | Evaluation Item | Front Brightness | | 4 | 4 | 4 | 4 | 4 | 4 | 4 |
| | | Gradation Inversion | | 3 | 3 | 3 | 3 | 4 | 5 | 4 |
| | | Evaluation of Oblique Actual Image | | 4 | 4 | 4 | 3 | 4 | 4 | 4 |

| | | | | Example 93 | Comparative Example 9 | Comparative Example 10 | Comparative Example 11 | Comparative Example 12 |
|---|---|---|---|---|---|---|---|---|
| Layer Consti- tution | Polarizing Plate 1 | | Absorption Axis | 90 | 45 | 45 | 45 | 45 |
| | Optical Compen- sation Film 1 | Transparent Support 1 | Slow Axis | 45 | 45 | 45 | 45 | 45 |
| | | | Re (550)/Rth (550) | 50/120 | 9/90 | 9/90 | 9/90 | 9/90 |
| | | Optically Anisotropic Layer 1 | Slow Axis | 135 | 135 | 135 | 135 | 135 |
| | | | Re (550) | 25 | 50 | 50 | 50 | 50 |
| | | | R [−40]/R [+40] | 11 | 4.2 | 4.2 | 4.2 | 4.2 |
| | | | Sum of Re of Transparent Support 1 and Optically Anisotropic Layer 1 | −25 | — | — | — | — |
| | | | Stack Order of Transparent Support 1/Liquid Crystal Compound-Containing Cured Layer 1 | A | A | A | A | A |
| | Liquid Crystal Cell | | Rubbing Direction (Side Adjacent to Polarizing Plate 1) | 45 | 45 | 45 | 45 | 45 |
| | | | Δnd (550) | 450 | 350 | 400 | 450 | 500 |
| | Optical Compen- sation Film 2 | Transparent Support 2 | Slow Axis | 135 | 135 | 135 | 135 | 135 |
| | | | Re (550)/Rth (550) | 50/120 | 9/90 | 9/90 | 9/90 | 9/90 |
| | | Optically Anisotropic Layer 2 | Slow Axis | 45 | 45 | 45 | 45 | 45 |
| | | | Re (550) | 25 | 50 | 50 | 50 | 50 |
| | | | R [−40]/R [+40] | 11 | 4.2 | 4.2 | 4.2 | 4.2 |
| | | | Stack Order of Transparent Support 2/Liquid Crystal Compound-Containing Cured Layer 2 | A | A | A | A | A |
| | | | Sum of Re of Transparent Support 2 and Optically Anisotropic Layer 2 | −25 | — | — | — | — |
| | Polarizing Plate 2 | | Absorption Axis | 0 | 135 | 135 | 135 | 135 |
| Thickness of Transparent Support 1, 2 (μm) | | | | 60 | 80 | 80 | 80 | 80 |
| Surface Film: Kind | | | | Present (aniso- tropy) | Absent | Absent | Absent | Absent |
| Surface Film: Haze | | | | 15% | — | — | — | — |
| Display Perfor- mance | Evaluation Item | Front Brightness | | 4 | 4 | 4 | 4 | 4 |
| | | Gradation Inversion | | 5 | 2 | 2 | 2 | 1 |
| | | Evaluation of Oblique Actual Image | | 4 | 2 | 2 | 2 | 1 |

*Stack Order of Transparent Support/Liquid Crystal Compound-Containing Cured Layer
A: The transparent support is stacked adjacent to the polarizing plate.
B: The transparent support is stacked adjacent to the liquid crystal cell.

TABLE 15

| | | | | Example 94 | Example 95 | Example 96 | Example 97 | Example 98 | Example 99 | Example 100 | Example 101 |
|---|---|---|---|---|---|---|---|---|---|---|---|
| Layer Consti- tution | Polarizing Plate 1 | | Absorption Axis | 90 | 90 | 90 | 90 | 90 | 90 | 90 | 90 |
| | Optical Compen- sation Film 1 | Transparent Support 1 | Slow Axis | 90 | 90 | 90 | 90 | 90 | 90 | 90 | 90 |
| | | | Re (550)/Rth (550) | 1/−5 | 1/−5 | 1/−5 | 1/−5 | 1/−5 | 1/−5 | 1/−5 | 1/−5 |
| | | Optically Anisotropic Layer A | Slow Axis | 45 | 45 | 45 | 45 | 45 | 45 | 45 | 45 |
| | | | Re (550) | 51 | 51 | 51 | 51 | 51 | 51 | 51 | 51 |
| | | Optically Anisotropic Layer 1 | Slow Axis | 135 | 135 | 135 | 135 | 135 | 135 | 135 | 135 |
| | | | Re (550) | 26 | 26 | 26 | 26 | 26 | 26 | 26 | 26 |
| | | | R [−40]/R [+40] | 16.7 | 16.7 | 16.7 | 16.7 | 16.7 | 16.7 | 16.7 | 16.7 |
| | | | Sum of Re of Optically Anisotropic Layer A and Optically Anisotropic Layer 1 | −25 | −25 | −25 | −25 | −25 | −25 | −25 | −25 |
| | | | Stack Order of Transparent Support 1/Optically Anisotropic Layer 1/Optically Anisotropic Layer A (*) | A2 | A2 | A2 | A2 | A2 | A2 | A2 | A2 |

TABLE 15-continued

| | | | | | | | | | | | |
|---|---|---|---|---|---|---|---|---|---|---|---|
| | Liquid Crystal Cell | Rubbing Direction (Side Adjacent to Polarizing Plate 1) | 45 | 45 | 45 | 45 | 45 | 45 | 45 | 45 |
| | | Δnd (550) | 350 | 400 | 450 | 500 | 400 | 400 | 450 | 450 |
| | Optical Compensation Film 2 | Transparent Support 2 | Slow Axis | 0 | 0 | 0 | 0 | 0 | 0 | 0 | 0 |
| | | | Re (550)/Rth (550) | 1/−5 | 1/−5 | 1/−5 | 1/−5 | 1/−5 | 1/−5 | 1/−6 | 1/−5 |
| | | Optically Anisotropic Layer B | Slow Axis | 135 | 135 | 135 | 135 | 135 | 135 | 135 | 135 |
| | | | Re (550) | 51 | 51 | 51 | 51 | 51 | 51 | 51 | 51 |
| | | Optically Anisotropic Layer 2 | Slow Axis | 45 | 45 | 45 | 45 | 45 | 45 | 45 | 45 |
| | | | Re (550) | 26 | 26 | 26 | 26 | 26 | 26 | 26 | 26 |
| | | | R [−40]/R [+40] | 16.7 | 16.7 | 16.7 | 16.7 | 16.7 | 16.7 | 16.7 | 16.7 |
| | | Stack Order of Transparent Support 2/Optically Anisotropic Layer 2/Optically Anisotropic Layer B (*) | | A2 | A2 | A2 | A2 | A2 | A2 | A2 | A2 |
| | | Sum of Re of Optically Anisotropic Layer B and Optically Anisotropic Layer 2 | | −25 | −25 | −25 | −25 | −25 | −25 | −25 | −25 |
| | Polarizing Plate 2 | Absorption Axis | | 0 | 0 | 0 | 0 | 0 | 0 | 0 | 0 |
| Thickness of Transparent Support 1, 2 (μm) | | | | 40 | 40 | 40 | 40 | 40 | 40 | 40 | 40 |
| Surface Film: Kind | | | | Absent | Absent | Absent | Absent | Present (iso-tropy) | Present (aniso-tropy) | Present (iso-tropy) | Present (aniso-tropy) |
| Surface Film: Haze | | | | — | — | — | — | 27% | 15% | 27% | 15% |
| Display Performance | Evaluation Item | Front Brightness | | 4 | 4 | 4 | 4 | 4 | 4 | 4 | 4 |
| | | Gradation Inversion | | 3 | 3 | 3 | 3 | 4 | 5 | 4 | 5 |
| | | Evaluation of Oblique Actual Image | | 4 | 4 | 4 | 3 | 4 | 4 | 4 | 4 |

| | | | | Example 102 | Example 103 | Example 104 | Example 105 | Example 106 | Example 107 | Example 108 | Example 109 |
|---|---|---|---|---|---|---|---|---|---|---|---|
| Layer Constitution | Polarizing Plate 1 | Absorption Axis | | 90 | 90 | 90 | 90 | 90 | 90 | 90 | 90 |
| | Optical Compensation Film 1 | Transparent Support 1 | Slow Axis | 90 | 90 | 90 | 90 | 90 | 90 | 90 | 90 |
| | | | Re (550)/Rth (550) | 9/90 | 9/90 | 9/90 | 9/90 | 9/90 | 9/90 | 9/90 | 9/90 |
| | | Optically Anisotropic Layer A | Slow Axis | 45 | 45 | 45 | 45 | 45 | 45 | 45 | 45 |
| | | | Re (550) | 52 | 52 | 52 | 52 | 52 | 52 | 52 | 52 |
| | | Optically Anisotropic Layer 1 | Slow Axis | 135 | 135 | 135 | 135 | 135 | 135 | 135 | 135 |
| | | | Re (550) | 25 | 25 | 25 | 25 | 25 | 25 | 25 | 25 |
| | | | R [−40]/R [+40] | 11 | 11 | 11 | 11 | 11 | 11 | 11 | 11 |
| | | Sum of Re of Optically Anisotropic Layer A and Optically Anisotropic Layer 1 | | −27 | −27 | −27 | −27 | −27 | −27 | −27 | −27 |
| | | Stack Order of Transparent Support 1/Optically Anisotropic Layer 1/Optically Anisotropic Layer A (*) | | A2 | A2 | A2 | A2 | A2 | A2 | A2 | A2 |
| | Liquid Crystal Cell | Rubbing Direction (Side Adjacent to Polarizing Plate 1) | | 45 | 45 | 45 | 45 | 45 | 45 | 45 | 45 |
| | | Δnd (550) | | 350 | 400 | 450 | 500 | 400 | 400 | 450 | 450 |
| | Optical Compensation Film 2 | Transparent Support 2 | Slow Axis | 0 | 0 | 0 | 0 | 0 | 0 | 0 | 0 |
| | | | Re (550)/Rth (550) | 9/90 | 9/90 | 9/90 | 9/90 | 9/90 | 9/90 | 9/90 | 9/90 |
| | | Optically Anisotropic Layer B | Slow Axis | 135 | 135 | 135 | 135 | 135 | 135 | 135 | 135 |
| | | | Re (550) | 52 | 52 | 52 | 52 | 52 | 52 | 52 | 52 |
| | | Optically Anisotropic Layer 2 | Slow Axis | 45 | 45 | 45 | 45 | 45 | 45 | 45 | 45 |
| | | | Re (550) | 25 | 25 | 25 | 25 | 25 | 25 | 25 | 25 |
| | | | R [−40]/R [+40] | 11 | 11 | 11 | 11 | 11 | 11 | 11 | 11 |
| | | Stack Order of Transparent Support 2/Optically Anisotropic Layer 2/Optically Anisotropic Layer B (*) | | A2 | A2 | A2 | A2 | A2 | A2 | A2 | A2 |
| | | Sum of Re of Optically Anisotropic Layer B and Optically Anisotropic Layer 2 | | −27 | −27 | −27 | −27 | −27 | −27 | −27 | −27 |
| | Polarizing Plate 2 | Absorption Axis | | 0 | 0 | 0 | 0 | 0 | 0 | 0 | 0 |

TABLE 15-continued

| | | | | | | | | | |
|---|---|---|---|---|---|---|---|---|---|
| Thickness of Transparent Support 1, 2 (μm) | | | 80 | 80 | 80 | 80 | 80 | 80 | 80 | 80 |
| Surface Film: Kind | | | Absent | Absent | Absent | Absent | Present (isotropy) | Present (anisotropy) | Present (isotropy) | Present (anisotropy) |
| Surface Film: Haze | | | — | — | — | — | 27% | 15% | 27% | 15% |
| Display Performance | Evaluation Item | Front Brightness | 4 | 4 | 4 | 4 | 4 | 4 | 4 | 4 |
| | | Gradation Inversion | 3 | 3 | 3 | 3 | 4 | 5 | 4 | 5 |
| | | Evaluation of Oblique Actual Image | 4 | 4 | 4 | 3 | 4 | 4 | 4 | 4 |

(*) Stack Order of Transparent Support/Liquid Crystal Compound-Containing Cured Layer/Optically Anisotropic Layer A (or B)
A2: Stacking in order of Polarizing Plate/Transparent Support/Optically Anisotropic Layer A (or B)/Liquid Crystal Compound-Containing Cured Layer
B2: Stacking in order of Polarizing Plate/Transparent Support/Liquid Crystal Compound-Containing Cured Layer/Optically Anisotropic Layer A (or B)
Slow axis: "—" indicates that the slow axis cannot be defined because Re is approximately 0 nm.

TABLE 16

| | | | | Example 110 | Example 111 | Comparative Example 13 | Comparative Example 14 |
|---|---|---|---|---|---|---|---|
| Layer Constitution | Polarizing Plate 1 | | Absorption Axis | 90 | 90 | 45 | 45 |
| | Optical Compensation Film 1 | Transparent Support 1 | Slow Axis | 45 | 45 | 45 | 45 |
| | | | Re (550)/Rth (550) | 50/120 | 50/120 | 9/90 | 9/90 |
| | | Optically Anisotropic Layer 1 | Slow Axis | 135 | 135 | 135 | 135 |
| | | | Re (550) | 25 | 25 | 50 | 50 |
| | | | R [−40]/R [+40] | 11 | 11 | 4.2 | 4.2 |
| | | | Sum of Re of Transparent Support 1 and Optically Anisotropic Layer 1 | −25 | −25 | — | — |
| | | | Stack Order of Transparent Support 1/Liquid Crystal Compound-Containing Cured Layer 1 | A | A | A | A |
| | Liquid Crystal Cell | | Rubbing Direction (Side Adjacent to Polarizing Plate 1) | 45 | 45 | 45 | 45 |
| | Optical Compensation Film 2 | Transparent Support 2 | Slow Axis | 135 | 135 | 135 | 135 |
| | | | Re (550)/Rth (550) | 50/120 | 50/120 | 9/90 | 9/90 |
| | | Optically Anisotropic Layer 2 | Slow Axis | 45 | 45 | 45 | 45 |
| | | | Re (550) | 25 | 25 | 50 | 50 |
| | | | R [−40]/R [+40] | 11 | 11 | 4.2 | 4.2 |
| | | | Stack Order of Transparent Support 2/Liquid Crystal Compound-Containing Cured Layer 2 | A | A | A | A |
| | | | Sum of Re of Transparent Support 2 and Optically Anisotropic Layer 2 | −25 | −25 | — | — |
| | Polarizing Rate 2 | | Absorption Axis | 0 | 0 | 135 | 135 |
| Directivity of Liquid Crystal Display Device (Average Value of Brightness Ratio) | | | | 0.34 | 0.17 | 0.3 | 0.15 |
| Thickness of Transparent Support 1, 2 (μm) | | | | 60 | 60 | 80 | 80 |
| Surface Film: Kind | | | | Absent | Absent | Absent | Absent |
| Surface Film: Haze | | | | — | — | — | — |
| Display Performance | Evaluation Item | Front Brightness | | 4 | 4 | 4 | 4 |
| | | Gradation Inversion | | 3 | 3 | 2 | 2 |
| | | Evaluation of Oblique Actual Image | | 4 | 4 | 2 | 2 |
| | | Evaluation of Visibility under Light Environment | | 4 | 3 | 1 | 1 |

*Stack Order of transparent Support/Liquid Crystal Compound-Containing Cured Layer
A: The transparent support is stacked adjacent to the polarizing plate.
B: The transparent support is stacked adjacent to the liquid crystal cell.

TABLE 17

| | | | Example 112 | Example 113 | Example 114 | Example 115 |
|---|---|---|---|---|---|---|
| Layer Constitution | Polarizing Plate 1 | Absorption Axis | 90 | 90 | 90 | 90 |
| | Optical Compensation Film 1 | Transparent Support 1 Slow Axis | 90 | 90 | 90 | 90 |
| | | Transparent Support 1 Re (550)/Rth (550) | 1/−5 | 1/−5 | 9/90 | 9/90 |
| | | Optically Anisotropic Layer A Slow Axis | 45 | 45 | 45 | 45 |
| | | Optically Anisotropic Layer A Re (550) | 51 | 51 | 52 | 52 |
| | | Optically Anisotropic Layer 1 Slow Axis | 135 | 135 | 135 | 135 |
| | | Optically Anisotropic Layer 1 Re (550) | 26 | 26 | 25 | 25 |
| | | Optically Anisotropic Layer 1 R [−40]/R [+40] | 16.7 | 16.7 | 11 | 11 |
| | | Sum of Re of Optically Anisotropic Layer A and Optically Anisotropic Layer 1 | −25 | −25 | −27 | −27 |
| | | Stack Order of Transparent Support 1/Optically Anisotropic Layer 1/Optically Anisotropic Layer A (*) | A2 | A2 | A2 | A2 |
| | Liquid Crystal Cell | Rubbing Direction (Side Adjacent to Polarizing Plate 1) | 45 | 45 | 45 | 45 |
| | Optical Compensation Film 2 | Transparent Support 2 Slow Axis | 0 | 0 | 0 | 0 |
| | | Transparent Support 2 Re (550)/Rth (550) | 1/−5 | 1/−5 | 9/90 | 9/90 |
| | | Optically Anisotropic Layer B Slow Axis | 135 | 135 | 135 | 135 |
| | | Optically Anisotropic Layer B Re (550) | 51 | 51 | 52 | 52 |
| | | Optically Anisotropic Layer 2 Slow Axis | 45 | 45 | 45 | 45 |
| | | Optically Anisotropic Layer 2 Re (550) | 26 | 26 | 25 | 25 |
| | | Optically Anisotropic Layer 2 R [−40]/R [+40] | 16.7 | 16.7 | 11 | 11 |
| | | Stack Order of Transparent Support 2/Optically Anisotropic Layer 2/Optically Anisotropic Layer B (*) | A2 | A2 | A2 | A2 |
| | | Sum of Re of Optically Anisotropic Layer B and Optically Anisotropic Layer 2 | −25 | −25 | −27 | −27 |
| | Polarizing Plate 2 | Absorption Axis | 0 | 0 | 0 | 0 |
| Directivity of Liquid Crystal Display Device (Average Value of Brightness Ratio) | | | 0.34 | 0.17 | 0.34 | 0.17 |
| Thickness of Transparent Support 1, 2 (μm) | | | 40 | 40 | 80 | 80 |
| Surface Film: Kind | | | Absent | Absent | Absent | Absent |
| Surface Film: Haze | | | — | — | — | — |
| Display Performance | Evaluation Item | Front Brightness | 4 | 4 | 4 | 4 |
| | | Gradation Inversion | 3 | 3 | 3 | 3 |
| | | Evaluation of Oblique Actual Image | 4 | 4 | 4 | 4 |
| | | Evaluation of Visibility under Light Environment | 4 | 3 | 4 | 3 |

(*) Stack Order of Transparent Support/Liquid Crystal Compound-Containing Cured Layer/Optically Anisotropic Layer A (or B)
A2: Stacking in order of Polarizing Plate/Transparent Support/Optically Anisotropic Layer A (or B)/Liquid Crystal Compound-Containing Cured Layer
B2: Stacking in order of Polarizing Plate/Transparent Support/Liquid Crystal Compound-Containing Cured Layer/Optically Anisotropic Layer A (or B)
Slow axis: "—" indicates that the slow axis cannot be defined because Re is approximately 0 nm.

TABLE 18

| | | | Example 116 | Example 117 | Example 118 | Example 119 | Example 120 | Example 121 | Example 122 | Comparative Example 15 | Comparative Example 16 |
|---|---|---|---|---|---|---|---|---|---|---|---|
| Layer Constitution | Polarizing Plate 1 | Absorption Axis | 0 | 0 | 0 | 345 | 90 | 90 | 105 | 45 | 45 |
| | Optical Compensation Film 1 | Transparent Support 1 Slow Axis | 45 | 45 | 45 | 30 | 45 | 45 | 60 | 45 | 45 |
| | | Transparent Support 1 Re (550)/Rth (550) | 50/120 | 50/120 | 50/120 | 50/120 | 50/120 | 50/120 | 50/120 | 9/90 | 9/90 |
| | | Optically Anisotropic Layer 1 Slow Axis | 135 | 135 | 120 | 120 | 135 | 150 | 150 | 135 | 135 |
| | | Optically Anisotropic Layer 1 Re (550) | 25 | 25 | 25 | 25 | 25 | 25 | 25 | 50 | 50 |
| | | Optically Anisotropic Layer 1 R [−40]/R [+40] | 11 | 11 | 11 | 11 | 11 | 11 | 11 | 4.2 | 4.2 |
| | | Sum of Re of Transparent Support 1 and Optically Anisotropic Layer 1 | −25 | −25 | −25 | −25 | −25 | −25 | −25 | — | — |
| | | Stack Order of Transparent Support 1/Liquid Crystal Compound-Containing Cured Layer 1 | A | A | A | A | A | A | A | A | A |

TABLE 18-continued

|  |  |  | Example 116 | Example 117 | Example 118 | Example 119 | Example 120 | Example 121 | Example 122 | Comparative Example 15 | Comparative Example 16 |
|---|---|---|---|---|---|---|---|---|---|---|---|
|  | Liquid Crystal Cell | Rubbing Direction (Side Adjacent to Polarizing Plate 1) | 45 | 30 | 30 | 30 | 60 | 60 | 60 | 30 | 60 |
|  |  | Twist Angle | 90 | 90 | 90 | 90 | 90 | 90 | 90 | 90 | 90 |
|  |  | Δnd (550) | 400 | 400 | 400 | 400 | 400 | 400 | 400 | 400 | 400 |
|  | Optical Compensation Film 2 | Transparent Support 2 Slow Axis | 135 | 135 | 135 | 120 | 135 | 135 | 150 | 135 | 135 |
|  |  | Re (550)/Rth (550) | 50/120 | 50/120 | 50/120 | 50/120 | 50/120 | 50/120 | 50/120 | 9/90 | 9/90 |
|  |  | Optically Anisotropic Layer 2 Slow Axis | 45 | 45 | 30 | 30 | 45 | 60 | 60 | 45 | 45 |
|  |  | Re (550) | 25 | 25 | 25 | 25 | 25 | 25 | 25 | 50 | 50 |
|  |  | R [−40]/R [+40] | 11 | 11 | 11 | 11 | 11 | 11 | 11 | 4.2 | 4.2 |
|  |  | Stack Order of Transparent Support 2/Liquid Crystal Compound-Containing Cured Layer 2 | A | A | A | A | A | A | A | A | A |
|  |  | Sum of Re of Transparent Support 2 and Optically Anisotropic Layer 2 | −25 | −25 | −25 | −25 | −25 | −25 | −25 | — | — |
|  | Polarizing Plate 2 | Absorption Axis | 90 | 90 | 90 | 75 | 0 | 0 | 15 | 135 | 135 |
| Thickness of Transparent Support 1, 2 (μm) |  |  | 60 | 60 | 60 | 60 | 60 | 60 | 60 | 80 | 80 |
| Surface Film: Kind |  |  | Absent | Absent | Absent | Absent | Absent | Absent | Absent | Absent | Absent |
| Surface Film: Haze |  |  | — | — | — | — | — | — | — | — | — |
| Display Performance | Evaluation Item | Front Brightness | 4 | 4 | 4 | 4 | 4 | 4 | 4 | 4 | 4 |
|  |  | Gradation Inversion | 3 | 3 | 3 | 3 | 3 | 3 | 3 | 2 | 2 |
|  |  | Evaluation of Oblique Actual Image | 4 | 3 | 3 | 4 | 3 | 3 | 4 | 1 | 1 |

*Stack Order of Transparent Support/Liquid Crystal Compound-Containing Cured Layer
A: The transparent support is stacked adjacent to the polarizing plate.
B: The transparent support is stacked adjacent to the liquid crystal cell.

TABLE 19

|  |  |  | Example 123 | Example 124 | Example 125 | Example 126 | Example 127 | Example 128 | Example 129 |
|---|---|---|---|---|---|---|---|---|---|
| Layer Constitution | Polarizing Plate 1 | Absorption Axis | 0 | 0 | 0 | 345 | 90 | 90 | 105 |
|  | Optical Compensation Film 1 | Transparent Support 1 Slow Axis | 0 | 0 | 0 | 345 | 90 | 90 | 105 |
|  |  | Re (550)/Rth (550) | 1/−5 | 1/−5 | 1/−5 | 1/−5 | 1/−5 | 1/−5 | 1/−5 |
|  |  | Optically Anisotropic Layer A Slow Axis | 45 | 45 | 45 | 30 | 45 | 45 | 60 |
|  |  | Re (550) | 51 | 51 | 51 | 51 | 51 | 51 | 51 |
|  |  | Optically Anisotropic Layer 1 Slow Axis | 135 | 135 | 120 | 120 | 135 | 150 | 150 |
|  |  | Re (550) | 26 | 26 | 26 | 26 | 26 | 26 | 26 |
|  |  | R [−40]/R [+40] | 16.7 | 16.7 | 16.7 | 16.7 | 16.7 | 16.7 | 16.7 |
|  |  | Sum of Re of Optically Anisotropic Layer A and Optically Anisotropic Layer 1 | −25 | −25 | −25 | −25 | −25 | −25 | −25 |
|  |  | Stack Order of Transparent Support 1/Optically Anisotropic Layer 1/Optically Anisotropic Layer A (*) | A2 | A2 | A2 | A2 | A2 | A2 | A2 |
|  | Liquid Crystal Cell | Rubbing Direction (Side Adjacent to Polarizing Plate 1) | 45 | 30 | 30 | 30 | 60 | 60 | 60 |
|  |  | Twist Angle | 90 | 90 | 90 | 90 | 90 | 90 | 90 |
|  |  | Δnd (550) | 400 | 400 | 400 | 400 | 400 | 400 | 400 |
|  | Optical Compensation Film 2 | Transparent Support 2 Slow Axis | 90 | 90 | 90 | 75 | 0 | 0 | 15 |
|  |  | Re (550)/Rth (550) | 1/−5 | 1/−5 | 1/−5 | 1/−5 | 1/−5 | 1/−5 | 1/−5 |
|  |  | Optically Anisotropic Layer B Slow Axis | 135 | 135 | 135 | 120 | 135 | 135 | 150 |
|  |  | Re (550) | 51 | 51 | 51 | 51 | 51 | 51 | 51 |
|  |  | Optically Anisotropic Layer 2 Slow Axis | 45 | 45 | 30 | 30 | 45 | 60 | 60 |
|  |  | Re (550) | 26 | 26 | 26 | 26 | 26 | 26 | 26 |
|  |  | R [−40]/R [+40] | 16.7 | 16.7 | 16.7 | 16.7 | 16.7 | 16.7 | 16.7 |
|  |  | Stack Order of Transparent Support 2/Optically Anisotropic Layer 2/Optically Anisotropic Layer B (*) | A2 | A2 | A2 | A2 | A2 | A2 | A2 |
|  |  | Sum of Re of Optically Anisotropic Layer B and Optically Anisotropic Layer 2 | −25 | −25 | −25 | −25 | −25 | −25 | −25 |
|  | Polarizing Plate 2 | Absorption Axis | 90 | 90 | 90 | 75 | 0 | 0 | 15 |

TABLE 19-continued

|  |  |  |  |  |  |  |  |  |  |
|---|---|---|---|---|---|---|---|---|---|
| Thickness of Transparent Support 1, 2 (μm) |  |  |  | 40 | 40 | 40 | 40 | 40 | 40 | 40 |
| Surface Film: Kind |  |  |  | Absent | Absent | Absent | Absent | Absent | Absent | Absent |
| Surface Film: Haze |  |  |  | — | — | — | — | — | — | — |
| Display Perfor- mance | Evaluation Item | Front Brightness |  | 4 | 4 | 4 | 4 | 4 | 4 | 4 |
|  |  | Gradation Inversion |  | 3 | 3 | 3 | 3 | 3 | 3 | 3 |
|  |  | Evaluation of Oblique Actual Image |  | 4 | 3 | 3 | 4 | 3 | 3 | 4 |

|  |  |  |  | Example 130 | Example 131 | Example 132 | Example 133 | Example 134 | Example 135 | Example 136 |
|---|---|---|---|---|---|---|---|---|---|---|
| Layer Consti- tution | Polarizing Plate 1 |  | Absorption Axis | 0 | 0 | 0 | 345 | 90 | 90 | 105 |
|  | Optical Compen- sation Film 1 | Transparent Support 1 | Slow Axis | 0 | 0 | 0 | 345 | 90 | 90 | 105 |
|  |  |  | Re (550)/Rth (550) | 9/90 | 9/90 | 9/90 | 9/90 | 9/90 | 9/90 | 9/90 |
|  |  | Optically Anisotropic Layer A | Slow Axis | 45 | 45 | 45 | 30 | 45 | 45 | 60 |
|  |  |  | Re (550) | 52 | 52 | 52 | 52 | 52 | 52 | 52 |
|  |  | Optically Anisotropic Layer 1 | Slow Axis | 135 | 135 | 120 | 120 | 135 | 150 | 150 |
|  |  |  | Re (550) | 25 | 25 | 25 | 25 | 25 | 25 | 25 |
|  |  |  | R [−40]/R [+40] | 11 | 11 | 11 | 11 | 11 | 11 | 11 |
|  |  | Sum of Re of Optically Anisotropic Layer A and Optically Anisotropic Layer 1 |  | −27 | −27 | −27 | −27 | −27 | −27 | −27 |
|  |  | Stack Order of Transparent Support 1/Optically Anisotropic Layer 1/Optically Anisotropic Layer A (*) |  | A2 | A2 | A2 | A2 | A2 | A2 | A2 |
|  | Liquid Crystal Cell |  | Rubbing Direction (Side Adjacent to Polarizing Plate 1) | 45 | 30 | 30 | 30 | 60 | 60 | 60 |
|  |  |  | Twist Angle | 90 | 90 | 90 | 90 | 90 | 90 | 90 |
|  |  |  | Δnd (550) | 400 | 400 | 400 | 400 | 400 | 400 | 400 |
|  | Optical Compen- sation Film 2 | Transparent Support 2 | Slow Axis | 90 | 90 | 90 | 75 | 0 | 0 | 15 |
|  |  |  | Re (550)/Rth (550) | 52 | 52 | 52 | 52 | 52 | 52 | 52 |
|  |  | Optically Anisotropic Layer B | Slow Axis | 135 | 135 | 135 | 120 | 135 | 135 | 150 |
|  |  |  | Re (550) | 25 | 25 | 25 | 25 | 25 | 25 | 25 |
|  |  | Optically Anisotropic Layer 2 | Slow Axis | 45 | 45 | 30 | 30 | 45 | 60 | 60 |
|  |  |  | Re (550) | −27 | −27 | −27 | −27 | −27 | −27 | −27 |
|  |  |  | R [−40]/R [+40] | A2 | A2 | A2 | A2 | A2 | A2 | A2 |
|  |  | Stack Order of Transparent Support 2/Optically Anisotropic Layer 2/Optically Anisotropic Layer B (*) |  | A2 | A2 | A2 | A2 | A2 | A2 | A2 |
|  |  | Sum of Re of Optically Anisotropic Layer B and Optically Anisotropic Layer 2 |  | 45 | 30 | 30 | 30 | 60 | 60 | 60 |
|  | Polarizing Plate 2 |  | Absorption Axis | 90 | 90 | 90 | 75 | 0 | 0 | 15 |
| Thickness of Transparent Support 1, 2 (μm) |  |  |  | 80 | 80 | 80 | 80 | 80 | 80 | 80 |
| Surface Film: Kind |  |  |  | Absent | Absent | Absent | Absent | Absent | Absent | Absent |
| Surface Film: Haze |  |  |  | — | — | — | — | — | — | — |
| Display Perfor- mance | Evaluation Item | Front Brightness |  | 4 | 4 | 4 | 4 | 4 | 4 | 4 |
|  |  | Gradation Inversion |  | 3 | 3 | 3 | 3 | 3 | 3 | 3 |
|  |  | Evaluation of Oblique Actual Image |  | 4 | 3 | 3 | 4 | 3 | 3 | 4 |

(*) Stack Order of Transparent Support/Liquid Crystal Compound-Containing Cured Layer/Optically Anisotropic Layer A (or B)
A2: Stacking in order of Polarizing Plate/Transparent Support/Optically Anisotropic Layer A (or B)/Liquid Crystal Compound-Containing Cured Layer
B2: Stacking in order of Polarizing Plate/Transparent Support/Liquid Crystal Compound-Containing Cured Layer/Optically Anisotropic Layer A (or B)
Slow axis: "—" indicates that the slow axis cannot be defined because Re is approximately 0 nm.

TABLE 20

|  |  |  |  | Example 137 | Example 138 | Comparative Example 17 | Comparative Example 18 | Comparative Example 19 | Comparative Example 20 |
|---|---|---|---|---|---|---|---|---|---|
| Layer Consti- tution | Polarizing Plate 1 |  | Absorption Axis | 90 | 90 | 45 | 45 | 90 | 90 |
|  | Optical Compen- sation Film 1 | Transparent Support 1 | Slow Axis | 45 | 45 | 45 | 45 | 45 | 45 |
|  |  |  | Re (550)/Rth (550) | 50/120 | 50/120 | 9/90 | 9/90 | 50/120 | 50/120 |
|  |  | Optically Anisotropic Layer 1 | Slow Axis | 135 | 135 | 135 | 135 | 135 | 135 |
|  |  |  | Re (550) | 25 | 25 | 50 | 50 | 25 | 25 |
|  |  |  | R [−40]/R [+40] | 11 | 11 | 4.2 | 4.2 | 11 | 11 |
|  |  | Sum of Re of Transparent Support 1 and Optically Anisotropic Layer 1 |  | −25 | −25 | — | — | −25 | −25 |

TABLE 20-continued

|  |  |  | Example 137 | Example 138 | Comparative Example 17 | Comparative Example 18 | Comparative Example 19 | Comparative Example 20 |
|---|---|---|---|---|---|---|---|---|
|  |  | Stack Order of Transparent Support 1/Liquid Crystal Compound-Containing Cured Layer 1 | A | A | A | A | A | A |
| Liquid Crystal Cell |  | Rubbing Direction (Side Adjacent to Polarizing Plate 1) | 55 | 35 | 55 | 35 | 70 | 20 |
|  |  | Twist Angle | 70 | 110 | 70 | 110 | 40 | 140 |
|  |  | Δnd (550) | 400 | 400 | 400 | 400 | 400 | 400 |
| Optical Compensation Film 2 | Transparent Support 2 | Slow Axis | 135 | 135 | 135 | 135 | 135 | 135 |
|  |  | Re (550)/Rth (550) | 50/120 | 50/120 | 9/90 | 9/90 | 50/120 | 50/120 |
|  | Optically Anisotropic Layer 2 | Slow Axis | 45 | 45 | 45 | 45 | 45 | 45 |
|  |  | Re (550) | 25 | 25 | 50 | 50 | 25 | 25 |
|  |  | R [−40]/R [+40] | 11 | 11 | 4.2 | 4.2 | 11 | 11 |
|  |  | Stack Order of Transparent Support 2/Liquid Crystal Compound-Containing Cured Layer 2 | A | A | A | A | A | A |
|  |  | Sum of Re of Transparent Support 2 and Optically Anisotropic Layer 2 | −25 | −25 | — | — | −25 | −25 |
| Polarizing Plate 2 |  | Absorption Axis | 0 | 0 | 0 | 0 | 0 | 0 |
| Thickness of Transparent Support 1, 2 (μm) |  |  | 60 | 60 | 60 | 60 | 60 | 60 |
| Surface Film: Kind |  |  | Absent | Absent | Absent | Absent | Absent | Absent |
| Surface Film: Haze |  |  | — | — | — | — | — | — |
| Display Performance | Evaluation Item | Front Brightness | 4 | 4 | 4 | 4 | 1 | 3 |
|  |  | Gradation Inversion | 3 | 3 | 2 | 2 | 3 | 2 |
|  |  | Evaluation of Oblique Actual Image | 4 | 4 | 2 | 1 | 2 | 2 |

*Stack Order of Transparent Support/Liquid Crystal Compound-Containing Cured Layer
A: The transparent support is stacked adjacent to the polarizing plate.
B: The transparent support is stacked adjacent to me liquid crystal cell.

TABLE 21

|  |  |  |  | Example 139 | Example 140 | Comparative Example 21 | Comparative Example 22 | Example 141 | Example 142 | Comparative Example 23 | Comparative Example 24 |
|---|---|---|---|---|---|---|---|---|---|---|---|
| Layer Constitution | Polarizing Plate 1 |  | Absorption Axis | 90 | 90 | 90 | 90 | 90 | 90 | 90 | 90 |
|  | Optical Compensation Film 1 | Transparent Support 1 | Slow Axis | 90 | 90 | 90 | 90 | 90 | 90 | 90 | 90 |
|  |  |  | Re (550)/Rth (550) | 1/−5 | 1/−5 | 1/−5 | 1/−5 | 9/90 | 9/90 | 9/90 | 9/90 |
|  |  | Optically Anisotropic Layer A | Slow Axis | 45 | 45 | 45 | 45 | 45 | 45 | 45 | 45 |
|  |  |  | Re (550) | 51 | 51 | 51 | 51 | 52 | 52 | 52 | 52 |
|  |  | Optically Anisotropic Layer 1 | Slow Axis | 135 | 135 | 135 | 135 | 135 | 135 | 135 | 135 |
|  |  |  | Re (550) | 26 | 26 | 26 | 26 | 25 | 25 | 25 | 25 |
|  |  |  | R [−40]/R [+40] | 16.7 | 16.7 | 16.7 | 16.7 | 11 | 11 | 11 | 11 |
|  |  |  | Sum of Re of Optically Anisotropic Layer A and Optically Anisotropic Layer 1 | −25 | −25 | −25 | −25 | −27 | −27 | −27 | −27 |
|  |  |  | Stack Order of Transparent Support 1/Optically Anisotropic Layer 1/Optically Anisotropic Layer A (*) | A2 | A2 | A2 | A2 | A2 | A2 | A2 | A2 |
|  | Liquid Crystal Cell |  | Rubbing Direction (Side Adjacent to Polarizing Plate 1) | 55 | 35 | 70 | 20 | 55 | 35 | 70 | 20 |
|  |  |  | Twist Angle | 70 | 110 | 40 | 140 | 70 | 110 | 40 | 140 |
|  |  |  | Δnd (550) | 400 | 400 | 400 | 400 | 400 | 400 | 400 | 400 |
|  | Optical Compensation Film 2 | Transparent Support 2 | Slow Axis | 0 | 0 | 0 | 0 | 0 | 0 | 0 | 0 |
|  |  |  | Re (550)/Rth (550) | 1/−5 | 1/−5 | 1/−5 | 1/−5 | 9/90 | 9/90 | 9/90 | 9/90 |
|  |  | Optically Anisotropic Layer B | Slow Axis | 135 | 135 | 135 | 135 | 135 | 135 | 135 | 135 |
|  |  |  | Re (550) | 51 | 51 | 51 | 51 | 52 | 52 | 52 | 52 |
|  |  | Optically Anisotropic Layer 2 | Slow Axis | 45 | 45 | 45 | 45 | 45 | 45 | 45 | 45 |
|  |  |  | Re (550) | 26 | 26 | 26 | 26 | 25 | 25 | 25 | 25 |
|  |  |  | R [−40]/R [+40] | 16.7 | 16.7 | 16.7 | 16.7 | 11 | 11 | 11 | 11 |
|  |  |  | Stack Order of Transparent Support 2/Optically Anisotropic Layer 2/Optically Anisotropic Layer B (*) | A2 | A2 | A2 | A2 | A2 | A2 | A2 | A2 |

TABLE 21-continued

| | | Example 139 | Example 140 | Comparative Example 21 | Comparative Example 22 | Example 141 | Example 142 | Comparative Example 23 | Comparative Example 24 |
|---|---|---|---|---|---|---|---|---|---|
| | Sum of Re of Optically Anisotropic Layer B and Optically Anisotropic Layer 2 | −25 | −25 | −25 | −25 | −27 | −27 | −27 | −27 |
| | Polarizing Plate 2  Absorption Axis | 0 | 0 | 0 | 0 | 0 | 0 | 0 | 0 |
| Thickness of Transparent Support 1, 2 (μm) | | 40 | 40 | 40 | 40 | 80 | 80 | 80 | 80 |
| Surface Film: Kind | | Absent | Absent | Absent | Absent | Absent | Absent | Absent | Absent |
| Surface Film: Haze | | — | — | — | — | — | — | — | — |
| Display Performance | Evaluation Item  Front Brightness | 4 | 4 | 1 | 3 | 4 | 4 | 1 | 3 |
| | Gradation Inversion | 3 | 3 | 3 | 2 | 3 | 3 | 3 | 2 |
| | Evaluation of Oblique Actual Image | 4 | 4 | 2 | 2 | 4 | 4 | 2 | 2 |

(*) Stack Order of Transparent Support/Liquid Crystal Compound-Containing Cured Layer/Optically Anisotropic Layer A (or B)
A2: Stacking in order of Polarizing Plate/Transparent Support/Optically Anisotropic Layer A (or B)/Liquid Crystal Compound-Containing Cured Layer
B2: Stacking in order of Polarizing Plate/Transparent Support/Liquid Crystal Compound-Containing Cured Layer/Optically Anisotropic Layer A (or B)
Slow axis: "—" indicates that the slow axis cannot be defined because Re is approximately 0 nm.

INDUSTRIAL APPLICABILITY

The liquid crystal display device according to the invention has a viewing angle characteristic of small asymmetry property and a small gradation inversion.

Although the invention has been described in detail and by reference to specific embodiments, it is apparent to those skilled in the art that it is possible to add various alterations and modifications insofar as the alterations and modifications do not deviate from the spirit and the scope of the invention.

This application is based on a Japanese patent application filed on Jan. 30, 2012 (Japanese Patent Application No. 2012-17347) and a Japanese patent application filed on Jul. 24, 2012 (Japanese Patent Application No. 2012-164232), and the contents thereof are incorporated herein by reference.

DESCRIPTION OF REFERENCE NUMERALS AND SIGNS

2: Tenter stretching machine for oblique stretching
10: Pull roll
11: Unstretched film
12: Wind roll
13: Obliquely stretched film
16: Rail
A1: Introduction process
B1: Stretching process
C1: Conveying process to following process
θA: Delivering angle

The invention claimed is:

1. A liquid crystal display device having at least:
a first and a second polarizing layers arranged so that respective absorption axes thereof are orthogonal to each other;
a first and a second substrates arranged opposite to each other between the first and second polarizing layers, at least either one of which has a transparent electrode;
a twisted alignment mode liquid crystal cell arranged between the first and the second substrates;
a first optical compensation film arranged between the first polarizing layer and the liquid crystal cell, including a first transparent support and a layer formed by curing a composition containing a first liquid crystal compound; and
a second optical compensation film arranged between the second polarizing layer and the liquid crystal cell, including a second transparent support and a layer formed by curing a composition containing a second liquid crystal compound; wherein,
an absorption axis of a first polarizing plate is arranged at an angle of 45° to a director direction of liquid crystals on a surface of substrate in the liquid crystal cell adjacent to the first polarizing plate,
the first transparent support has retardation and its in-plane slow axis is arranged in parallel or orthogonal to the director direction of liquid crystals on a surface of substrate in the liquid crystal cell adjacent thereto,
a slow axis of the layer formed by curing a composition containing a first liquid crystal compound is arranged orthogonal to the director direction of liquid crystals on the surface of substrate in the liquid crystal cell adjacent thereto,
the second transparent support has retardation and its in-plane slow axis is arranged in parallel or orthogonal to the director direction of liquid crystals on a liquid crystal cell substrate surface,
a slow axis of the layer formed by curing a composition containing a second liquid crystal compound is arranged orthogonal to the director direction of liquid crystals on a liquid crystal cell substrate surface adjacent thereto,
each of the first and the second transparent supports has in-plane retardation Re (550) of 0 to 200 nm and retardation in a thickness direction Rth (550) of −100 to 200 nm at a wavelength of 550 nm,
each of the compositions containing the first and the second liquid crystal compounds has in-plane retardation Re (550) of 10 to 100 nm at a wavelength of 550 nm, and
in which a ratio between retardation R [+40°] measured in a direction inclined 40° to a normal direction and retardation R [−40°] measured in a direction inversely inclined 40° to the normal direction in a plane orthogonal to the in-plane slow axis satisfies the following formula (I) or (II):
when R [+40°]>R [−40°], $$1.1 \leq R[+40°]/R[-40°] \leq 40 \quad (I)$$

when R [+40°]<R [−40°], $$1.1 \leq R[-40°]/R[+40°] \leq 40 \quad (II).$$

2. The liquid crystal display device as claimed in claim 1, wherein when retardation in the slow axis direction of the layer formed by curing a composition containing a first liquid crystal compound is taken as a positive number, a sum of the retardation of the first transparent support and the retardation of the layer formed by curing a composition containing a first liquid crystal compound Re1_sum satisfies −150 nm≤Re1_sum≤60 nm, and when retardation in the slow axis direction of the layer formed by curing a composition containing a second liquid crystal compound is taken as a positive number, a sum of the retardation of the second transparent support and the retardation of the layer formed by curing a composition containing a second liquid crystal compound Re2_sum satisfies $-150\ \text{nm} \leq \text{Re2\_sum} \leq 60\ \text{nm}$.

3. The liquid crystal display device as claimed in claim 1, wherein the liquid crystal compound is a polymerizable liquid crystal compound.

4. The liquid crystal display device as claimed in claim 1, wherein the liquid crystal compound is a discotic compound.

5. The liquid crystal display device as claimed in claim 1, wherein a difference of in-plane retardation Re (550) at a wavelength of 550 nm between the first transparent support and the second transparent support and a difference of retardation in a thickness direction Rth (550) at a wavelength of 550 nm between the first transparent support and the second transparent support are less than 10 nm, respectively.

6. The liquid crystal display device as claimed in claim 1, wherein at least one of a difference of in-plane retardation Re (550) at a wavelength of 550 nm between the first transparent support and the second transparent support and a difference of retardation in a thickness direction Rth (550) at a wavelength of 550 nm between the first transparent support and the second transparent support is 10 nm or more.

7. The liquid crystal display device as claimed in claim 1, wherein the first polarizing layer, the first transparent support, the layer formed by curing a composition containing a first liquid crystal compound, the twisted alignment mode liquid crystal cell arranged between the first and the second substrates, the layer formed by curing a composition containing a second liquid crystal compound, the second transparent support and the second polarizing layer are stacked in this order.

8. The liquid crystal display device as claimed in claim 1, wherein the first polarizing layer, the layer formed by curing a composition containing a first liquid crystal compound, the first transparent support, the twisted alignment mode liquid crystal cell arranged between the first and the second substrates, the second transparent support, the layer formed by curing a composition containing a second liquid crystal compound and the second polarizing layer are stacked in this order.

9. A liquid crystal display device having at least:
a first and a second polarizing layers arranged so that respective absorption axes thereof are orthogonal to each other;
a first and a second substrates arranged opposite to each other between the first and second polarizing layers, at least either one of which has a transparent electrode;
a twisted alignment mode liquid crystal cell arranged between the first and the second substrates;
a first optical compensation film arranged between the first polarizing layer and the liquid crystal cell, including a first transparent support, a composition containing a first liquid crystal compound and an optically anisotropic layer A; and
a second optical compensation film arranged between the second polarizing layer and the liquid crystal cell, including a second transparent support, a composition containing a second liquid crystal compound and an optically anisotropic layer B; wherein,
an absorption axis of a first polarizing plate is arranged at an angle of 45° to a director direction of liquid crystals on a surface of substrate in the liquid crystal cell adjacent to the first polarizing plate,
a slow axis of the composition containing a first liquid crystal compound is arranged orthogonal to the director direction of liquid crystals on the surface of substrate in the liquid crystal cell adjacent thereto,
an in-plane slow axis of the optically anisotropic layer A is arranged in parallel to the director direction of liquid crystals on the surface of substrate in the liquid crystal cell adjacent thereto,
a slow axis of the composition containing a second liquid crystal compound is arranged orthogonal to the director direction of liquid crystals on the liquid crystal cell substrate surface adjacent thereto,
an in-plane slow axis of the optically anisotropic layer B is arranged in parallel to the director direction of liquid crystals on the surface of substrate in the liquid crystal cell adjacent thereto,
each of the first and the second transparent supports has in-plane retardation Re (550) of 0 to 200 nm and retardation in a thickness direction Rth (550) of −100 to 200 nm at a wavelength of 550 nm,
each of the compositions containing the first and the second liquid crystal compounds has in-plane retardation Re (550) of 10 to 100 nm at a wavelength of 550 nm, and
in which a ratio between retardation R [+40°] measured in a direction inclined 40° to a normal direction and retardation R [−40°] measured in a direction inversely inclined 40° to the normal direction in a plane orthogonal to the in-plane slow axis satisfies the following formula (I) or (II):
when R [+40°]>R [−40°], $$1.1 \leq R[+40°]/R[-40°] \leq 40 \quad (\text{I})$$

when R [+40°]<R [−40°], $$1.1 \leq R[-40°]/R[+40°] \leq 40 \quad (\text{II}).$$

10. A liquid crystal display device having at least:
a first and a second polarizing layers arranged so that respective absorption axes thereof are orthogonal to each other;
a first and a second substrates arranged opposite to each other between the first and second polarizing layers, at least either one of which has a transparent electrode;
a twisted alignment mode liquid crystal cell arranged between the first and the second substrates;
a first optical compensation film arranged between the first polarizing layer and the liquid crystal cell, including a first transparent support, a composition containing a first liquid crystal compound and an optically anisotropic layer A; and
a second optical compensation film arranged between the second polarizing layer and the liquid crystal cell, including a second transparent support, a composition containing a second liquid crystal compound and an optically anisotropic layer B; wherein,
an absorption axis of a first polarizing plate is arranged at an angle of 45° to a director direction of liquid crystals on a surface of substrate in the liquid crystal cell adjacent to the first polarizing plate,
the first transparent support has retardation and its in-plane slow axis is arranged in parallel or orthogonal to the absorption axis of the first polarizing plate,
a slow axis of the composition containing a first liquid crystal compound is arranged orthogonal to the director direction of liquid crystals on the surface of substrate in the liquid crystal cell adjacent thereto,
an in-plane slow axis of the optically anisotropic layer A is arranged in parallel to the director direction of liquid crystals on the surface of substrate in the liquid crystal cell adjacent thereto,
the second transparent support has retardation and its in-plane slow axis is arranged in parallel or orthogonal to an absorption axis of a second polarizing plate,
a slow axis of the composition containing a second liquid crystal compound is arranged orthogonal to the director direction of liquid crystals on a liquid crystal cell substrate surface adjacent thereto,
an in-plane slow axis of the optically anisotropic layer B is arranged in parallel to the director direction of liquid crystals on the surface of substrate in the liquid crystal cell adjacent thereto, each of the first and the second transparent supports has in-plane retardation Re (550) of 0 to 200 nm and retardation in a thickness direction Rth (550) of −100 to 200 nm at a wavelength of 550 nm, each of the compositions containing the first and the second liquid crystal compounds has in-plane retardation Re (550) of 10 to 100 nm at a wavelength of 550 nm, and in which a ratio between retardation R [+40°] measured in a direction inclined 40° to a normal direction and retardation R [−40°] measured in a direction inversely inclined 40° to the normal direction in a plane orthogonal to the in-plane slow axis satisfies the following formula (I) or (II):

when R [+40°]>R[−40°], $$1.1 \leq R[+40°]/R[-40°] \leq 40 \qquad (I)$$

when R [+40°]<R[−40°], $$1.1 \leq R[-40°]/R[+40°] \leq 40 \qquad (II).$$

11. The liquid crystal display device as claimed in claim 9, wherein when retardation in the slow axis direction of the layer formed by curing a composition containing a first liquid crystal compound is taken as a positive number, a sum of the retardation of the optically anisotropic layer A and the retardation of the layer formed by curing a composition containing a first liquid crystal compound Re1A_sum satisfies −150 nm≤Re1A_sum≤60 nm, and when retardation in the slow axis direction of the layer formed by curing a composition containing a second liquid crystal compound is taken as a positive number, a sum of the retardation of the optically anisotropic layer B and the retardation of the layer formed by curing a composition containing a second liquid crystal compound Re2B_sum satisfies −150 nm≤Re2B_sum≤60 nm.

12. The liquid crystal display device as claimed in claim 9, wherein the optically anisotropic layer A and the optically anisotropic layer B are cured layers of a composition containing a liquid crystal compound.

13. The liquid crystal display device as claimed in claim 12, wherein the liquid crystal compound is a polymerizable liquid crystal compound.

14. The liquid crystal display device as claimed in claim 12, wherein the liquid crystal compound is a discotic compound.

15. The liquid crystal display device as claimed in claim 12, wherein the liquid crystal compound is a rod-like liquid crystal compound.

16. The liquid crystal display device as claimed in claim 9, wherein each of the optically anisotropic layer A and the optically anisotropic layer B has in-plane retardation Re (550) of 5 nm or more at a wavelength of 550 nm, and in which a ratio between retardation R [+40°] measured in a direction inclined 40° to a normal direction and retardation R [−40°] measured in a direction inversely inclined 40° to the normal direction in a plane orthogonal to the in-plane slow axis satisfies the following formula (I) or (II):

when R [+40°]>R[−40°], $$1 \leq R[+40°]/R[-40°] \qquad (III)$$

when R [+40°]<R[−40°], $$1 \leq R[-40°]/R[+40°] \qquad (IV).$$

17. The liquid crystal display device as claimed in claim 9, wherein each of the optically anisotropic layer A and the optically anisotropic layer B has in-plane retardation Re (550) of 5 nm or more at a wavelength of 550 nm, and in which a ratio between retardation R [+40°] measured in a direction inclined 40° to a normal direction and retardation R [−40°] measured in a direction inversely inclined 40° to the normal direction in a plane parallel to the in-plane slow axis satisfies the following formula (I) or (II):

when R [+40°]>R[−40°], $$1 \leq R[+40°]/R[-40°] \qquad (III)$$

when R [+40°]<R[−40°], $$1 \leq R[-40°]/R[+40°] \qquad (IV).$$

18. The liquid crystal display device as claimed in claim 1, which has a light diffusion layer arranged on a viewing side thereof.

19. The liquid crystal display device as claimed in claim 18, wherein the light diffusion layer is a layer containing a light-transmitting resin and a light-transmitting fine particle having a refractive index different from a refractive index of the light-transmitting resin and haze of the light diffusion layer is 10% or more.

20. The liquid crystal display device as claimed in claim 18, wherein the light diffusion layer has an anisotropic scattering layer which varies a light-transmitting state depending on an incidence angle of incident light.

21. The liquid crystal display device as claimed in claim 1, which is provided with a light diffusion layer arranged on a viewing side thereof and a backlight unit arranged on an opposite side to the viewing side thereof and a brightness half-width angle of light emitted from the backlight unit is 80° or less.

* * * * *